United States Patent [19]

Rupp

[11] Patent Number: 5,784,636
[45] Date of Patent: Jul. 21, 1998

[54] RECONFIGURABLE COMPUTER ARCHITECTURE FOR USE IN SIGNAL PROCESSING APPLICATIONS

[75] Inventor: Charlé R. Rupp, Bolton, Mass.

[73] Assignee: National Semiconductor Corporation, Santa Clara, Calif.

[21] Appl. No.: 654,395

[22] Filed: May 28, 1996

[51] Int. Cl.$^6$ .................................................... G06F 15/00
[52] U.S. Cl. ........................... 395/800.37; 395/800.23; 395/800.22; 395/800.43; 395/376
[58] Field of Search ....................... 395/800.23, 800.43, 395/376, 800.37, 800.35, 800.22, 500; 326/41

[56] References Cited

U.S. PATENT DOCUMENTS

| | | | |
|---|---|---|---|
| 5,298,805 | 3/1994 | Garverick et al. | 307/465 |
| 5,535,406 | 7/1996 | Kolchinsky | 395/800.1 |
| 5,600,845 | 2/1997 | Gilson | 395/800.34 |
| 5,606,267 | 2/1997 | El Ayat et al. | 326/41 |
| 5,646,544 | 7/1997 | Iadanza | 326/38 |
| 5,684,980 | 11/1997 | Casselman | 395/500 |

OTHER PUBLICATIONS

U.S. application No. 08/567.172, Applicant: Rupp, Charlé R. Entitled: "Toggle Bus Circuit", filed Dec. 5, 1995.
DPGA–Couples Microprocessors: Commodity IC's for the Early 21st Century Dehon, 1994.
Wough "Field Programmable Gate Array key to Reconfiguration Array out Performing Super Computers", 1991.

Primary Examiner—Larry D. Donaghue
Attorney, Agent, or Firm—Limbach & Limbach L.L.P.

[57] ABSTRACT

An architecture for information processing devices which allows the construction of low cost, high performance systems for specialized computing applications involving sensor data processing. The reconfigurable processor architecture of the invention uses a programmable logic structure called an Adaptive Logic Processor (ALP). This structure is similar to an extendible field programmable gate array (FPGA) and is optimized for the implementation of program specific pipeline functions, where the function may be changed any number of times during the progress of a computation. A Reconfigurable Pipeline Instruction Control (RPIC) unit is used for loading the pipeline functions into the ALP during the configuration process and coordinating the operations of the ALP with other information processing structures, such as memory, I/O devices, and arithmetic processing units. Multiple components having the reconfigurable architecture of the present invention may be combined to produce high performance parallel processing systems based on the Single Instruction Multiple Data (SIMD) architecture concept.

15 Claims, 24 Drawing Sheets

| Type ZA | OP | | | |
|---|---|---|---|---|
| Type SC | OP | C | | |
| Type SM | OP | 0 | A | |
| Type SM Indirect | OP | 1 | AM | R |
| Type MS | OP | S | i | A |
| Type MR | OP | R | i | A |
| Type LC | OP | | i | A |
| | C | | | |
| Type LM | OP | | i | A |
| | A | | | |

Stage 0   Stage 1   Stage 2   Stage 3

RECONFIGURABLE COMPUTER ARCHITECTURE FOR USE IN SIGNAL PROCESSING APPLICATIONS

TECHNICAL FIELD

The present invention relates to computer architectures, and more specifically, to an architecture for a reconfigurable computing system. In one example the computing system takes the form of a signal processor capable of being dynamically reconfigured to execute computational operations used in digital signal processing applications.

BACKGROUND OF THE INVENTION

Reconfigurable logic computer architectures are computing systems which are capable of achieving very high levels of performance. Reconfigurable systems are based on field programmable gate arrays (FPGA), which are integrated circuits that consist of an array of programmable logic and programmable interconnect elements. The elements can be configured and reconfigured by the end user to implement a wide range of logic functions and digital circuits. FPGA-based systems use the FPGAs to implement custom algorithm-specific circuits that accelerate the execution of the algorithm. FPGA systems are highly efficient because the same circuit elements used for executing one algorithm can be reconfigured to execute a completely different and unrelated algorithm.

SRAM (static random access memory)-based FPGAs consist of logic and interconnection resources that are configured by program data stored in internal SRAM cells. The same FPGA components can be reconfigured an unlimited number of times, thereby allowing the same component to implement many different functions.

Reconfigurable logic architectures use the FPGA as a core system component that is reconfigured to suit any algorithm. High levels of performance are achieved because the gate-level customizations made possible with FPGAs results in an extremely efficient circuit organization that uses customized data-paths and "hardwired" control structures. These circuits exhibit significant fine-grained, gate-level parallelism that is not achievable with programmable, instruction-based technologies such as micro-processors or supercomputers. This makes such architectures especially well suited to applications requiring the execution of multiple computations during the processing of a large amount of data.

A basic reconfigurable system consists of two elements: a reconfigurable circuit resource of sufficient size and complexity, and a library of circuit descriptions (configurations) that can be down-loaded into the resource to configure it. The reconfigurable resource would consist of a uniform array of orthogonal logic elements (general-purpose elements with no fixed functionality) that would be capable of being configured to implement any desired digital function. The configuration library would contain the basic logic and interconnect primitives that could be used to create larger and more complex circuit descriptions. The circuit descriptions in the library could also include more complex structures such as counters, multiplexers, small memories, and even structures such as controllers, large memories and microcontroller cores.

Unfortunately, the current state of the art in FPGA technology limits designers to systems that differ from the basic system described. These practical systems are typically a collection of several different types of devices: FPGAs, static RAMs, programmable crossbar devices, and other non-reconfigurable devices. Non-reconfigurable (fixed) devices are included because it is not feasible to implement some functions (memory, for example) with FPGAs. In most systems, several FPGAs are connected together in an array because a single FPGA provides insufficient resources for implementing a typical application. Although this combination of non-FPGA devices with arrays of FPGAs makes it possible to implement reconfigurable systems that support somewhat complex applications, it also results in a system that is less flexible. This inflexibility is a direct result of the fixed interfaces between various components and the fixed functions of the non-FPGA devices.

Fixed interfaces are a direct result of connecting multiple chips (FPGAs and non-FPGAs) together to form a larger reconfigurable array. Because these chips are connected together using conventional printed-circuit board (PCB) methodology, the pin interconnections between individual FPGA devices are fixed at the time the system is constructed. Programmable interconnect devices such as crossbars can provide limited flexibility between FPGAs so that pin assignments can be changed to suit the needs of the application. However, programmable interconnects add additional delay to the paths between FPGAs, and the pins between the interconnect device and the FPGA remain fixed.

These fixed interfaces result in a reconfigurable resource that is not uniform and is more difficult to utilize. This is true even when reconfigurable interconnects are utilized. A significant problem is the large mismatch between on-chip and off-chip routing. The on-chip routing that is used to route circuit modules on chip is many times denser and is much faster than the off-chip routing that is used to interconnect individual FPGA chips. The lack of off-chip routing and its relative slowness results in a severe communication bottleneck between individual FPGA devices. Designing around this communication bottleneck is one of the biggest challenges of using a reconfigurable system effectively.

Although the introduction of fixed interfaces and fixed functions has allowed practical reconfigurable systems to be constructed, the resulting non-uniformity of these systems makes them more difficult to utilize. Design is simplified in a uniform design medium because the only physical constraints that impact the design process are the I/O pins that bring data on and off chip. However, once fixed circuitry is introduced, not only is part of the system's functionality fixed, but some of the original flexibility of the FPGAs is also lost.

The loss of flexibility impacts both implementation and performance. For example, circuit implementations are less efficient with multiple chips because the off-chip interconnect used to communicate between chips is less dense and of lower performance than what is available on-chip. Circuit modules that must be split across multiple FPGAs will typically exhibit lower performance than if the module fit into a single FPGA. Partitioning a circuit implementation across a set of fixed and unfixed components is also very difficult. For example, if it is determined that a fixed-function memory is necessary for a given application, any circuitry that communicates with the memory will need to be placed in FPGAs with pins that are connected to the multiplier.

Another interconnection problem which impacts the performance of typical reconfigurable systems is that of the manner in which signals are routed through the elements of a FPGA array. Signals are typically routed to the edge of an array prior to connection to an I/O bus or other system component. This introduces delays in the transmission of data and the execution of logical operations. This means of data routing also reduces the flexibility of the reconfigurable elements because some cells must be configured to act as wires to permit the signals to be routed through the cells.

Current reconfigurable systems exhibit significant application software implementation difficulties in the placement and routing of the reconfigurable function cells and reconfigurable wiring cells necessary to realize the reconfigurable computing function blocks. Automatic tools for this problem tend to use the reconfigurable resource in an inefficient manner. In many cases, laborious hand placement and routing is needed to realize simple reconfigurable function blocks.

The clock rate performance of current reconfigurable systems is limited by the need for several reconfigurable wiring links to transfer data from the periphery of the reconfigurable array to the interior circuits that need the data and the corresponding reconfigurable wiring links to bring the result data out from the interior cells to the periphery of the array. The variable path delays of current system also create clock skew problems in the implementation of the pipeline stage clock controls.

Current systems require all pipeline data paths to be brought to the periphery of the array using a limited amount of reconfigurable wiring resource. This limits the number of pipeline data busses which can be effectively used in a system. There is a corresponding limitation in current systems in the number of pipeline control signals that can be distributed to manage the reconfigurable pipeline computation process.

What is desired is an architecture for a reconfigurable computing system which overcomes the disadvantages of existing systems.

SUMMARY OF THE INVENTION

The present invention is directed to an architecture for information processing devices which allows the construction of low cost, high performance systems for specialized computing applications involving sensor data processing. A typical application involves high speed data input from one or more sensors, reduction of the data using complex signal processing algorithms, presentation of the results at the output of the system, and the subsequent control of actuator devices (digital-to-analog converters for example).

A feature of the reconfigurable computing architecture of the present invention is the use of a programmable logic structure called an Adaptive Logic Processor (ALP). This structure is similar to an extendible field programmable gate array (FPGA) and is optimized for the implementation of application program specific pipeline functions, where the function may be changed any number of times during the progress of a computation. These pipeline functions are implemented by configuring a group of logic cells contained in the gate array to execute a specific operation or sequence of logical operations. A Reconfigurable Pipeline Instruction Control (RPIC) unit is used for loading the pipeline functions needed for executing a particular program into the ALP during the configuration process. The RPIC also acts to coordinate the operations of the ALP with other information processing structures, such as memory, I/O devices, and arithmetic processing units.

Multiple components having the reconfigurable architecture of the present invention may be combined to produce high performance parallel processing systems based on the Single Instruction Multiple Data (SIMD) architecture concept. In such a case, an interconnect structure called a Toggle Bus is used to provide communication between the components. The Toggle Bus is also used to integrate peripheral processing elements such as components for reading sensor data, communicating results and controlling actuators. In addition to the ALP and RPIC elements, a typical reconfigurable component includes a Toggle Bus Transceiver (TBT) circuit, a standard arithmetic pipeline execution unit called the Pipeline Data Processor (PDP), a Multiple Port Memory (MPM) and an external memory access unit called the External Address Generator (XAG).

Further objects and advantages of the present invention will become apparent from the following detailed description and accompanying drawings.

DETAILED DESCRIPTION OF THE PREFERRED EMBODIMENT

Although the reconfigurable computer architecture of the present invention may be implemented in various forms which are designed for specific uses, the following discussion will focus on the use of the architecture for a signal processing application. Specific implementations of the invention allow variation of a number of parameters to realize components which satisfy the needs of specific market segments:

1) The details of the implementation of the core cell array and lowest level reconfigurable wiring cells may be varied to accommodate either lookup table based reconfigurable architectures or fine grained reconfigurable architectures;
2) The number of core cells and reconfigurable wiring cells may be varied to provide a tradeoff of component cost and application circuit size while accommodating improved fabrication technology;
3) The interface to memory, core processor and parallel processing interface extension may connect to fixed function circuitry on the same component with the reconfigurable logic resource or to external components which include these fixed function capabilities;
4) The number of bits in the pipeline bus array bus words may be varied to satisfy the needs of the interface to fixed function resource as well as the word size needs of specific application categories. For example, image processing applications typically need smaller words than digital signal processing applications; and
5) The number of pipeline bus array data busses may be reduced or extended to accommodate a reduced or expanded number of fixed function blocks.

The Reconfigurable Signal Processor (RSP) of the present invention is based on a computing architecture for data processing which integrates configurable logic and parallel processing interconnect structures as part of the fundamental mechanism of computation. This approach allows the implementation of algorithms in ways that result in an order of magnitude performance improvement for a wide range of applications. At the same time, the architecture allows the use of powerful software compilation concepts to simplify the program development tasks needed to access its high performance capability.

Figures 1, 4:
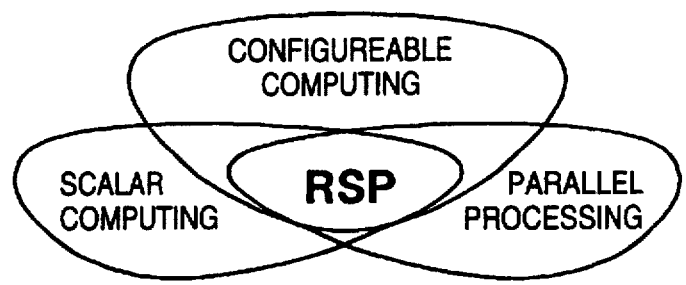
FIG. 1 is a diagram showing the computation methods underlying the reconfigurable signal processing system of the present invention.
FIG. 4 shows the format of the basic instruction types for an example PDP and ALP instruction interface.

The software compiler for the architecture maps the data processing tasks of an application to three basic computation methods, as shown in FIG. 1. These computation methods are configurable computing, scalar computing, and parallel processing. The RSP underlying architecture supports the integration of these styles on a closely coupled basis. Hundreds of computation steps involving the pipelined scalar processors, configurable logic, and parallel processing resources can be performed in a single clock cycle by the cooperation of the hardware structures.

The RSP emphasizes the use of the configurable logic resource as a fundamental part of the computation. The compiler realizes the highest performance by the generation of application specific "deep pipeline" circuits formed from the configurable logic. This approach uses Field Programmable Gate Arrays and allows many elementary computation steps to be performed in a single clock cycle. Since the configurable logic array allows the implementation of arbitrary logic networks, there is no restriction on the type of computation primitive available to the compiler for each pipeline stage. The RSP architecture also includes the novel concept of a Pipelined Bus Array (PBA) as part of the configurable logic array to simplify the process of automatic circuit generation. By allowing direct implementation of pipeline structures, the PBA also provides much higher performance compared to previous approaches to designing reconfigurable architectures. The number of pipeline stages that are implemented in a single RSP device is limited by the size of the configurable logic array. In the implementation to be described, the PBA is an extension of the fine grained configurable logic array structure.

By using the integral parallel processing interconnect structure of the present invention, several RSP devices may be combined in the "parallel processing dimension". By using several RSP components, deep pipelines may be extended using the concept called "pipeline chaining". This allows the execution of several hundred algorithm steps in a single clock cycle. The parallel processing interconnect structure also allows the software compiler to implement traditional Single Instruction Multiple Data (SIMD) and Multiple Instruction Multiple Data (MIMD) parallel processing algorithms. The specific parallel processing interconnect structure implemented in the RSP architecture to be described is termed a "Toggle Bus". This structure allows the implementation of a multiple stage interconnect network. By incorporating a full transceiver into a RSP device, the Toggle Bus structure allows access to most of the data flow capabilities of a crossbar network at a cost comparable to a traditional tri-state bus approach. For the applications of interest, the Toggle Bus realizes true "scalable computing": N-times bandwidth increase for (N) processing elements.

Application Development

The RSP architecture allows the implementation of software development tools that use the configurable logic array in a number of differing ways. In addition to the deep pipeline approach, the configurable logic resource may be used as an instruction set enhancement mechanism. For example, for an application which requires the manipulation of a large number of finite field arithmetic equations, the configurable logic may be programmed to implement a finite field arithmetic instruction set. A programmer can access this capability by using the "operand overload" capability of the C++ programming language. For digital signal processing oriented applications, the configurable logic may be used to implement the complex address computations that are needed to access the application data base. The RSP retains the reconfigurable input/output capabilities of traditional configurable logic devices. This allows a group of RSP devices to be directly connected to actuator/sensor devices requiring very high bandwidth data transfer, such as image sensors and high speed communications devices.

The mix of computing approaches applied to a specific application depends on a detailed analysis of the task structure of the application and the nature of the critical computation sequences in the "inner loops" of the algorithms. The mapping of the application to the multitude of possible implementations available using a RSP based system is the most complex task in the automatic compilation process. The general approach to this task will now be described.

First, the compiler attempts to always use 100% of the configurable logic resource. The RSP includes high speed reconfiguration capabilities which allow the application program to modify the computations in the configurable logic as the application proceeds through the sequence of required tasks. For example, the configurable logic may first be used to perform high speed data collection. The configurable logic is then modified a number of times to analyze the data, and then finally reconfigured for output of the results of the data manipulations. The compiler always attempts to realize the deepest configurable logic pipeline for each task of a computation. Pipeline chaining between two or more RSP devices through the Toggle Bus is used if functional pipelines are found which are larger than what will fit in the configurable logic resource of a single RSP device. Lacking the detection of a deep pipeline for a specific phase of an application, the compiler uses the configurable logic as an instruction set/address generation acceleration mechanism. These "dynamic" uses of the configurable logic are in addition to the "static" use of the configurable logic for application specific input/output. The compiler manages the use of the configurable logic resource in a manner similar to the classic techniques of "global register optimization". In contrast to previous approaches to reconfigurable logic which allow only one function to be active at a time, the multiple Pipeline Control Ports (PCP) of the RSP architecture allow several pipeline segments to remain active while any one of the segments is dynamically reconfigured.

Second, the compiler realizes improved performance by using the parallel processing capabilities provided by the Toggle Bus. In a cluster of RSP devices, several different tasks (such as data input, data analysis, and data output) may be performed concurrently by functionally distributing these operations amongst the processors and using the Toggle Bus for the inter-task data flow. This style of computing is referred to as Multiple Instruction Multiple Data (MIMD) processing. A cluster of RSP processors may also be used to accelerate a specific algorithm requiring close data flow coupling using the Single Instruction Multiple Data (SIMD) parallel processing approach. For example, (N) RSP processors may be used together to accelerate the computation of the Fast Fourier Transform (FFT) algorithm by a factor of N.

The compiler implements the remainder of the application using code sequences for the scalar processor. The program fragments include the code for the reconfiguration of the configurable logic resource. The instruction stream of the scalar processor is also responsible for the high level task sequencing using the Toggle Bus transactions and associated pipeline control mechanisms. At the lower levels of the computation, coordination of the operations between the functional units is managed by the "autonomous pipeline" capabilities of the configurable logic array which will be described later. Finally, the scalar processor performs all of the remaining processing tasks which have not been assigned to the configurable logic or parallel processing modules. An aspect of the behavior of RSP based systems is that the same subroutine may be executed in three different ways: (1) totally in the configurable logic if this resource is not otherwise in use at the specific point in the computation, (2) partially in the configurable logic if only a portion of the configurable logic resource is available or (3) totally in the scalar processor when all of the configurable logic resource is employed performing computations which result in better performance.

As a practical matter, the development of an application proceeds in a number of steps. In many situations, a complete implementation for the application likely exists for a scalar architecture. In most cases, this code may be recompiled for the RSP to achieve better performance, but will not likely result in the "best" performance because the algorithm definition typically includes a bias for the original target scalar system. This is a well known phenomena in parallel processing and is resolved only by knowledgeable changes to the program which allow the compiler to do a better job of code generation. This "successive refinement" approach is one of the major strengths of the RSP architecture when compared to previous approaches. That is, a novice user will obtain a usable solution to an application problem without significant effort. As the user's knowledge increases, successively better solutions may be realized. Sophisticated software tools such as "application profilers" and graphics based "data flow managers" are typically employed to realize a final solution approach using the computation methods available with the architecture of the present invention.

Structurally, the output of an RSP compiler tool consists of an object file which contains both the binary code definition for the scalar processors and a set of relocatable circuit designs for the configurable logic arrays. The RSP architecture is unique in allowing the automatic generation of relocatable logic blocks based on the circuit designs using the Pipeline Bus Array concept.

RSPS System Architecture Overview

As discussed, the Reconfigurable Signal Processing System (RSPS) of the present invention is based on an architecture for a family of information processing devices which can be used to construct high performance systems for specialized computing applications involving sensor data processing. A typical application would involve high speed data input from one or more sensors (such as a video camera, RADAR responder, analog to digital converters, etc.), reduction of the data using complex algorithms such as the Fourier Transform, presentation of the results at the output of the system, and the subsequent control of an actuator device (such as a digital to analog converter, etc.). A unique feature of RSPS machines is the use of an advanced type of programmable logic structure called the Adaptive Logic Processor (ALP). This structure is optimized for the implementation of program specific pipeline functions, where the function may be changed any number of times during the progress of the computation. The novel Reconfigurable Pipeline Instruction Control (RPIC) unit of the present invention is responsible for loading the functions into the ALP (an operation termed the configuration process) and coordinating the operations of the ALP with other information processing structures. These can include memory elements, I/O devices, and arithmetic processing units. As noted, several RSPS architecture components may be combined to create very high performance parallel processing systems based on the Single Instruction Multiple Data (SIMD) architecture concept.

Figure 2:
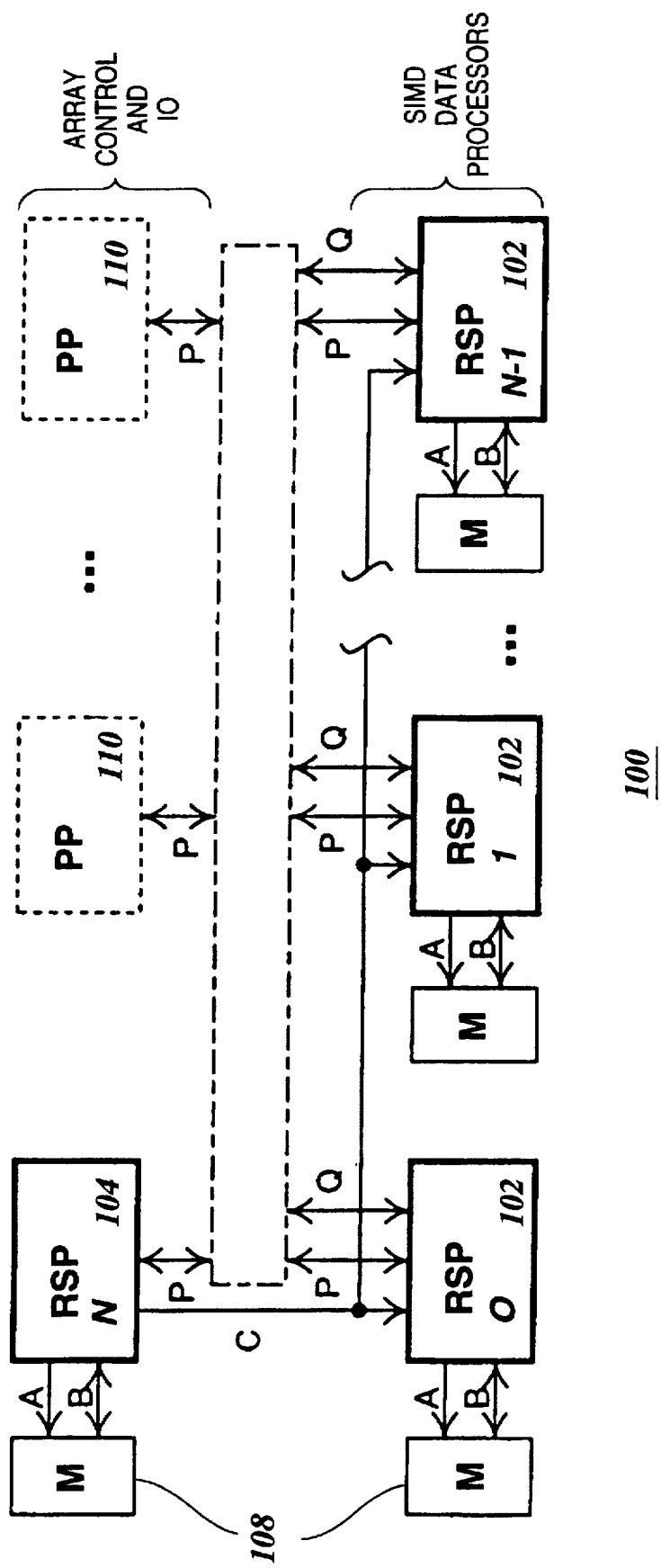
FIG. 2 is a block diagram of a general RSPS (Reconfigurable Signal Processing System).

FIG. 2 is a block diagram of a general RSPS (Reconfigurable Signal Processing System) 100. In FIG. 2, each RSPS architecture component is called a Reconfigurable Signal Processor (RSP) 102. N of the components, numbered 0 through N−1, are referred to as the data processing elements of the system, and one additional RSP component (numbered N) 104 is termed the bus master processor. This element is used as the controller for the data element array. The fact that the same RSP component can be used for these different roles is a direct consequence of the ALP reconfiguration capability.

As noted, an interconnect structure called the Toggle Bus 106 is used to provide communication between the N RSP components. Toggle Bus 106 has the characteristic that the net signal bandwidth of the bus increases in proportion to the number of interconnected RSP components. Toggle Bus 106 is also used to integrate peripheral processing elements such as components for reading sensor data, communicating results, and controlling actuators. Further information regarding the structure and operation of Toggle Bus 106 may be found in the commonly assigned U.S. patent application Ser. No. 08/567,172, entitled "Toggle Bus Circuit", filed Dec. 5, 1995, the contents of which is hereby incorporated by reference. Each RSP device 102 and 104 includes memory resources which may be expanded using external memory components 108 as shown in the figure. If desired, peripheral processors 110 may be connected to Toggle Bus 106 to assist with data input/output functions.

RSP Element Implementation Structure

The RSP (and RSPS system) can be viewed as a specialized supercomputing architecture emphasizing applications which require significant amounts of bit level manipulation and integer arithmetic. Applications which fall into this category include image processing and non-traditional arithmetic such as finite field arithmetic applications. The architecture is also suited for database processing and high speed communication processing. The computing architecture to be described is biased to favor the use of the configurable logic resource. As such, the scalar processing capability is a Digital Signal Processing (DSP) integer core which is consistent with the types of applications which will be described. Alternate implementations of the architecture could include processors with full floating point and virtual memory addressing capabilities.

Figure 3:
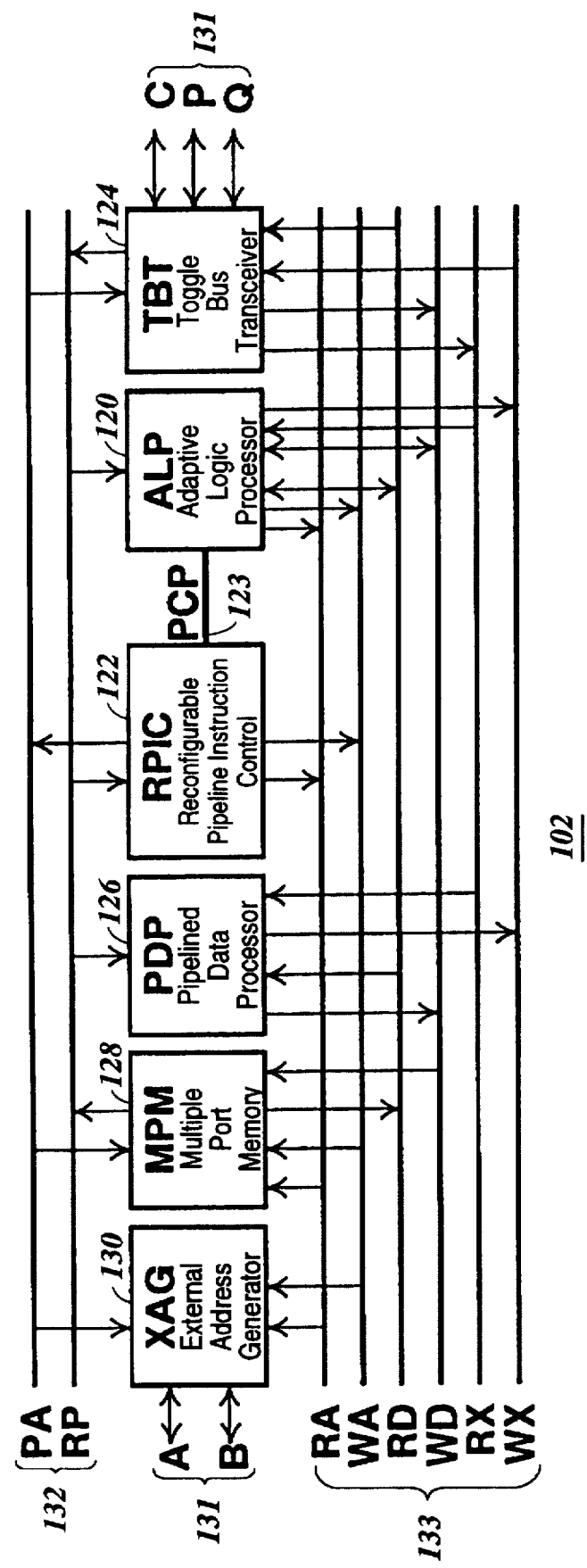
FIG. 3 is a block diagram showing the basic structure of a typical RSPS component.

FIG. 3 is a block diagram showing the basic structure of a typical RSPS component (RSP elements 102 or 104 of FIG. 2). In addition to the ALP 120 and RPIC 122 circuits already mentioned, a typical RSP device includes a Toggle Bus Transceiver (TBT) circuit 124, a standard arithmetic pipeline execution unit referred to as a Pipeline Data Processor (PDP) 126, a Multiple Port Memory (MPM) 128, and an external memory access unit referred to as an External Address Generator (XAG) 130.

The primary mechanisms for the implementation of an RSP architecture are the Pipeline Bus Array 132 (PBA, shown as bus lines RA, WA, RD, WD, RX, and WX in the figure), Reconfigurable Pipeline Instruction Controller (RPIC) 122, and the Pipeline Control Ports (PCPs) 123. In the general case, each RSP component also includes high speed Multiple Port Memory (MPM) resource 128 which allows simultaneous access of program instructions, data read and data write on a single clock cycle. The amount of memory available to the RSP may be extended using external components which are accessed using External Address Generator (XAG) 130 and the "A" and "B" external connections shown in the figure. For the purposes of this discussion, Adaptive Logic Processor (ALP) 120 serves as the configurable logic resource. Pipelined Data Processor (PDP) 126 functions as the DSP core processor, and Toggle Bus Transceiver (TBT) 124 serves as the embedded Toggle Bus interconnection circuit. In a more general architecture, the PDP and TBT blocks may be replaced by other types of scalar processing units and differing interconnect architecture structures. In some implementations, the TBT, PDP, MPM, and XAG blocks may be removed, leaving only the configurable logic resource and the pipeline control capability as the basic modules of the architecture.

As noted, a unique feature of RSPS components is the use of a Pipeline Bus Array (PBA) 132 structure which allows any of the functional units to be connected to the pipeline functions configured in ALP 120. This provides a faster and more efficient means of transferring data between the ALP and the other components. Several functionally different pipeline segments may be used in the ALP at one time, allowing autonomous pipeline action which is synchronized by program execution in RPIC 122.

The general concepts for the ALP 120 and RPIC 122 elements in RSPS components and the integration of the Toggle Bus 106 will now be discussed. As mentioned, PDP 126 is assumed to be a typical high speed pipelined arithmetic unit, such as the Digital Signal Processing (DSP) core manufactured by National Semiconductor Corporation, the assignee of the present invention. It is noted that the RSPS architecture allows the use of a variety of PDP functional units and allows for RSP components which do not have a PDP unit. The MPM 128 and XAG 130 units use typical high speed interleaved cache memory principles and are not described here in detail.

In one embodiment, ALP 120 is an extension of National Semiconductor's CLAy FPGA architecture and retains the fine grained symmetric cell structure of that device. The CLAy architecture for a configurable logic array is described in U.S. Pat. No. 5,298,805, entitled "Versatile and Efficient Cell-to-Local Bus Interface in a Configurable Logic Array", issued Mar. 29, 1994, assigned to the assignee of the present invention, and the contents of which is hereby incorporated by reference. The principle modifications to the CLAy architecture concern optimizations for efficient implementation of multiple stage pipeline structures, control of multiple pipeline chains, and access to the pipelined data busses of the RSP. Other configurable logic resources having the noted functionality may also be used.

RSP General Block Diagram Description

As shown in FIG. 3, an RSP component typically consists of six functional units:

ALP Adaptive Logic Processor. A programmable logic structure which allows the implementation of application specific logic circuits for controlling external components and computation pipelines. The ALP consists of an array of logic cells, programmable interfaces to the input/output pins of an RSP device, programmable interconnects between the logic cells, and access to the Pipeline bus Array (PBA) data. The entire ALP may be dedicated to implement one function or several smaller functions may operate concurrently. RPIC configures the ALP circuits using data in the MPM or from the Toggle Bus. The circuits in the ALP are generally changed several times during the execution of a typical program. Circuits in the ALP which are not in the process of configuration change remain active.

RPIC Reconfigurable Pipeline Instruction Controller. Responsible for coordinating the operation between functional units. The RPIC generates the instruction address stream for program execution, decodes the operation required for each instruction, generates addresses for reading and writing data, generates control signals for the ALP and PDP for instruction execution, and controls the reconfiguration of all or part of the ALP. The control interface between RPIC and ALP uses a concept called Pipeline Control Ports (PCPs), which will be described in detail below.

PDP Pipelined Data Processor. This is a traditional pipelined arithmetic processing unit. Typically, it includes a multiple function integer Arithmetic Logic Unit (ALU). It may also include dedicated functional units for multiplication and floating point operations. The PDP receives data input from the MPM, TBT or ALP.

MPM Multiple Port Memory. A fast memory unit allowing simultaneous program read, data read and data write. For small applications, the MPM supplies all of the Random Access Memory (RAM) needs. For larger applications, the MPM is used as a cache memory to larger memories external to the RSP. The MPM may be loaded through the Toggle Bus or through a dedicated external memory interface port.

TBT Toggle Bus Transceiver. This provides flexible data flow between several RSP components when used in the SIMD configuration. The TBT also provides standard input/output interface for external memory, sensor and actuator components. In an array of N RSP components, the TBT circuits collectively form a Multiple stage Interconnect Network (MIN).

XAG External Address Generator. This extends the addressing capabilities of the RSP for large off chip memories. The XAG also supplies the address sequence for initial power up configuring of the ALP from an on chip or off chip Read Only Memory (ROM) device.

Data flows between the functional Units of the RSP using eight sets of data lines called the Pipeline Bus Array (PBA). The activity of the PBA allows high speed concurrent operation of the connected functional units. The general usage of each PBA bus data line is as follows:

PA Program Address bus. This defines the address of the next instruction to be read from the MPM. The PA is controlled and driven only by the RPIC for program sequencing.

RP Read Program bus. MPM output supplies instruction data to the RPIC for program execution. RP may also be driven from the TBT for execution of instructions supplied over the Toggle Bus.

RA Read Address bus. This provides the address for reading data from the MPM. RPIC drives RA to access data specified by the address field in an instruction. RA may also be driven by an ALP pipeline to simplify memory access for data arrays. RA values generated by the ALP are synchronized by the RPIC in two ways. If the data referenced is for the PDP, then a Configurable Address Mode Extension (CAMX) is used. If the data is for the ALP, the RPIC synchronizes the RA with the RD bus usage.

WA Write Address bus. This provides the address for writing data into the MPM. RPIC drives WA to write data specified by the address field in an instruction. WA may also be driven by an ALP pipeline to simplify memory access for data arrays. WA values generated by the ALP are synchronized by the RPIC in two ways. If the data referenced is for the PDP, then a Configurable Address Mode Extension (CAMX) is used. If the data is for the ALP, the RPIC synchronizes the WA with the WD bus usage.

RD Read Data bus. This bus carries data from the MPM for the PDP, data from the MPM for the ALP, or data from the ALP for the PDP. Data transfer from the ALP to the PDP is always synchronized using a CAMX.

WD Write Data bus. This bus carries data from the PDP for writing into the MPM, data from the ALP for writing into the MPM, or data from the PDP to the ALP. PDP to ALP transfers are synchronized using a CAMX. ALP to MPM transfers are synchronized by "store ALP" instructions or by an Autonomous Pipeline Action (APA) sequence described below.

RX Read External bus. This bus carries off chip data from the TBT to the PDP, ALP or MPM. External data read is synchronized by RPIC. TBT to ALP transfers feed data to an ALP pipeline which may be chained to other locations. TBT to PDP data transfer is initiated by executing "IN" instructions. TBT to ALP transfers are initiated by "IN" instructions with CAMX or by autonomous pipeline action.

WX Write External bus. This bus carries data output from the PDP or ALP through the Toggle Bus to external components. PDP output is initiated using "OUT" instructions. ALP to TBT transfers are initiated by "OUT" instructions or by autonomous pipeline action.

In addition to the PBA busses, a typical RSP component includes other specialized data and control busses 131. There are five primary data paths which allow connection of an RSP component to other RSP components, off chip memories, sensors, and actuators. The general use of these data paths are as follows:

P Primary Toggle Bus interface bus. This is the default external memory data interface. When several RSP components are used in a SIMD array, the P and Q busses operate together to create parallel processing data flow patterns. When only one RSP is used in a system, the P bus operates as a standard Tristate bus. (see FIG. 17)

Q Secondary Toggle Bus interface bus. When only one RSP is used in a system, the Q bus may be used as a second Tristate bus or as a reconfigurable set of input/output pins for external memory, sensor and actuator connection. When several RSP components are used in a SIMD array, the Q and P lines are connected together using a "shuffle wiring" pattern. P and Q then operate together with the set of TBT circuits to create a MIN parallel processing interconnect network. (see FIG. 17)

A Primary Address bus. By default, the A bus is used to address external memory components from the XAG unit. When not used for this purpose, the A bus may be driven by programmable logic in the ALP as reconfigurable input/output lines to interface with external sensors and actuators.

C Control bus. When several RSP components are used in a SIMD array, the C bus forms the Toggle Bus control vector which is generated by the bus master RSP (component N of FIG. 2). In this case, C is an input vector to the data processing RSP components (components 0 through N−1). When only one RSP is used in a system, the C bus may be driven by programmable logic in the ALP for control of external sensors and actuators. (see FIG. 17)

B Secondary data bus. By default, the B bus is a secondary bi-directional interface for external memory components under control of the XAG. In this mode, external data may be transferred between the RSP and external memories without the use of the Toggle Bus. This allows higher performance for applications which use all of the Toggle Bus bandwidth for interprocessor communication. The B bus may be driven by the ALP as reconfigurable input/output lines for external sensor and actuator connection. In addition to these primary data and address interface busses, several individual control signal pins on an RSP chip are dedicated for clock input, external memory control, and so forth.

Data Formats and Memory Addressing Modes

An RSP component may be developed using 16 bit, 32 bit, or 64 bit data paths. For illustration, a RSP component with 16 bit data words will be used. Each memory address then refers to a 16-bit data word. Exact details of the instruction word bits will depend on the type of PDP unit used. FIG. 4 shows the format of the basic instruction types for an example PDP and ALP instruction interface. The zero address (ZA) type instruction uses an entire word for the operation code (OP) of the instruction and is used for operations that do not require instruction address or parameter fields (for example, clear accumulator, begin configuration sequence). The short constant (SC) format instructions use an eight bit operation code and an eight bit constant field (C). SC instructions perform functions such as adding a constant to an accumulator result. The long constant (LC) format uses two words to allow operations with a full 16 bit constant. Most arithmetic instructions in the RSP are of the short memory (SM) format. The upper eight bits define the operation code. The most significant bit of the lower byte (i) is the "indirect memory reference" control bit and the remaining seven bits (A) define a short address value or an indirect memory access mode as described below. The long memory format (LM) allows direct access to the full range of memory including off chip memory reference. The LM format is also used for "jump" and "call" type instructions. The memory shift (MS) format allows memory reads and writes with integral data shift using a four bit shift count field (S). The memory register (MR) instructions allow transfer of data between memory and up to eight address registers in the RPIC.

The address values referenced by RSP instructions and the PA, RA, and WA busses point to values in four distinct address spaces depending on the instruction type:

Program memory—target of "jump" and "call" type instructions;

Data memory—target of ALP and PDP data read and write instructions such as "add to accumulator";

I/O space—target of ALP and PDP external data transfers. Used by the "in" and "out" type of instructions;

Configuration space—ALP core cell and interconnect programmable function values. The data required for defining the ALP circuits is addressable in a linear address space for modification by the program. Target of the configuration read and write instructions.

The data memory space is accessed directly in the RSP when the indirect addressing bit of the instruction has a value of "0". In this case, the seven bit address field is concatenated with a "data page" address value in the RPIC to form the complete data memory address. The "data page" value may be changed by a "set page" instruction. Most data memory references are performed using indirect addressing (i bit is "1") In this case, the lower three bits of the address field (field R) references the address register in RPIC to be used and the remaining four bits define the addressing mode (AM) as defined in table 1. R0 represents the contents of address register 0.

TABLE 1

RSP Instruction Address Modes

| AM | Name | Data |
|---|---|---|
| 0 | Register Direct | (R) contents of the register |
| 1 | Register Indirect | MPM [(R)] register is address of data in MPM data space |
| 2 | Auto Increment | MPM [(R++)] increment R after access |
| 3 | Auto Decrement | MPM [(—R)] decrement R before access |
| 4 | Indexed Direct | (R) + (R0) |
| 5 | Indexed Indirect | MPM [(R) + (R0)] |
| 8 | ALPA | Read: MPM [RA]; ALP pipeline supplies read address<br>Write: MPM [WA]; ALP pipeline supplies write address |
| 9 | ALPW | WD; PDP output supplies data to ALP pipeline(s) |
| 10 | ALPR0 | RD; ALP pipeline 0 supplies data to the PDP |
| 11 | ALPR1 | RD; ALP pipeline 1 supplies data to the PDP |

Address modes 0 through 5 represent typical addressing modes and are dependent on the exact structure of the PDP module. Address modes 8 through 11 are unique to the RSP concept of the present invention and are termed Configurable Address Modes (CAM). The ALPA mode allows the address for a memory read or write operation to be supplied by a "RA pipeline" in the ALP for reading and by a "WA pipeline" in the ALP for data writing. The ALPR0 and ALPR1 address modes allow the output of one of two ALP pipelines to be used directly as the operand for an operation in the PDP. The ALPW address mode allows data from the PDP to be used directly as an operand input to one or more ALP pipelines. In addition to the access of the Pipeline Bus Array (PBA) in the ALP by Configurable Address Mode operations, ALP data may be referenced explicitly by MPM to ALP and ALP to MPM transfer instructions. Data transfers may also occur using the Autonomous Pipeline Control (APC) ability explained below. It is noted that although table 1 shows one possible set of register assignments, other assignments may be utilized depending upon the requirements of the ALP core.

General Structure of the Adaptive Logic Processor

Figure 5:
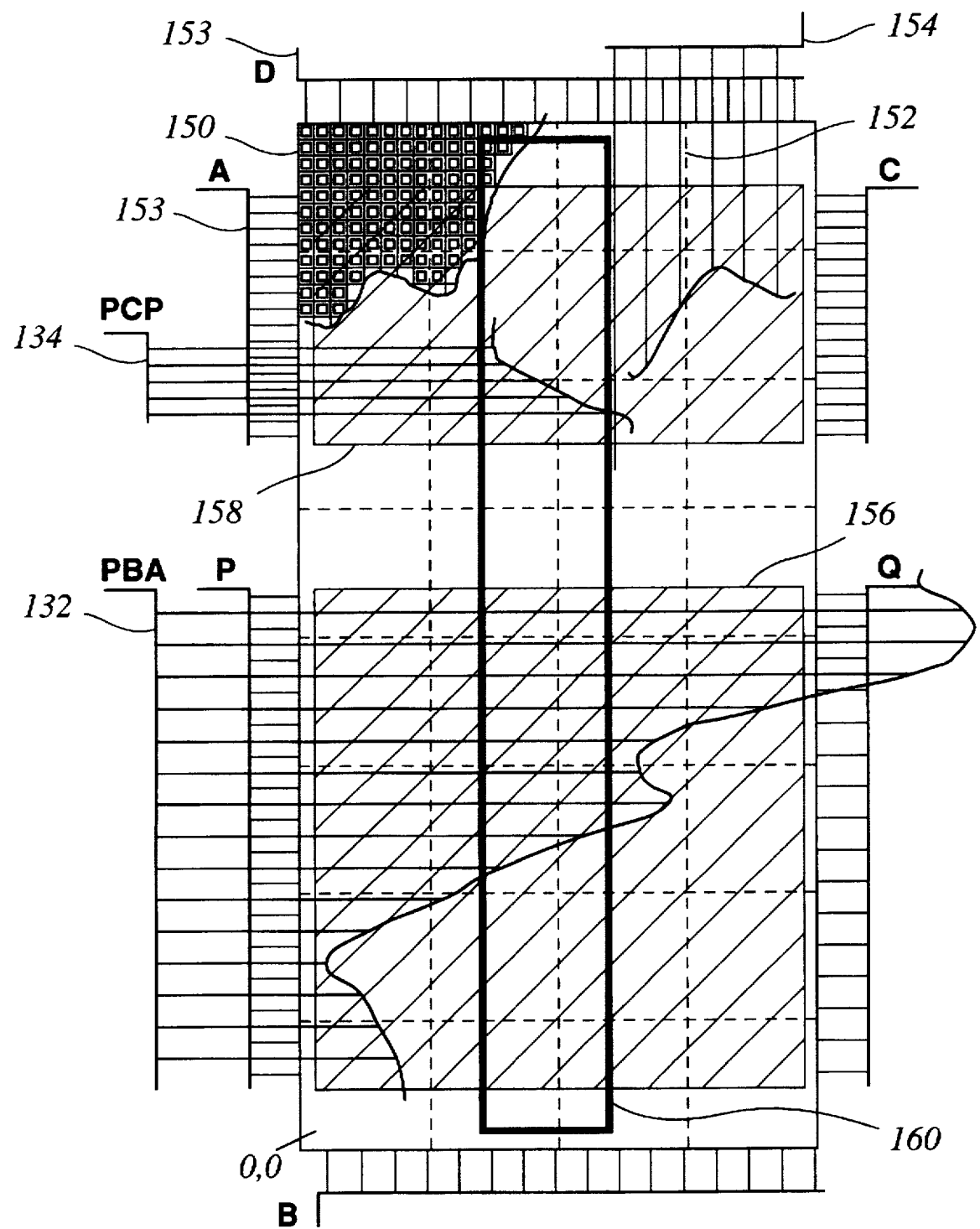
FIG. 5 shows the basic elements of an ALP in an implementation having 32 horizontal cells and 64 vertical cells.

The Adaptive Logic Processor (ALP) consists of an array of programmable logic cells and an array of programmable switches which allow data flow between the cells. These elements form a configurable logic resource which is incorporated in the RSP architecture. The ALP includes the Pipeline Bus Array (PBA) and reconfigurable input/output pins. FIG. 5 illustrates the basic elements of ALP 120 in an implementation having 32 horizontal cells and 64 vertical cells.

In the general case, ALP 120 consists of three circuit layers which perform functions specific to the RSP architecture. The base layer is called the "core cell array" and consists of a two dimensional array of core cell 150 logic circuits. Each of these core cell circuits includes a configuration register which may be loaded under control of the RPIC block when a "reconfiguration" instruction is executed. The value in the configuration register defines the logic function to be performed by the core cell and defines connections for the logic input and output signals of the core cell. The configured function of a core cell is typically a multiple input, multiple output Boolean operation which may include one or more data flip flops. In a typical implementation, some or all of the signals needed to implement the Boolean operation include connections to the nearest neighbor core cells. This represents the lowest level of core cell interconnections.

The second logical layer of the configurable logic array (ALP) consists of signal lines and switches which allow transmission of signal values over a distance of several core cells. This is referred to as a "Local Bus Array". Each core cell may receive input from one or more local bus array wiring segments and may provide data to one or more local bus array segments. Each set of local bus wiring paths span an area termed a "core block" 152 in the figure. The circuits which allow signal interchange between core blocks are called "repeater" circuits (not shown in the figure). Each repeater circuit also includes a configuration register which defines how signals flow from one core block to another. The second logical layer of the configurable logic array also includes means to connect signals in the array to the reconfigurable I/O pin drivers 153 which represent the primary interface to an RSP device. Each pin on the RSP has a programmable interface circuit which is controlled by a configuration register. This allows each pin to have a default meaning (such as one of the input lines from the Toggle Bus) or a reconfigured use (logic input, logic output, or bi-directional tristate bus driver). In the figure, reconfigurable I/O pin resources 153 are shown as the "A", "B", "C", "D", "P", and "Q" lines. Detailed control signals are also typically made available at the periphery of the configurable logic array. In the second logical layer, configurable clock and reset signals are distributed throughout the array to implement the pipeline stages of a typical application.

The third logical layer of the configurable logic array (ALP) implements the Pipeline Bus Array (PBA) 132 and Pipeline Control Ports (PCPs) 134. The signal lines at this layer traverse the entire horizontal extent of the array and partition the array into two logical areas. The PBA lines traverse the "data path" region 156 while the PCP lines traverse the "control" region 158. In the general case, a specific ALP circuit is a rectangular region of the array called a "pipeline segment" 160 which includes a data path which is connected to one or more PBA busses and a control section which connects to one or more PCP line sets. In general, several pipeline segments may reside in the ALP at one time, and any one segment may be reconfigured without affecting the operation of the remaining segments. The process of changing only a portion of the logic array without affecting the operation of the remaining portion is called "partial reconfiguration". Partial reconfiguration allows the development software to optimize the utilization of the configurable logic resource. The connection of the core cell and local bus signals to the PBA and PCP signals is performed by horizontal repeater circuits which allow direct connection of a local bus segment to any of the possible PBA bit lines which transverse the row of the array. This allows a pipeline segment to be relocated to any horizontal position in the array without the need for additional signal routing. This relocatable feature drastically simplifies the automatic generation of the configurable logic circuits needed to perform a computation.

Each core cell 150 of ALP array 120 may be programmed to implement any of a large number of logic functions. These include logic AND, OR, XOR, multiplexer, and flip-flop operations. As noted, the periphery of the core cell array allows connection to the programmable I/O pins 153 on a RSP chip. Each core cell may be programmed (by means of the programmable interconnection switches) to access one or two signals from the four neighboring core cells. Each core cell may also receive data or transmit data on a Local Bus Array (LBA) segment (shown in the figure using dashed lines). As noted, the LBA connections for a subset of the core cells form what was referred to as a core block. Superimposed on the core cell and LBA network is the Pipeline Bus Array (PBA) 132, carrying signals which cross the entire array in the horizontal direction. As noted, circuits called "repeaters" allow the LBA data to be extended to neighboring blocks, the programmable I/O pins and the PBA. A set of programmable clock and reset signal generators 154 traverse the array in the vertical direction. These signals allow each column to operate as a pipeline stage in the array. The PBA data lines 132 allow connection to the RD, WD,RX, WX, RA, and WA busses in the RSP. The PCP control lines 134 represent programmable control and status lines which are connected directly to the RPIC for ALP pipeline control. FIG. 5 illustrates the typical area used by a programmable pipeline segment 160 of a computation. Each pipeline segment consists of a number of pipeline data path stages in the "pipeline data path" area 156 of the ALP and the associated pipeline control circuitry in the "pipeline control area" 158.

As noted, a unique feature of the ALP is that the LBA to PBA connection definitions in the pipeline segment configuration block allow the pipeline segment to be located at any horizontal location in the ALP. This allows current unused pipeline segments to be overlaid with new pipeline segments as needed by the current task in the application program. In a RSP based system, the detailed configuration and programming of the needed pipeline segments is created during the program compilation process. The data needed to configure a pipeline segment is called a Configuration Block (CB). CB data is stored in the program address space of the RSP and is loaded into the ALP using configuration control instructions.

RPIC General Concepts

The Reconfigurable Pipeline Instruction Control (RPIC) is responsible for maintaining the order of instruction execution using the Program Address bus lines (PA), receiving instructions to be executed from the memory using the Read Program (RP) bus lines, and coordinating the pipeline data flow on the Pipeline Bus Array. RPIC also executes instructions received from the Toggle Bus Transceiver to implement parallel processing structures. As noted, the remaining six busses (see FIG. 3) form the Pipeline Bus Array (PBA) which allows concurrent data flow between the parallel processing interconnect structure (TBT), the configurable logic resource (ALP), the memory resource (MPM), and the scalar processor (PDP). In the general case, the PBA may have more or less busses than shown but should include at least one data address bus, one internal data bus connection to the scalar processor, one bus connection to memory, and one connection to the parallel processing interconnect structure. In the example being discussed, the PBA consists of six busses for memory read address (RA), memory write address (WA), Toggle Bus data input (RX), Toggle Bus data output (WX), read data (RD), and write data (WD). The RD and WD busses are each split into two separate busses internal to the ALP block. This allows separate data flow between the ALP block, the memory block, and the scalar processor. In the general architecture case, additional busses may be added to the PBA, including for example, the program address (PA) and read program (RP) busses.

The pipeline control block interacts with the scalar processor to execute standard instructions using traditional pipeline control concepts. The RPIC block interacts with the configurable logic resource using a set of lines called the Pipeline Control Ports (PCPs). Each PCP allows a configurable logic circuit in the ALP to interact with the pipeline data streams external to the configurable logic. Typically, there is one PCP set of control signals for each Pipeline Bus Array bus. The basic operations of each Pipeline Control Port which are common to implementations of the RSP architecture are:

Function Request: The RPIC detects instructions in the program that are to be executed by the circuits in ALP as opposed to execution in the PDP scalar processor. The RPIC indicates this condition to the ALP circuit by changing a signal in the PCP. If the ALP circuit is not ready for the instruction, RPIC will stall the instruction execution pipeline. Note that RPIC does NOT wait for the completion of an instruction execution in the ALP because a typical ALP function requires several clock cycles. In contrast, RPIC may initiate a new function execution on each clock cycle. This is the typical case for the implementation of the deep pipelines in an application. The function execution control capability is also used to implement the instruction set extension capabilities for an application.

Program Data Request: This type of transfer is performed when a scalar instruction references an ALP bus as the address for data in memory or as the data for an instruction. These are referred to as "configurable address modes". For example, the output of an ALP pipeline may be used directly as the operand for an "ADD" instruction in the scalar processor. Alternately, data may be transferred directly to an ALP circuit from the scalar processor using this mechanism. Finally, the scalar processor instruction may use the output of an ALP pipeline as the address for a memory read or write operation. The RPIC block maintains the order of data transfer by injecting wait cycles as needed to maintain proper pipeline operation. The program data request control mechanism is used to implement instruction set enhancement and complex address generation capabilities for an application.

Autonomous Data Request: An ALP circuit may request data transfers to/from the memory resource and to/from the Toggle Bus transceiver independent of the program instruction sequence. These are called "autonomous" data transfers. In a typical case, all of the computation in a cluster of RSP devices is performed using the autonomous data transfer mechanism with no instruction execution for the detailed steps. To output data to memory or the Toggle Bus, the ALP circuit asserts a PCP signal to RPIC requesting an output transfer. The RPIC block then takes care of the necessary steps to write the data to memory or output the data through the Toggle Bus. If the desired resource is "busy", the ALP circuit must stall further operations until the PCP signal indicates that the resource is available. Similar interaction occurs for memory data read and Toggle Bus data read operations. Autonomous data transfers are used to implement pipeline chaining from one RSP device to another through the Toggle Bus. The autonomous transfer mechanism is also used to allow direct access to the memory resource by one or more stages in a deep pipeline structure.

In the general case, the Pipeline Control Port (PCP) typically includes additional signals. For the example RSP implementation being discussed, the following additional operations are supported:

Pipeline Condition: The configurable logic circuit generates one or more status condition signals which may be monitored by the instruction execution stream using "conditional jump" instructions. This capability is used as part of the normal computation process to select alternative instruction flow streams.

Pipeline Interrupt: The configurable logic circuit generates an interrupt request to the RPIC block which causes a specific software subroutine to be executed. The interrupt is acknowledged by the execution of a function request instruction to the PCP which generated the interrupt request. This mechanism allows the ALP circuit to use the scalar processor as a sub-processor to the configurable logic. This capability is also used to implement input/output device dependent computations.

As noted, the Reconfigurable Pipeline Instruction Control (RPIC) unit in the RSP is responsible for controlling program execution, coordinating the activities of data flow between the processing units, and configuration of the programmable circuits in the ALP. The basic functional operations of the RPIC may be divided into five categories:

Power on initialization—setting the control logic flip-flops and programmable logic to default conditions. This process may also be initiated after power up initialization by activating an external configuration enable signal or by the execution of the "REBOOT" instruction.

Dynamic reconfiguration—RSP instructions allow all or a portion of the ALP circuits to be changed while the program is executing.

Program flow—reading the required sequence of instructions for the application program from the MPM. This also includes the execution of "jump" and "call" instructions which change the current program address register (PAR) value.

MPM data access—generates the addresses for data read and write to the MPM. The Configurable Address Modes (CAM) allow the RPIC to use addresses generated by ALP pipeline segments.

Pipeline synchronization—data flow in the ALP, MPM, PDP, and TBT are treated as independent pipeline chains. RPIC forces the pipeline stall condition by inserting wait states in any situation in which the data is not available on a particular clock cycle.

Figure 6:
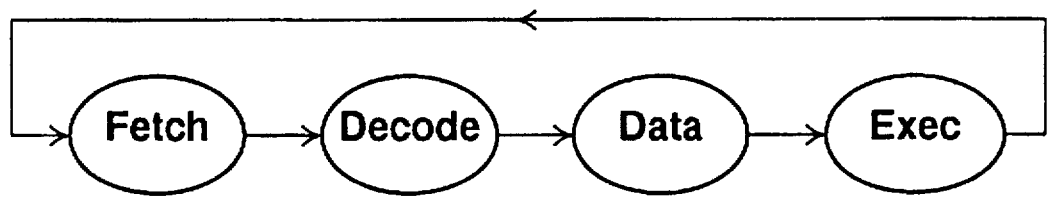
FIG. 6 shows the classic Von Neumann instruction execution sequence which is implemented by the ALP.

For the following discussion, the operation of the pipeline in the PDP is assumed to be based on the classic Von Neumann instruction execution sequence as shown in FIG. 6. So long as there is no conflict, a new instruction is read in the "Fetch" state on each clock cycle. Each instruction then proceeds through the "Decode" state on the next clock cycle. For normal PDP instructions (such as add to an accumulator), the data is read from the MPM on the third clock cycle of the instruction and then the instruction is finally executed on the fourth clock cycle. Program initiated instruction execution in an ALP pipeline segment uses the same scheme up to the point at which the instruction is executed. ALP pipeline segments generally require an additional execution clock cycle for each pipeline stage in the segment. RPIC does not wait until the data has progressed through all stages of an ALP pipeline. When an instruction is executed which refers to an ALP pipeline bus usage, RPIC will stall the instruction sequence pipeline until the pipeline segment control circuit in the ALP indicates the "pipeline ready" condition. RSP instructions that read data from the ALP and the Configurable Address Modes similarly require the "ready" signals from the configurable pipeline control circuit before proceeding with the operation.

RPIC is also responsible for the coordination of the Autonomous Pipeline Segment (APS) operations. Any ALP pipeline segment may be designed to operate independent of the normal program execution sequence. That is, an APS does not require instruction execution to proceed through the pipeline sequence. APS type circuits are used primarily for asynchronous interfaces to external sensors and actuators, but are also used for the Toggle Bus control of the C vector for the bus master RSP component in a SIMD array. The "ready" signal interface is then used by the RPIC to synchronize program execution with APS operation.

As noted, the control interface between the RPIC and pipeline segments in the ALP is based on a protocol called the Pipeline Control Port (PCP). For a specific RSP implementation several PCPs may be active in the ALP at one time up to a maximum number. The RPIC/ALP control interface consists of a set of Pipeline Bus Array (PBA) signals (which form the PCP signals) which traverse the extent of the control section portion of the ALP. This control interface is illustrated conceptually in FIG. 7, which shows the control interface between the RPIC and ALP modules, and the signals (labelled PCPj in the figure) needed for each pipeline control port (PCP). For this discussion, an RSP component with at most eight PCPs is assumed. The function of each of the pipeline control ports is summarized in table 2.

TABLE 2

Example Functional Pipeline Set

| Number | PCP Name | Port Function |
|--------|----------|---------------|
| 0 | PSA | General Pipeline Segment 0 |
| 1 | PSB | General Pipeline Segment 1 |
| 2 | PSRA | Read Address Pipeline segment |
| 3 | PSWA | Write Address Pipeline segment |
| 4 | PSRD | Read Data Pipeline segment |
| 5 | PSWD | Write Data Pipeline segment |
| 6 | PSWX | Write External Data pipeline segment |
| 7 | PSRX | Read External Data pipeline segment |

Figure 7:
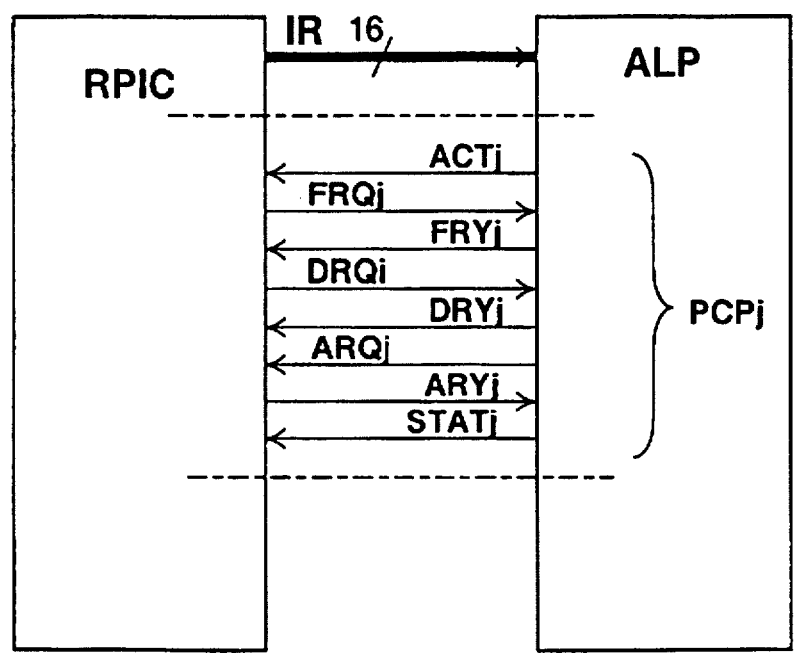
FIG. 7 shows the control interface between the RPIC and ALP modules, and the signals needed for each pipeline control port (PCP).

The PSRA, PSWA, PSRD, and PSWD control ports are used to implement the configurable address mode operations. The PSWX and PSRX control ports allow implementation of autonomous pipelines for data transfers through the Toggle Bus. The PSA and PSB control ports do not have a committed functional meaning. More than one control port may be combined to form one logical control port with separate controls for different operations within that segment. For example, the ALP circuit implementation may combine the PSRA and PSWA control ports so that the same circuit is used to generate both read and write addresses. RPIC delivers all 16 bits of the instruction register to the ALP. The ALP control circuits then decode all or a portion of the word to specialize the operation for a specific instruction or to extend the number of functions performed by a single pipeline segment. As noted, FIG. 7 illustrates the six signals needed for each pipeline control port (PCP):

ACTj Active pipeline segment—when asserted LOW by the ALP control circuit for this pipeline port, this signal indicates that the pipeline port is active and will respond to the other RPIC port controls. If this signal is left HI, then the port control circuit is not available and RPIC will generate an illegal instruction trap if the program attempts to reference this pipeline port. This is used to debug application programs.

FRQj Function Request to port j—active LOW signal indicates to the ALP control circuit that the IR (instruction register) word is valid and that the control circuit should begin execution of the instruction.

FRYj Function Ready for port j—active LOW signal indicates that the ALP control circuit has taken the instruction requested by the FRQj signal. RPIC will not issue another instruction to the ALP until this signal is asserted LOW.

DRQj Data Request for port j—active LOW signal indicates that RPIC has data available for a write function or is requesting data output for a read function. This corresponds to the "data" state in the normal pipeline instruction execution sequence.

DRYj Data Ready for port j—active LOW signal indicates that the ALP control circuit has data available to be read or has taken the write data in as an input. For data transferred to ALP, RPIC will stall a subsequent data request until this signal is asserted LOW. For data transferred from ALP, RPIC stalls the instruction pipeline until this signal is asserted indicating valid ALP output.

ARQj Autonomous Request j—active LOW signal indicates that the ALP control circuit is requesting an autonomous data transfer on the associated data bus.

ARYj Autonomous Ready for port j—active LOW signal from RPIC to the pipeline control circuit. Indicates that the requested transfer is complete.

STATj Status for port j—RPIC uses this signal to implement conditional jump instructions which depend on the current condition of the pipeline segment. The meaning of the status signal is ALP circuit dependent and corresponds to a useful condition in the application. For example, the STAT signal may indicate that external data is available, arithmetic overflow and so forth. The STAT signal for a control port may be programmed by the configuration sequence to implement an asynchronous interrupt to RPIC.

For general pipeline segments in the ALP, normal configurable ALP instruction execution requires the use of both the FRQ/FRY and DRQ/DRY controls. Data to and from pipelines used for configurable address modes require only the DRQ/DRY control signals. Autonomous pipelines use the ARQ/ARY signals.

Figure 8:
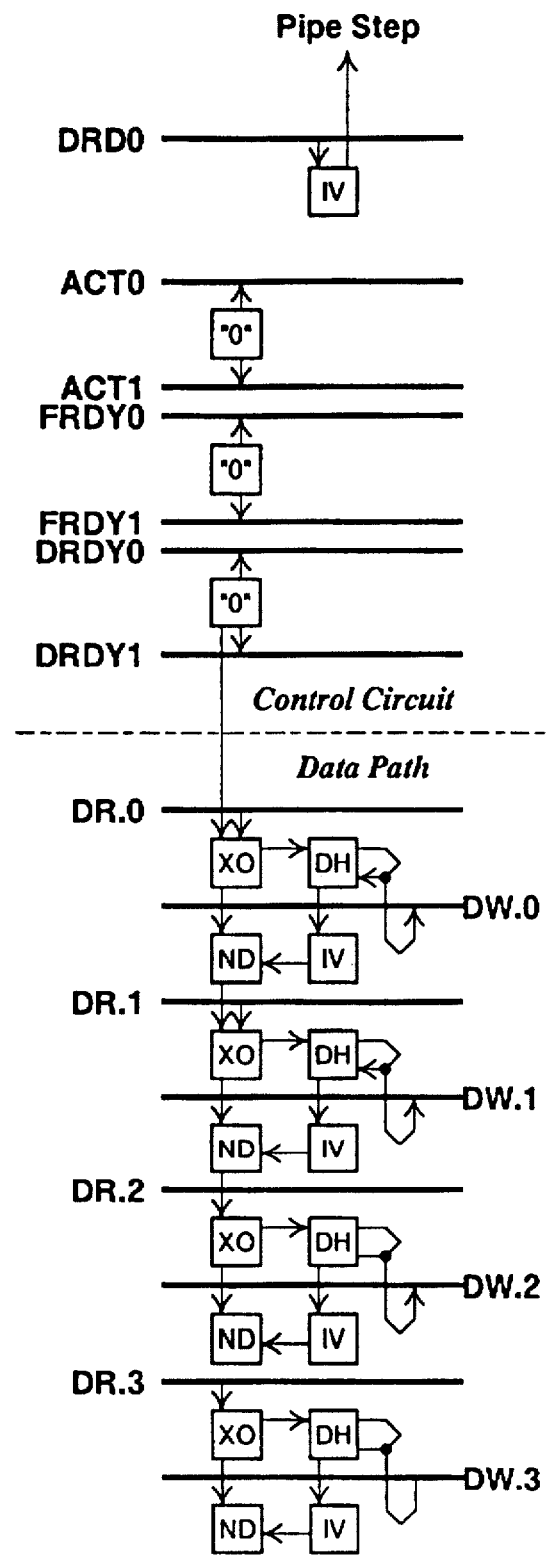
FIG. 8 shows an application pipeline segment which performs an add/accumulate function.

FIG. 8 shows an application pipeline segment which performs an add/accumulate function. This pipeline has one stage so that the pipeline function is performed in one clock cycle. The segment uses two PCPs, one for data input and one for data output. The ACT0 and ACT1 lines are driven LOW to indicate that the PCPs are active. The function is always ready for both ports so the FRY0 and FRY1 lines are also driven LOW. Similarly, the pipeline segment is always available to add a new value and output a value so the DRY0 and DRY1 signals are also driven LOW. Each time a "load ALP" instruction is executed, the DRQ0 signal is strobed to indicate that new data is available. This signal is then used to enable the pipeline clock for the pipeline register column.

The RPIC unit includes configuration registers which indicate the capability of each pipeline control port. The control bits for each PCP are shown in table 3:

TABLE 3

RPIC Control Register Bits for PCP Control

| PCP Control Bit | Meaning |
| --- | --- |
| j+0 | Active pipeline control for this port; this is a redundant indication that a pipeline control circuit exists for this port. The RPIC requires this bit to be set as well as the ACT signal to enable pipeline action. |
| j+1 | Interrupt enable -- status signal for this port is an active LOW interrupt signal. This signal will cause the RPIC to suspend the current program execution and execute an interrupt service routine associated with the interrupt number for this port. The pipeline control circuit must clear the interrupt request in response to an instruction execution using the FRQ/FRY control signals. |
| j+2 | Pipeline Segment type:<br>0    indicates an instruction synchronized pipeline segment.<br>1    indicates that this is an autonomous pipeline segment. |
| j+3 | Valid status -- indicates that the PCP status line is driven as a valid status condition for conditional instructions. |

The operation of autonomous pipelines depends on the PBA data bus used by the pipeline which is defined by the port number. An autonomous port may be combined with other ports to create a complex pipeline segment control interface.

Table 4 illustrates an example set of autonomous transfers for each control port. The PSWX and PSRX autonomous pipelines may be used to chain pipelines from one RSP component to another. The PSRD and PSWD autonomous pipelines are normally used for pre-processor and post-processor data manipulations for computations under instruction control in the PDP. The operations are synchronized using the instruction initiated DRQ and DRY controls for the associated pipeline. The PSA and PSB autonomous transfers are typically used for sensor data input and actuator control requiring high speed data transfers that can be performed as a "background" activity relative to the current program execution task. For example, a block of data is read to the MPM while a previous block is being processed by the program. The "fork" and "join" concepts of parallel processing are used to synchronize the autonomous and program execution tasks. The PSRA and PSWA autonomous pipelines are used to implement the equivalent of "direct memory access" (DMA) transfers through the toggle bus.

TABLE 4

Autonomous Pipeline Data Transfers

| Number | PCP Name | Autonomous Transfer |
| --- | --- | --- |
| 0 | PSA | General Pipeline Segment 0; I/O write pipeline action from the MPM to reconfigurable input/output lines (such as the A or B bus). The RA bus defines the address for the data. ARY is asserted when the data is available and ARQ is dropped when the data has been taken. |
| 1 | PSB | General Pipeline Segment 1; I/O read pipeline action from a reconfigurable input/output bus (such as the A or B bus) to the MPM. The WA bus defines the address for storing the data. ARY is asserted when the data has been written |
| 2 | PSRA | Read Address Pipeline segment; ARQ for this port initiates a data transfer from the MPM to the Toggle bus. ARY is asserted LO when the transfer is complete. |
| 3 | PSWA | Write Address Pipeline segment; ARQ for this port initiates a data transfer from the Toggle Bus to the MPM write address location. ARY is asserted LO when the transfer is complete. |
| 4 | PSRD | Read Data Pipeline segment; The RA address bus supplies the address for an MPM read operation. ARY is driven LO when the data is available to the ALP. The ALP control circuit must release the ARQ request signal when the data is taken. |
| 5 | PSWD | Write Data pipeline segment; The WA address bus supplies the address for an MPM write operation. ARY is driven LO when the data has been taken the ALP. The ALP control circuit must release the ARQ request signal when the data is taken. |
| 6 | PSWX | Transfer data to the Toggle Bus unit; ARY indicates that the data has been taken by the Toggle Bus. |
| 7 | PSRX | Read External Data from the Toggle Bus to the pipeline segment. ARY is driven LO when data is available from the TBT to the ALP. The ALP control circuit must release the ARQ request signal when the data is taken. |

The Toggle Bus controls for the autonomous transfers that reference the TBT are defined by registers in the RPIC unit. The values of these registers are defined by normal instruction execution. RPIC executes a set of instructions to synchronize the ALP pipeline processing capability with the arithmetic processing capabilities of the PDP and the input/output transfers. Eight major instructions are used for this purpose, one for each pipeline control port. Additional instruction register (IR) bits may be decoded by the ALP control circuit to create a large set of application dependent instructions. The direct instructions for this purpose are illustrated in table 5 for the example set of pipeline data paths.

CDn lines) and the four configuration lines on the "south" side (the CDs lines). This supplies eight bits of configuration data to a core cell in one step. Each core cell is addressed as an x/y location in the array by conjunction of the CSL (column select low) vertical line and the RS (row select) horizontal line to load the low byte of the configuration for the cell. The high byte of the configuration is set by the combination of the CSH (column select high) and the RS line. Each column of core cells uses a common clock (CLK) and reset (RST) line which is controlled by circuits at the top and bottom of the array as will be described in the next section.

Figure 10:
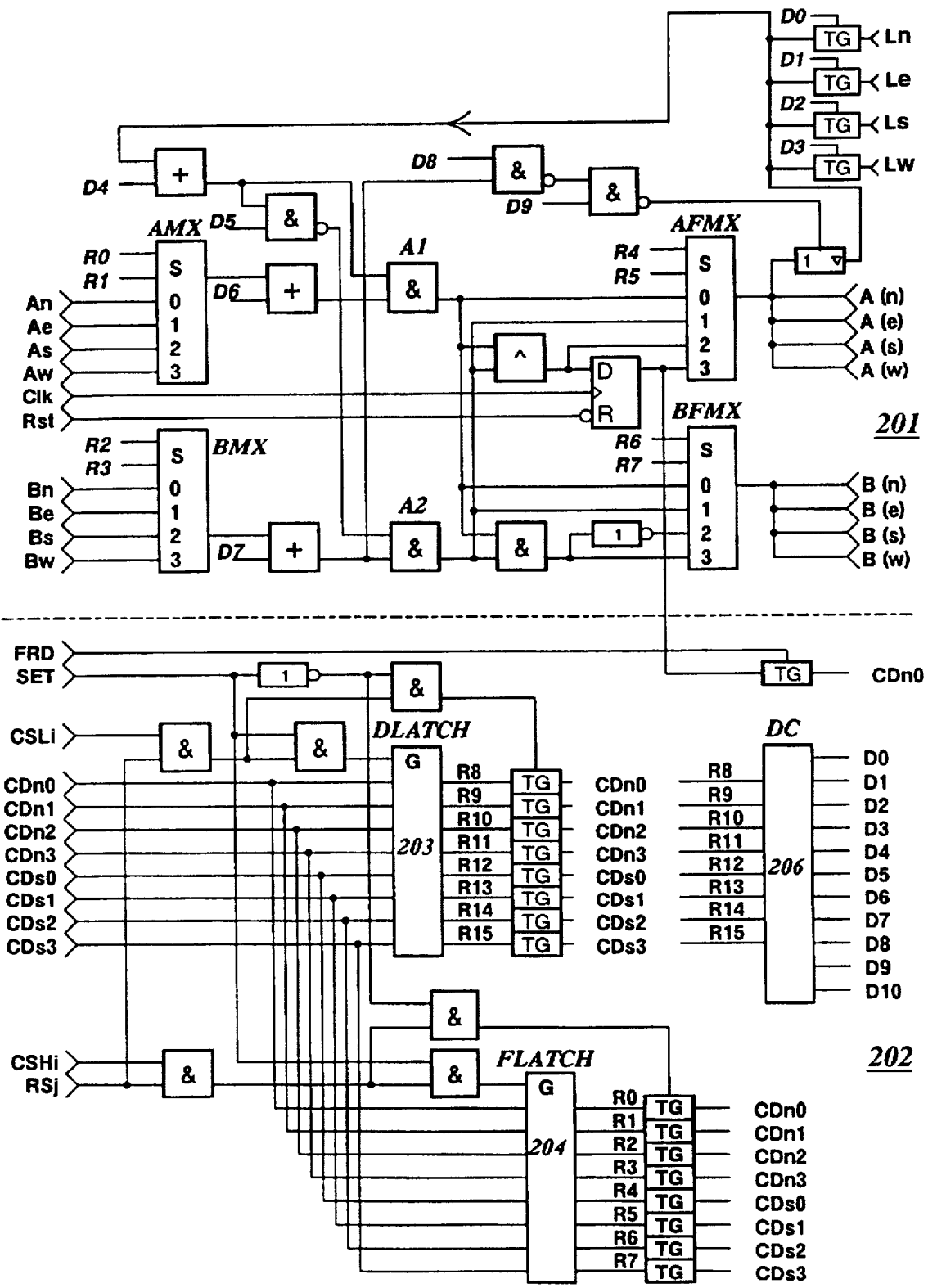
FIG. 10 shows an example circuit for implementing an ALP core cell.

FIG. 10 shows an example circuit for implementing a ALP core cell. This circuit is the functional equivalent of the

TABLE 5

Example Pipeline Control Instructions

| Op Code | Parameter(s) | Instruction Function |
|---|---|---|
| PCj | 4-bit function | Pipeline Control for port j; the pipeline control circuit initiate one of sixteen functions to be performed in response to the instruction. |
| PFS | MPM address | Read ALP pipeline register value to memory |
| PRA | MPM address | Transfer data from MPM to ALP using RD bus, RA segment |
| PWA | MPM address | Transfer data from ALP to MPM using WD bus, WA segment |
| PRD | MPM address | Transfer data from MPM to ALP using RD bus |
| PWD | MPM address | Transfer data from ALP to MPM using WD bus |
| PWX | — | Transfer ALP data to TBT using WX bus |
| PRX | — | Transfer TBT data to ALP using RX bus |

Data transfers between the PDP and ALP are always synchronized using the configurable address mode capability. The PFS instruction allows a contiguous set of pipeline flip flop values to read to a memory location. The row/column address of the read in the array is contained in the RPIC configuration address register which may be set by a configuration control instruction.

Detailed ALP Array Concepts

The core cell array of the ALP is symmetric but the pipeline bus structure is optimized for implementing multiple stage pipelined data paths. Vertical clock and reset lines allow control of pipeline stages with reduced power dissipation by using a clock enable scheme (a column clock or reset line is strobed only if the column clock enable or reset enable signal is active). A design for the core cells and the overall array which is suited for use in the RSP architecture is the previously mentioned CLAy family of configurable logic array chips produced by National Semiconductor Corporation of Santa Clara, Calif. Other configurable logic resources having the required functionality (or capable of being modified to have such) may be used for purposes of the present invention.

In the RSP architecture, the global clock and gated clock modes of the CLAy array are preserved so that the ALP may be used to control external sensor/actuator devices. The enabled clock and reset scheme is the preferred approach for reconfigurable pipeline applications. The PBA lines run orthogonal to the clock lines and allow direct access to the pipelined bus resources of the RSP internal memories (MPM), Toggle Bus Transceiver (TBT), and Pipelined Data Processor (PDP).

Figure 9:
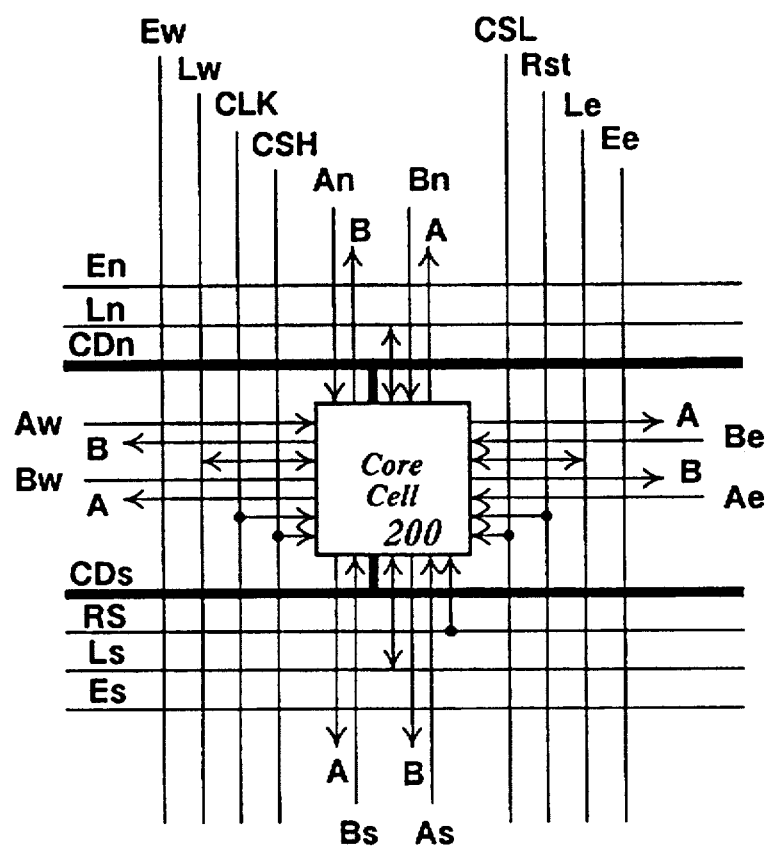
FIG. 9 shows the detailed interface for an ALP core cell.

The detailed interface for an ALP core cell 200 is shown in FIG. 9. In normal operation, the "A" and "B" lines provide nearest neighbor signal flow between the core cells. Each core cell 200 may connect to one or two local bus segments on the four sides (labelled as Ln, Le, Ls, and Lw in the figure). Configuration data for a core cell is read from the four configuration data lines on the "north" side (the CLAy core cell. The circuit logic consists of two sections: (1) a configuration data circuit 202 which defines the cell function and input connections and (2) a function circuit 201 which performs the operation defined by the configuration data.

The configuration logic for a core cell consists of a 16-bit register (DLATCH 203 and FLATCH 204) and a configuration decoder circuit (DC) 206. The output of the configuration register and decoder are used to select the functional signal paths for the function to be performed by the core cell. For example, configuration register bits R0 and R1 are used to select the "A" logic input to the cell from one of the four neighbor cells. The lower eight bits of the configuration register are loaded by first asserting the CSL and SET signals. The row select signal (RS) is then strobed to load the data bits. The upper eight bits are similarly loaded using the CSH signal instead of the CSL signal. The current configuration data value may be read from the CD lines by setting the CSH or CSL signals low. The current value of the core cell flip flop may be read by asserting the FRD signal. This allows the application program to directly read a pipeline register value.

Enabled Clock and Reset Lines

The implementation of a clock and reset enable scheme simplifies the construction of pipeline chains, reduces the size of each pipeline stage, and reduces power since a column clock is strobed only when the enable signal is asserted (nominally an active HI value). This allows the implementation of a global pipeline stall capability. An ALP controlled signal called PIPEN may assert STALL to disable clock action on all columns which are clock and/or reset enable controlled. The PIPEN signal does not affect the columns which use global clock/reset or gated clock/reset controls.

Implementation of the clock/reset enable scheme requires extension of the clock/reset column control signals at the top and bottom periphery of the array. The difference is that each flip-flop element on a clock enabled column is loaded only when the column clock enable signal is asserted by the ALP control circuit and the PIPEN signal is asserted. All flip-flop elements (flip-flop configurations of a core cell) are affected in the same way. The column reset may similarly be enabled by an ALP controlled reset enable signal.

Figure 11:
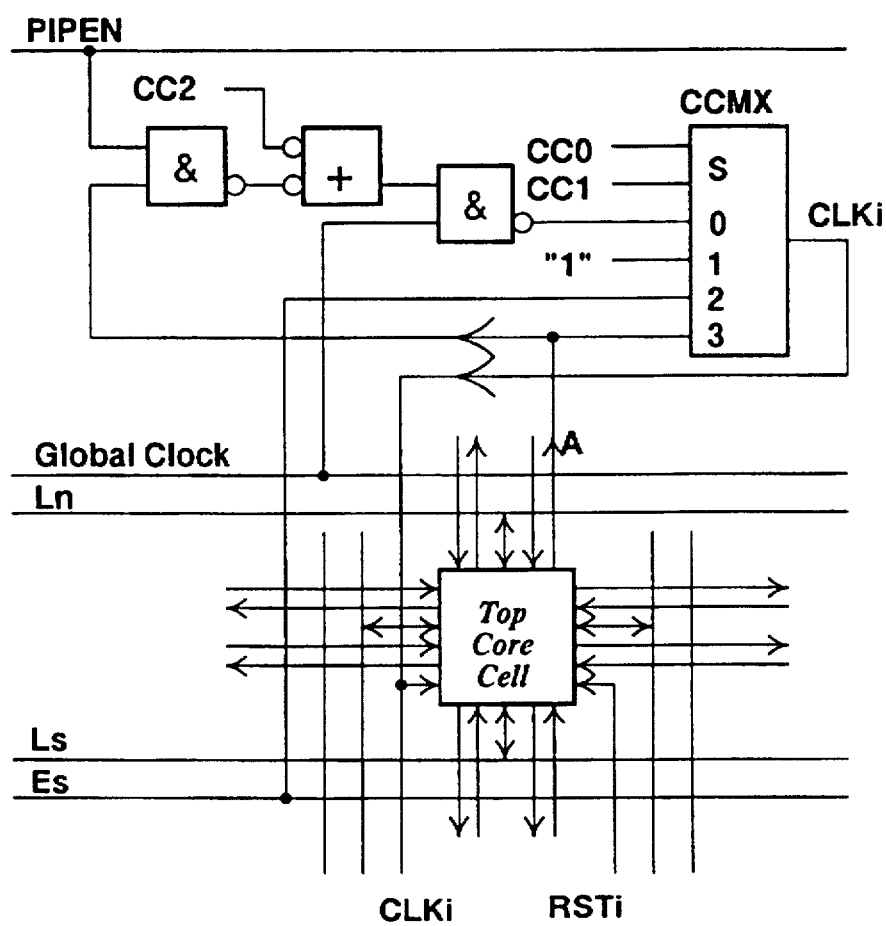
FIG. 11 shows an example circuit for the column clock line of an ALP cell.

FIG. 11 shows an example circuit for the column clock line of an ALP cell. The CC0, CC1, and CC2 configuration signals control the column clock action. When CC0=1 and CC1=0, the column clock is disabled. When CC0=1 and CC1=1, the column clock is the "A" output of the top cell of the column (this is the gated clock configuration). When CC0=0 and CC1=1, the column clock is driven by the south local bus segment of the top row. When CC0=0 and CC1=0, the clock is derived from the global clock signal and controlled by the CC2 configuration control signal and the PIPEN control. When CC2=0, the column clock is strobed by the global clock on each clock cycle. When CC2=1, the column clock is strobed by the global clock only when the "A" output of the top cell is asserted. This is the pipeline clock enable case. The pipeline clock may be globally disabled by the PIPEN signal which will cause all pipelines in the array to stall.

Pipeline Bus Array

The Pipeline Bus Array (PBA) allows a pipelined data path design to access the memory address and data lines of the RSP without the need for routing signals to the periphery of the array. This is a key feature of the RSP for efficient use of the ALP. The PBA concept is based on two observations of the use of the CLAy devices common to most SRAM based FPGAs: (1) there is an extensive wiring network (8 wires per column) used for configuration data distribution which is not used when the array is running an application; and (2) the MODGEN function set indicated that all data flow operators of interest could be economically implemented using a "pitch 2" data flow structure. The use of the PBA allows the development of pipelined dynamic primitives which may be loaded to any block position in the ALP without the need for additional routing. Several MODGEN created pipelined blocks may be loaded in different order in the ALP and perform useful functions in the system with "automatic global routing" provided by the PBA connections and the use of neighbor butting connections. This allows thousands of pipeline structures to be implemented based on a base library of generated functions. Reconfigurable logic that does not participate in the RSP reconfigurable pipeline structure do not use the PBA, and the PBA in no way restricts the usage of the ALP for this purpose.

The implementation of the PBA requires several enhancements to the CLAy structure (or the ability of whatever SRAM based FPGA core cell architecture is used to be modified so as to operate as described) but does not affect the design of the core cell:

The configuration data paths must be orthogonal to the clock/reset line network. This requires the use of a three metal layer fabrication process.

The horizontal repeater (HR) circuits are extended to allow reading and driving of any of the eight PBA lines for each row in the array. Four of the PBA lines per row are pipelined bus bits (DR,DW and so forth). The other four PBA lines per row have no dedicated meaning in the RSP block interface and are used for global busses within the ALP. The drivable lines per row may be driven by Tristate drivers to implement a bi-directional bus structure. Note that PBA resources are available only in the horizontal direction so that implementing the PBA concept only affects the horizontal repeater circuits.

A global CFG line is distributed throughout the horizontal repeater array to allow the disconnect of PBA drivers during a configuration sequence.

Circuits are added to the left and/or right side of the array to allow switching of the GBA lines from the configuration data distribution mode to the pipeline data path settings. Additional switches are used to allow ALP output data to be used as a "phantom I/O" data source for PDP instructions. This facility allows any PDP core instruction to access an output of the ALP as an address or data element as part of normal instruction execution. These capabilities are referred to as "configurable address modes" (CAM) in the RSP architecture scheme.

Table 6 shows an example list of PBA usage in the ALP. Note that odd and even rows have different PBA usage to support the pitch 2 concept (consecutive word bits are separated by an intermediate core cell). Note that FIG. 8 illustrates a dynamically relocatable add/accumulate pipeline block using the PBA as the data source (DR bus) and a second PBA bus (DW) for the pipeline output. This block (and hundreds of thousands like it) can be placed in any horizontal position of the ALP without the need for additional wiring resources. This simplifies the problem of placement and routing for reconfigurable computing systems. The general relocatable pipeline block, which is called a "pipeline segment" includes the control circuitry which is associated with the data flow operator. The segment control circuit interacts with the RPIC unit as previously described. For this discussion, the control circuitry is assumed to be inherently bound with the data flow. This is accomplished by using additional PBA resources in the control portion of the ALP for instruction decode, status response and inter block control communication. These signals taken together form the set of Pipeline Control Ports (PCPs).

TABLE 6

Example PBA Assignment, ALP Data Path Section

| PBA Line | Even Row | Odd Row | Comments |
| --- | --- | --- | --- |
| n0 | R-F | R-F | Read pipeline flip-flops using FRD facility |
| n1 | R-RD | W-RD | Read and write the RD Bus |
| n2 | R-RA | R-WA | Read Address and Write Address values |
| n3 | R | W | ALP data flow only |
| s0 | R-WD | W-WD | Read and write the WD Bus |
| s1 | R | W | ALP data flow only |
| s2 | R-RX | W-WX | External RX and WX Data Busses |
| s3 | R | W | ALP data flow only |

The distribution of the instruction register (IR) data and pipeline control port (PCP) signals in the control area of the ALP is based on a different approach, as shown partially in table 7.

TABLE 7

Example PBA Assignment, ALP Control Section

| ROW | PBA Line | Signal | Comments |
|---|---|---|---|
| j | n0 | R-IR0 | Instruction Register bit0 |
|   | n1 | W-FRQ0 | Function Request PCP0 |
|   | n2 | W-FRQ1 | Function Request PCP1 |
|   | n3 | R/W | ALP data flow only |
|   | s0 | R/W | ALP data flow only |
|   | s1 | W-FRQ2 | Function Request PCP2 |
|   | s2 | W-FRQ3 | Function Request PCP3 |
|   | s3 | R/W | ALP data flow only |
| j+1 | n0 | R-IR1 | Instruction Register bit1 |
|   | n1 | W-FRQ4 | Function Request PCP4 |
|   | n2 | W-FRQ5 | Function Request PCP5 |
|   | n3 | R/W | ALP data flow only |
|   | s0 | R/W | ALP data flow only |
|   | s1 | W-FRQ6 | Function Request PCP6 |
|   | s2 | W-FRQ7 | Function Request PCP7 |
|   | s3 | R/W | ALP data flow only |

In this scheme, the FRQ signals for all PCPs are contained in two consecutive rows. The FRY signals for all PCPs are contained in the next two rows and so forth. This pattern is continued for all of the PCP controls and the instruction register bits. The entire control area of the ALP requires 16 rows for eight PCP sets. The PBA lines which are not in the data flow area or control flow area may be assigned for use by other RSP control and data signals.

Core Block Structure

Figure 12:
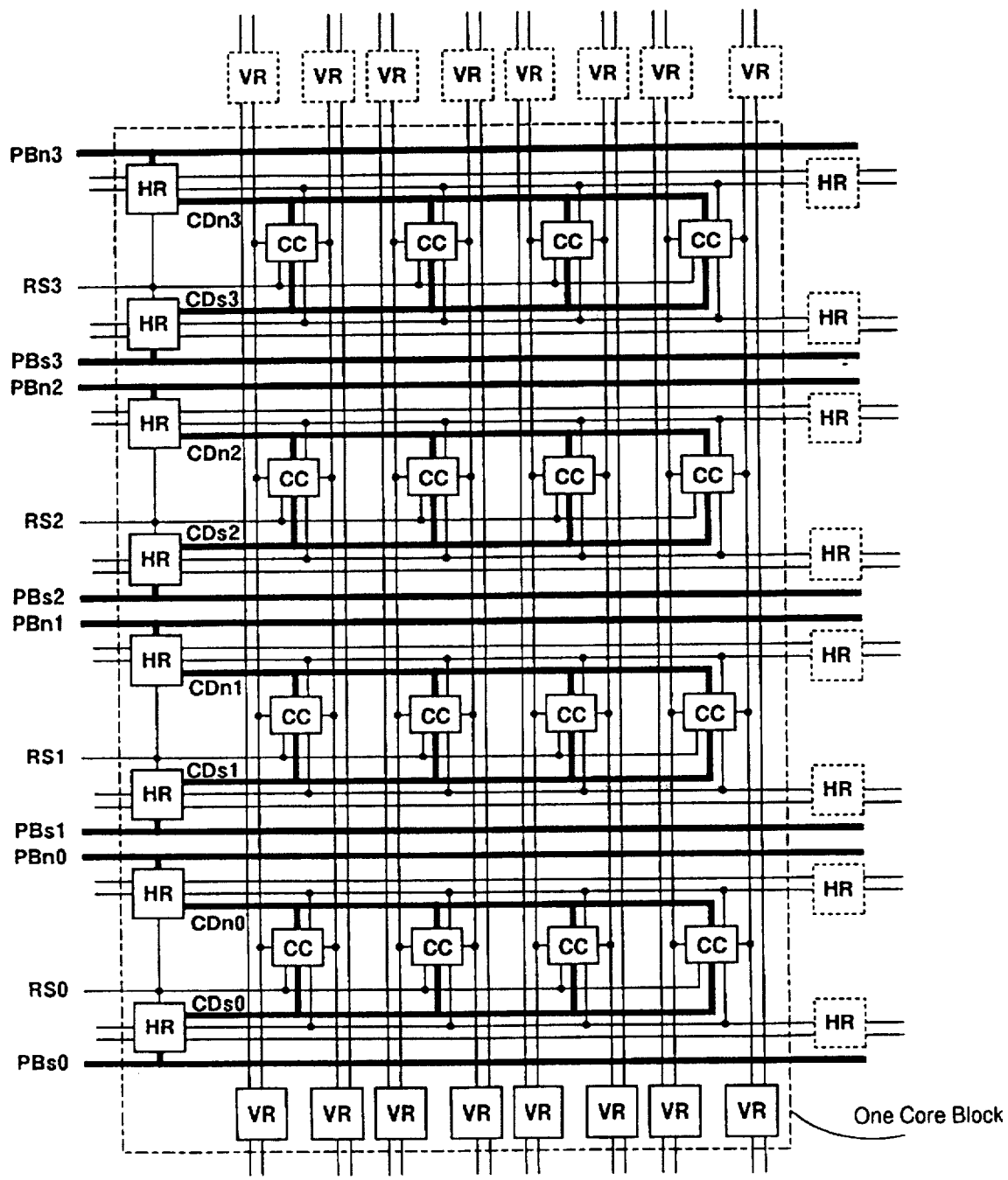
FIG. 12 shows the general plan of the core block structure for a core block of four horizontal columns and four vertical rows.
Figure 13:
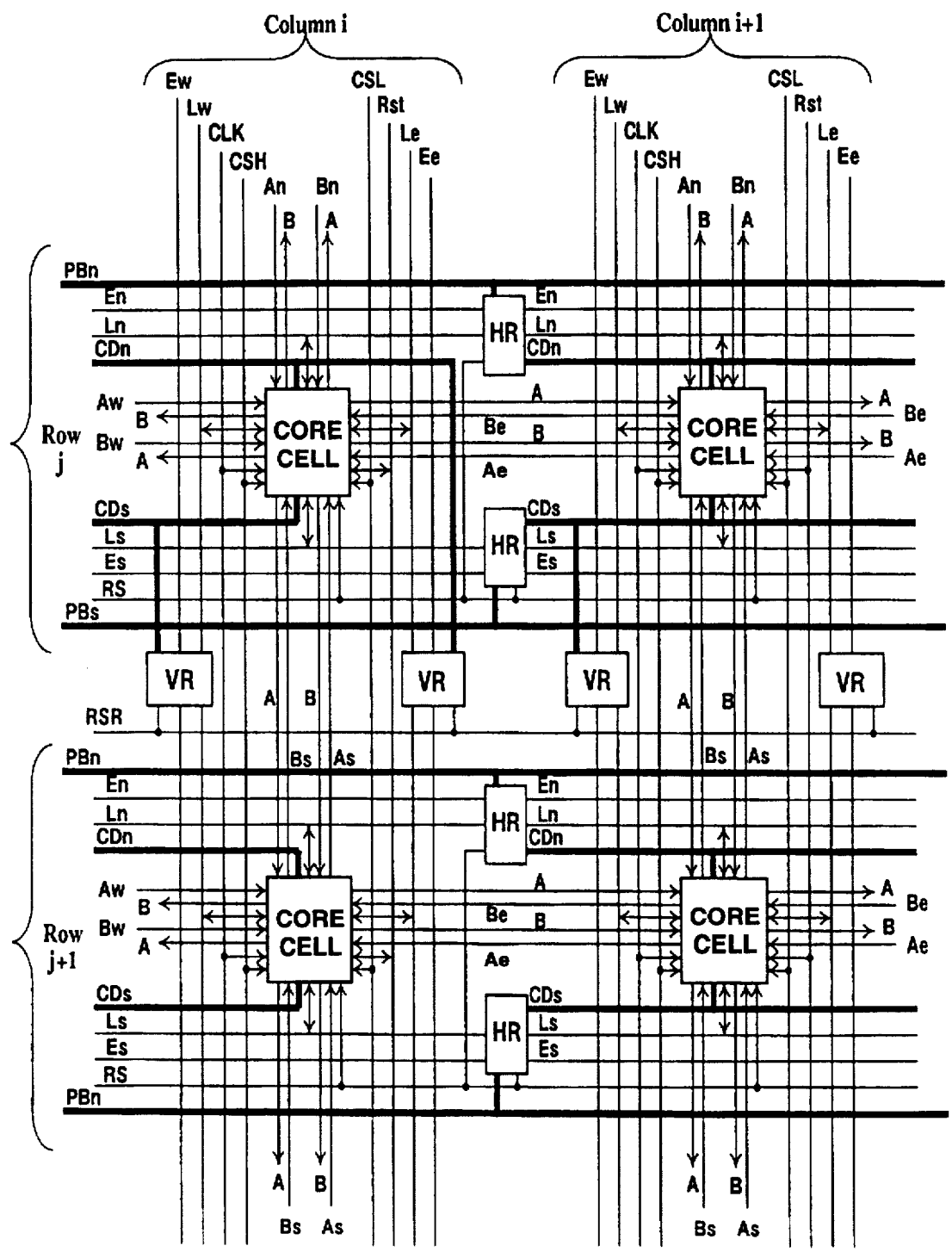
FIG. 13 shows the connections which are part of the interface between the core cells and repeater circuits at the corner of four core blocks.

As was discussed with reference to FIG. 5, a contiguous rectangular array of core cells (CC) with the same local bus connections is called a core block. FIG. 12 shows the general plan of the core block structure for a core block of four horizontal columns and four vertical rows. Each core block 220 is connected to neighboring core blocks and to the Pipeline Bus Array using horizontal repeater (HR) 222 and vertical repeater (VR) 224 circuits. The distribution of configuration data is accomplished by the horizontal repeater circuits which read or write the CD data based on the PBA lines that run throughout the array. For a small ALP circuit, the PBA lines may be used directly for the configuration data. FIG. 13 shows the connections which are part of the interface between the core cells and repeater circuits at the corner of four core blocks.

Figure 14:
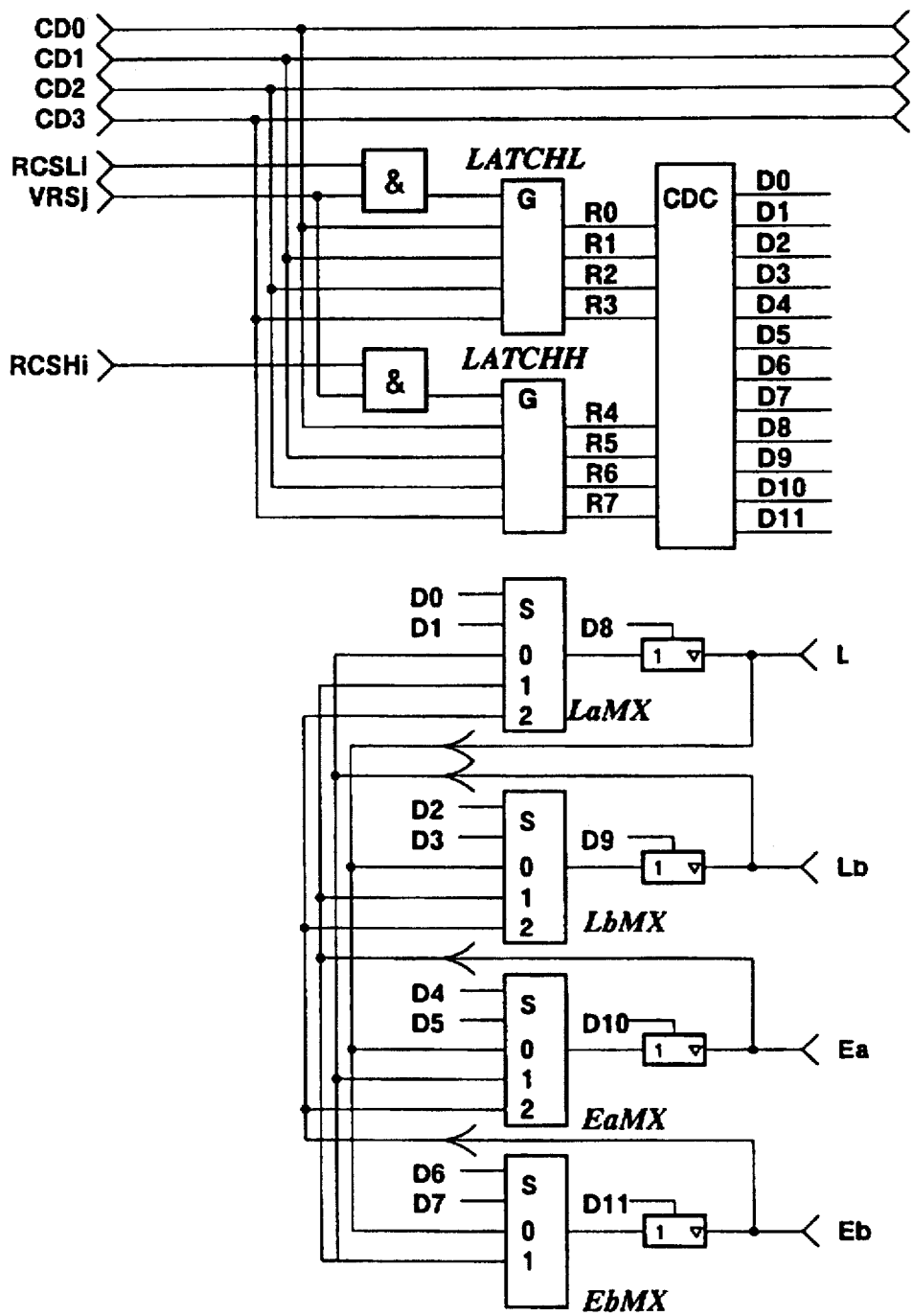
FIG. 14 shows an example circuit for a vertical repeater circuit.

FIG. 14 illustrates an example circuit for a vertical repeater circuit 224. Each repeater receives configuration data from the horizontal repeater blocks on the CD lines. Each vertical repeater allows any combination of connection of the local bus segment above the repeater (La), the local bus segment below the repeater (Lb), the express bus segment above the repeater (Ea) and the express bus segment below the repeater (Eb). Each column in the ALP has vertical repeaters on the left and right side of the column at each core block boundary.

Figure 15:
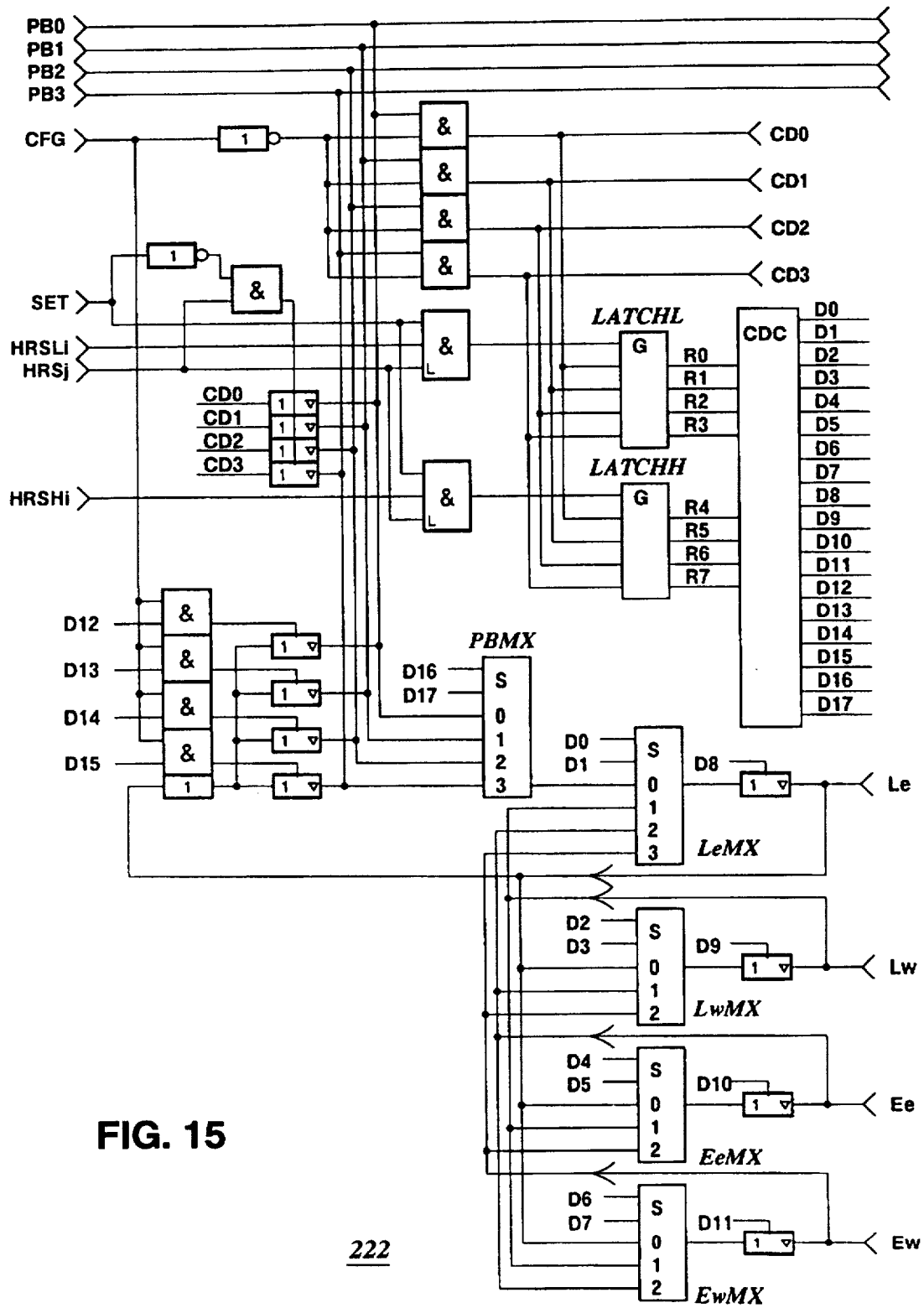
FIG. 15 shows an example circuit for a horizontal repeater circuit

FIG. 15 shows an example circuit for a horizontal repeater circuit 222. Each row in the ALP has two horizontal repeater circuits at a core block boundary, one for the north side bus segments and one for the south side bus segments. In addition to the circuitry which allows connection of the east and west local and express bus segments (Le, Lw, Ee, and Ew), the horizontal repeater includes circuitry to read or write any one of the four pipeline bus (PB) signals to the east side local bus segment (Le). The horizontal repeaters also have the ability to drive the configuration data lines (CD) from PB or read the configuration data lines back to PB.

RSP Detailed Data and Control Flow

An RSP program accesses the parallel processing interconnect (TBT) and configurable logic array resources (ALP) by extensions to the instruction set of the scalar processor (PDP). The bit level definition of the instruction set access depends on the specific scalar processing core used. Since all scalar processors have a generic instruction set form based on the Von Neumann architecture, this discussion generally applies to any scalar processor. The aspects of instruction set access fall into the categories of (1) configurable address modes, (2) function execution instructions, (3) conditional jump instructions, (4) configurable logic interrupts, (5) direct input/output, and (6) reconfiguration instructions.

A typical RSP implementation allows access to Pipeline Bus Array connections using an extension of the integral indirect addressing mechanism. These extensions to the normal addressing capabilities are the configurable address modes. Any instruction in the scalar processor which references a memory operand may use the configurable address mode capability. In the RSP example, there are six possible configurable address references:

PIR—Pipelined Toggle Bus Input Read. This address mode allows Toggle Bus input data to be referenced directly as a data operand.

PIW—Pipelined Toggle Bus Output Write. This address mode is used with instructions which normally write to memory. The data output is redirected by the RPIC block to the Toggle Bus as an output word.

PAR—Pipelined Address Read. The address value defined by the output of the Read Address (RA) Pipeline Bus Array lines is used as the address of memory to read an operand.

PAW—Pipelined Address Write. The address value defined by the output of the Write Address (WA) Pipeline Bus Array lines is used as the address of a memory location to write data.

PDR—Pipelined Data Read. The output of the Read Data (RD) Pipeline Bus Array lines is used as the input data operand for the instruction. This allows direct connection of configurable logic output to the input of the scalar processor.

PDW—Pipelined Data Write. The output of the scalar processor is redirected as the input to the Write Data (RD) Pipeline Bus Array lines. This allows direct transfer of data from the scalar processor to the configurable logic.

In all cases, the RPIC circuit will introduce "wait states" if data is not available from the source when a transfer is initiated. The configurable address mode extensions are implemented using the "data request" controls in the Pipeline Control Ports.

Function execution instructions use the "function request" control signals in the Pipeline Control Ports. In general, there is one function request instruction for each PCP. In the RSP implementation, four additional unused instruction operation code bits are provided to the configurable logic, allowing the implementation of up to 128 different configurable logic dependent functions.

The PCP condition lines allow the implementation of "configurable jump" instructions. This allows alternative instruction execution sequences to be performed depending on the current value of signals in the configurable logic.

Configurable Interrupts are implemented by extending the typical interrupt mapping table to include one interrupt location for each Pipeline Control Port. When the interrupt is asserted by the configurable logic, the RPIC suspends normal program execution and begins execution of the sub-program at the address defined by a value in the interrupt table. In normal use, the sub-program executes a Function Request instruction which causes the configurable logic circuit to remove the interrupt request signal.

A specific implementation architecture may use direct input/output instructions to implement data transfers between the scalar processor, the Toggle Bus, and the configurable logic resources. In a typical case, input/output "port" numbers are assigned to the pipelined bus array line sets. This capability is normally used with the Toggle Bus Transceiver when this resource is not used as a parallel processing interconnect.

Loading the configuration registers associated with the configurable logic core cells and configurable wiring is performed by special instructions. Each register is considered as a location in the "configuration memory" address space. A "block move" type instruction is used to load an entire pipeline segment. Alternately, each configuration register may be changed by a single instruction execution. Instructions are also provided to read one or more configuration registers. These instructions are used to implement adaptive algorithms (such as adaptive filters or to change a pipeline stage to perform an "add" operation instead of a "subtract"). As noted, the source of configuration data may be the on-chip memory, off chip memory, or Toggle Bus data input.

Figure 16:
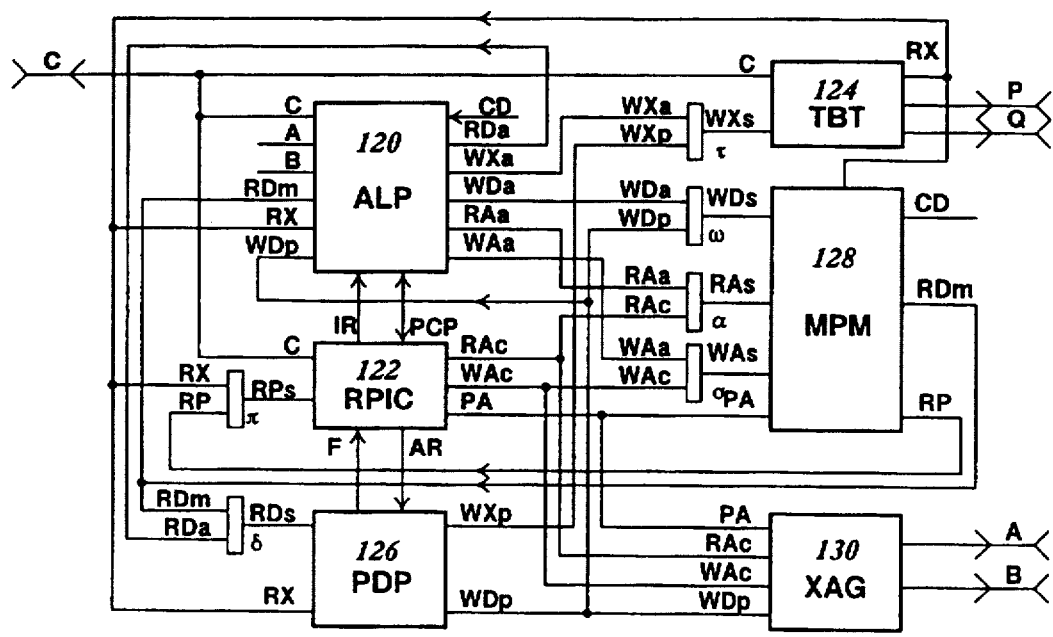
FIG. 16 is a block diagram showing the detailed data flow for the major bus paths of an example RSP component.

FIG. 16 is a block diagram showing the detailed data flow for the major bus paths of an example RSP component. The read data (RD) bus has two sources: (1) RDa from ALP 120 and (2) RDm from multiport memory 128. RPIC 122 controls the selection of these alternative values depending on the current pipeline operation. Similarly, the write data (WD) source may be from the ALP or PDP 126, the write external (WX) data may be from the ALP or the PDP, the read address (RA) may be from the ALP or RPIC, and the write address (WA) may be from the ALP or the RPIC. A special wide word data path for configuration data (CD) is provided between the memory and ALP. The address generation circuitry in the RPIC has a private connection to the arithmetic pipeline data (F) in the PDP. Similarly, the RPIC address register values may be used in the PDP computations using the AR data path. RPIC supplies the instruction register information to ALP as well as the pipeline control port (PCP) signals. When an RSP component is used as a bus master, the RPIC circuit drives the C control bus which is an input for the RSP components which are used as subordinate data processing elements.

Topple Bus Input/Output Operations

The Toggle Bus Transceiver (TBT) is used for primary data input and output for an RSP component. When several RSP components are used to form a SIMD parallel processing system, the TBT implements a variety of advanced data flow patterns which allow high bandwidth signal flow and parallel processing operations. The three types of data flow implemented by TBT are:

Broadcast—any processor may broadcast data to all of the other processors. This is used for instruction distribution from the bus master processor to the subordinate data processing elements and for data broadcast for the steps in an algorithm when each processor needs the same data.

Reflections—the data from processor J is transmitted to the processor numbered J XOR R where R is the Hamming distance. Reflections may be performed at the bit level to support multiple dimension memory access that is need for image processing and image generation applications.

Rotations—the data from processor J is transmitted to the processor numbered (J+R) mod N. This allows the implementation of ring based algorithms with variable rotation size. Rotations may also be performed at the bit level to support long word arithmetic and image data manipulation.

Each of these operations may be performed in a single clock cycle. The broadcast operations use combinational data flow as for a classic Tristate bus. The reflection and rotation operations use a two phase scheme in which the data is first transmitted on the P bus lines, received on the Q lines and stored in a latch register, and then retransmitted on the P or Q lines. In addition to the basic data flow operations, the Toggle Bus performs a number of overhead transfers which allow associative array processing. Table 8 summarizes the basic Toggle Bus data transfer types.

TABLE 8

Toggle Bus Data Flow Operations

| Name | Bus Code | Distance | Data Flow Function |
|---|---|---|---|
| NOP | 0 | — | No operation; used for processor synchronization |
| CFG | 1 | 0 | Configuration data broadcast from bus master |
| DAT | 1 | 1 | Data Broadcast from bus master for data processing |
| FCT | 1 | 2 | Instruction broadcast from bus master |
| GSEL | 1 | 3 | Group select |
| GSTAT | 1 | 4 | Group summary status |
| — | 1 | >4 | Reserved |
| SEL | 2 | G | Bus master selects group G processors for activation |
| STAT | 3 | G | Bus reads processor summary status from group G |
| REF | 4 | D | Reflect data flow with distance D |
| BC | 5 | D | Broadcast data from processor D |
| ROT | 6 | D | Rotate data flow with distance D |
| — | 7 | — | Reserved |

The no operation "NOP" bus cycle allows the bus master to synchronize a data processing array. An open collector bus line called "busy" is connected to all of the processors as part of the Toggle Bus control vector. This signal has a "0" value to the bus master when any one of the processors is not currently ready to participate in a Toggle Bus cycle. Execution of the NOP bus cycle will stall the bus master processing until all processors are ready to continue operation. The NOP cycle may be used by the data processors to synchronize internal operations. The configuration data broadcast "CFG" allows a bus master to configure the ALP circuits of one or more data processors. Only currently active processors as defined below respond to the CFG configuration bus cycles.

The data broadcast "DAT" data flow allows the bus master to broadcast a data word to all of the data processors in an array. The data processors read this data using "IN" instructions or by autonomous pipeline access. The function broadcast "FCT" bus cycle allows the bus master to transmit an instruction to all of the data processors. The instruction may be a data manipulation function (such as ADD to accumulator) or a flow control operation (such as jump to a subroutine location). When more than one word is required, several FCT bus cycles may be used.

The select "SEL" data flow allows the bus master processor to select a subset of the data processors for subsequent operations. For 1 to 16 processors, each data bit in the broadcast corresponds to the "activity" state of the corresponding processor. For example, bit 0 of the data sets or resets the active condition for processor 0. When there are more than 16 processors, the distance value "G" allows the selection of a subset of 16 processors which have a group number that corresponds to the value of "G". When the activity state is set, a processor will respond to the function "FCT" broadcast bus cycles. If the activity state is "0", a processor performs no operation when a function bus cycle is executed. The Group Status (GSTAT) cycle returns a 16 bit word to the bus master where each bit is a summary of a 16 processor subset. A bit is a "1" if any of the processors in the group have a status bit of "1". The status read "STAT" bus cycle is used to read a summary status word from a group of data processors. Each bit in the word received by the bus master corresponds to a summary status bit in each processor. The meaning of the status bit is algorithm dependent. When there are more than 16 processors, the "G" parameter selects the group that responds to the status request. The status response is typically used in conjunction with the select bus cycle for associative array algorithm operations.

Figure 17:
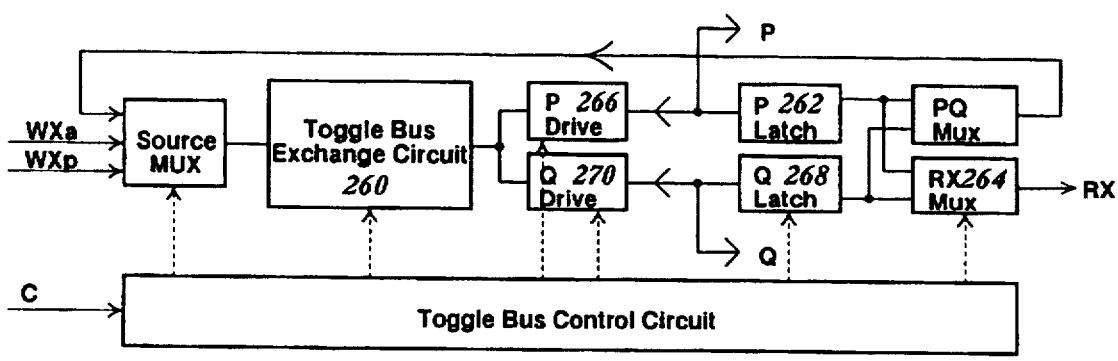
FIG. 17 is a block diagram showing an example circuit for the Toggle Bus Transceiver for an RSP component.

FIG. 17 is a block diagram showing an example circuit for the Toggle Bus Transceiver 124 for an RSP component. The RSP internal data source for data output is either the WXa bus from the ALP unit or the WXp data from the PDP unit. Data received from the Toggle Bus is distributed on the RX bus.

For a broadcast operation, the WX data is transmitted through Q drive circuit 270 after permutation in Toggle Bus Exchange circuit 260. The data is then received from the P lines through P latch 262 and RX multiplexer 264 for distribution on the RX bus. For reflection and rotation operations, data is first driven through P drive 266 after permutation. The data is then received and stored in Q latch 268. On the second phase of the clock, the Q latch data is then passed through the permutation for transmission back through P 266 or Q 270 drive and is then finally latched from Q latch 268 or P latch 262 to RX multiplexer 264. The P and Q latches operate as a master-slave flip flop for storing the received data for reflections and rotations.

Toggle Bus Transceiver 124 is controlled by the C vector which supplies the following information:
Toggle bus phase;
P and Q drive enables;
Current data flow type: broadcast, reflection, rotation and so forth; and
Distance: broadcast source, reflection distance or rotation distance.

Toggle bus transceiver 124 allows different data flow on each phase of a bus cycle. For example, data may be rotated at the bit level on the first phase and then reflected on the second phase.

For the SIMD systems, the bus master processor generates the C vector components for all of the data processors. The C vector is then input to the subordinate processors. At power up, the Toggle bus operates only as a broadcast bus until all of the RSP components have been initially configured.

RPIC Detailed Description

The complete circuit for the Reconfigurable Pipeline Instruction Controller (RPIC) depends on the implementation of the Pipelined Data Processor (PDP). The interface of the RPIC block to the ALP varies only with the number of data paths included in the pipeline bus array and the number of signals implemented in the pipeline control ports. The interface of the RPIC block to the core processor, memory and parallel processing interconnect fixed functions varies depending on the precise needs of the circuits chosen to implement these fixed function blocks.

If the ALP is connected to a core processor then the RPIC block needs control signals which indicate: (1) when a new instruction is being fetched from a program memory, (2) when processor initiated input and output cycles are to be executed, and (3) when data is to be read or written from or to a fixed function data memory block. The RPIC circuit also expects to be able to initiate software interrupt functions in the core processor. These generic capabilities are available on all processors but with variation in the specific details of the signals and time of the signals.

If the ALP is connected to a fixed function parallel processing interconnect block then the RPIC block needs interface control signals to: (1) determine when a reconfiguration is being requested by an external device, (2) determine when externally initiated instructions are to be executed by RPIC, (3) determine when external data has been made available to the ALP, and (4) determine when the external devices are ready to accept data from the ALP.

If the ALP is connected to a fixed function memory resource, then the RPIC requires interface control signals to: (1) determine when the external memory is available to written, and 2) determine when data requested by the ALP is ready for use.

The following discussion describes a minimal RPIC subsystem, assuming a generic PDP with emphasis on the interface to the Pipeline Control Ports (PCPs).

Figure 18:
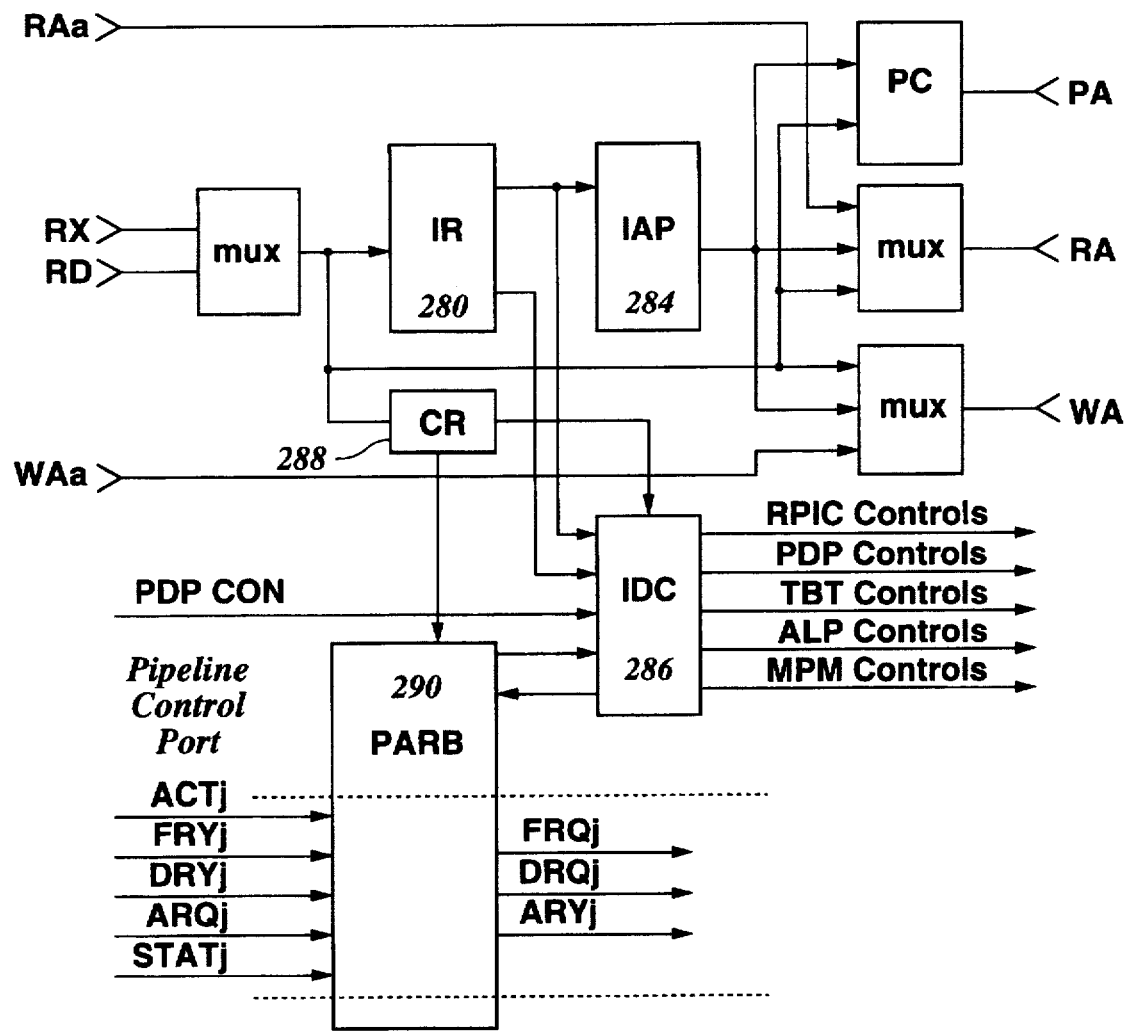
FIG. 18 is a block diagram showing the basic components of a RPIC circuit.

FIG. 18 is a block diagram showing the basic components of a RPIC circuit 122. The RPIC includes two basic registers for program control flow. Instruction Register (IR) 280 holds the current instruction to be executed and Program Counter (PC) 282 holds the address of the next instruction to be executed. IR 280 may be loaded from either the local memory using the address in PC 282 or from the receive port of the Toggle Bus. The Toggle Bus input is used for receipt of the instructions in a data processor from a bus master processor using the function "FCT" Toggle Bus cycle. External instruction input operates as a "soft interrupt". That is, any current program execution is suspended while the external instruction (which is usually a call instruction to an interrupt service routine) is executed. Executing an interrupt return instruction will cause the RPIC to resume execution at the point in the program at which the function input occurred. Program counter 282 controls the flow of the RSP program by the sequence of addresses on the Program Address bus (PA). For most instructions, the PC value increments on the same clock cycle that the IR is loaded. Jump and call type instructions are used to directly modify the current PC value.

Addresses for memory read (the RA read address bus) come from four possible sources: (1) memory read bus (RD) which is a direct address in program memory as the second word of an instruction, (2) the Toggle Bus as the second word of a Toggle Bus function input, (3) ALP RAa pipeline bus in response to an autonomous pipeline request (ARQ) or from an instruction initiated configurable address mode operation, and (4) the Indirect Address Processor (IAP) 284. Write addresses for memory on the WA have similar source values.

Indirect address processor 284 includes PDP dependent address register and address computation resources to create addresses based on indirect address mode selection bits in the instruction. Instruction Decode Circuit (IDC) 286 determines the type of addressing for each instruction and selects the address source for RA and WA. The Configuration Registers (CR) 288 in RPIC include data which defines the context of the RSP operations. For example, CR bits are used to identify the processor usage type (bus master processor or data processor). The CR also includes the pipeline bus array configuration controls as previously described.

Pipeline Arbitration circuit (PARB) 290 coordinates the operation between the ALP pipeline busses, the instruction fetch pipeline, and the PDP data processing pipelines. The scheme used is based on the traditional interlocked pipeline stall philosophy: when one pipeline needs data from a second pipeline, the first pipeline is stalled (its clock signal is suppressed) until the data is available from the requested pipeline. The software and ALP circuitry are responsible for insuring proper pipeline flow by inserting NOP instructions or clock wait cycles as needed.

Detailed implementation of the PARB depends on the PDP structure and the type of technology used. The following paragraphs describe the operation of the PARB circuit in terms of the basic operations which involve the ALP configurable pipeline circuits.

Pipeline Enable Operation—Program initiated and autonomous data transfers between the ALP and the other RSP processors using the Pipeline Bus Array require that the pipeline be enabled by: (1) the configuration register active bit (CRAj) and (2) the active signal (ACTj) from the ALP.

Figure 19:
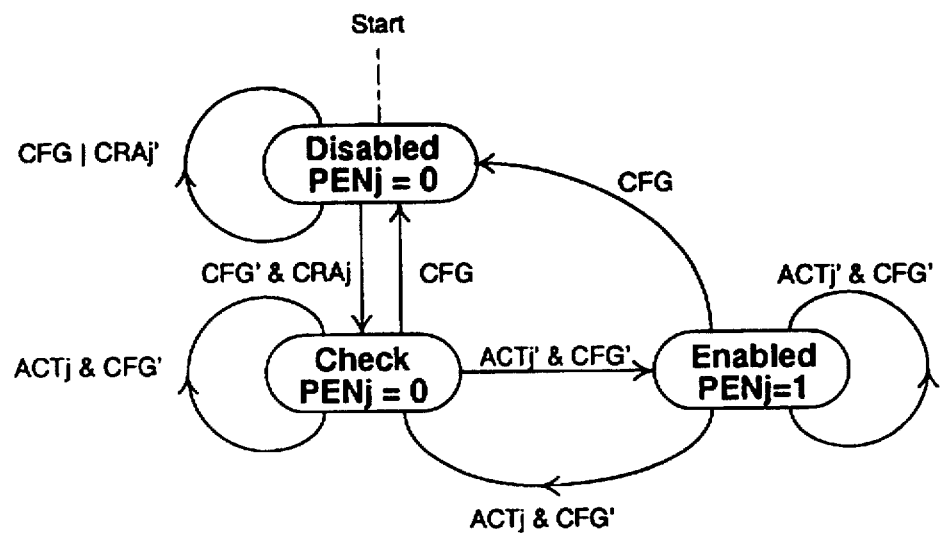
FIG. 19 is a state diagram showing the operational flow for generating a Pipeline Enable signal for the program initiated and autonomous data transfer operations.

FIG. 19 is a state diagram showing the operational flow for generating a Pipeline Enable signal for the program initiated and autonomous data transfer operations. One skilled in the art can readily produce the circuitry needed to implement the state diagram shown. At power up and after a hard reset, all pipelines are driven to the "Disabled" state. This forces the pipeline enable signals (PENj) LOW which disables the other operations. The pipeline remains disabled as long as a configuration sequence is being executed (signal CFG is HI) and the configuration register active control bit is LOW. When CRAj is HI and no configuration sequence is being executed, the circuit checks the ACTj signal from the ALP in the "Check" state. When ACTj is asserted LOW, the circuit enters the "Enabled" state and generates a HI value on the PENj signal for the pipeline. A pipeline will then be disabled if another configuration sequence is executed or an operation is performed that releases the ACTj signal.

Figure 20:
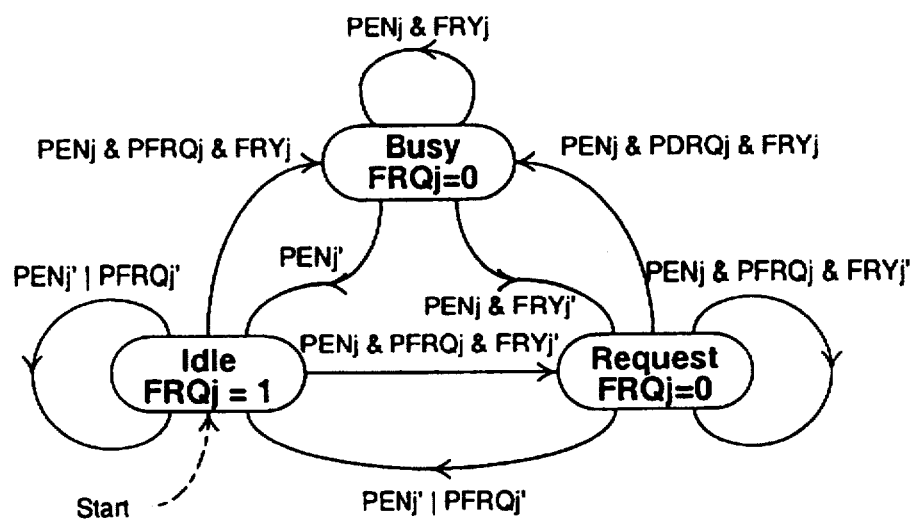
FIG. 20 is a state diagram showing the operational flow when the instruction decoder determines that the current instruction requires execution of a pipeline function in the ALP.

Function Request Operation Flow—FIG. 20 is a state diagram showing the operational flow when the instruction decoder determines that the current instruction requires execution of a pipeline function in the ALP. If the requested pipeline is not enabled in the configuration register or the active signal (ACTj) for the pipeline is not asserted, an error interrupt is initiated. This simplifies the debugging of algorithms which use ALP pipeline circuits. Otherwise, the RPIC instruction decoder issues the "Program Function Request" signal (PFRQj) to the program function state machine for the pipeline. If the "Function Ready" signal is not asserted (the FRYj signal is HI), a busy state is entered with the "Function Request" signal (FRQj) asserted LOW. This will force a stall condition to any subsequent function requests to this pipeline.

The circuit remains in the "Busy" state until the FRYj signal is asserted LOW or the pipeline is disabled.

A new pipeline function instruction may be executed on each clock cycle as long as the FRYj signal remains asserted. This allows the implementation of high speed pipelines which are capable of beginning a new operation on every clock cycle. This also allows the implementation of pipelines that require more than one clock cycle for each function request. For example, a pipeline that requires two clock cycles for each function initiation will raise the FRYj signal HI for one clock cycle after the FRQj signal is recognized. The PARB then asserts the function request (FRQj) for the selected pipeline and waits for the assertion of the function ready (FRYj) condition from the ALP circuit. The PARB releases the function request when there is no pipeline function instruction pending in the instruction stream.

Data Request Operation Flow—The RSP program may execute instructions which explicitly cause transfer of data from a processing unit (memory, PDP, or Toggle bus) or from an ALP pipeline to another processing unit. These instructions use the "Data Request" synchronization circuit. The instruction decoder in RPIC may also initiate a data request cycle for the configurable address modes which allow the use of ALP pipeline output for the read or write address. Configurable address modes also initiate a data request for transferring data from the PDP to an ALP pipeline or from the ALP to the PDP. These data flow operations all use the data request (DRQj) and data ready (DRYj) controls in the pipeline control port.

Figure 21:
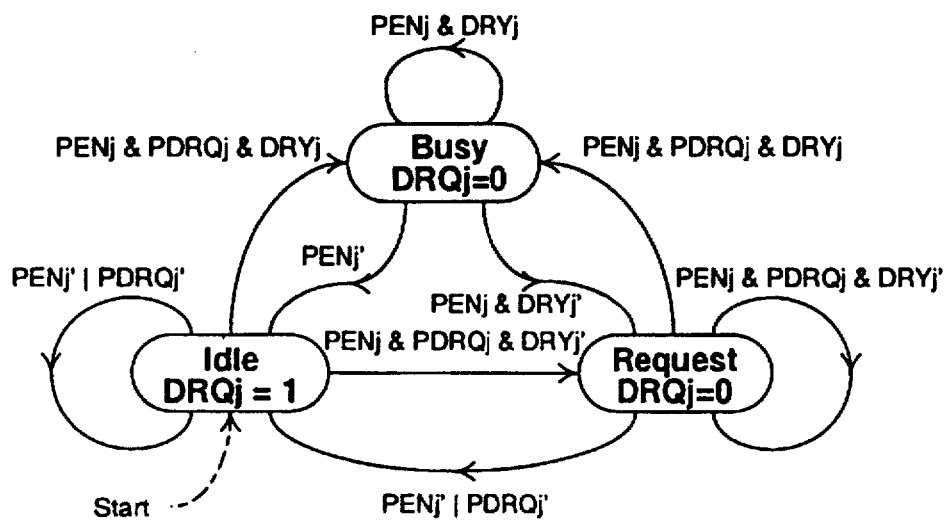
FIG. 21 is a state diagram showing the operational flow of the program data request operation.

FIG. 21 is a state diagram showing the operational flow of the program data request operation. As for all the program initiated operations, the requested pipeline must be enabled, otherwise an error interrupt is executed. The data request (DRQj) is asserted by the PARB circuit to the ALP when the instruction decoder issues the "Program Data Request" signal (PDRQj). If the pipeline is not ready for the data transfer, the state machine enters the "busy" state and waits for the "data ready" signal (DRYj) to be asserted LOW. In the busy state, a subsequent program data request will stall the instruction execution pipeline until DRYj signal is asserted LOW. A new data request may be asserted on each clock cycle so long as the ALP pipeline circuit is able to maintain data transfer at the highest rate. Otherwise, the ALP control circuit may insert "wait states" by raising DRYj HI for these necessary number of clock cycles. RPIC inserts wait states into the process is the source or destination processing unit requires additional time for the data transfer.

Status Condition Operation Flow—The ALP pipeline status signals (STATj) are read by the RSP conditional jump instructions which reference the ALP pipeline as a jump condition. As for the other program initiated operations, an error interrupt is generated if the pipeline is not enabled. RPIC simply reads the status line and performs the jump if the condition is satisfied (jump on status "0" or jump on status "1"). Note that there is no request/ acknowledge interchange for this operation.

The algorithm must insert stall cycles or execute an ALP function instruction which waits for the condition to be valid before the execution of the conditional jump to insure that the condition is valid when the jump on condition is executed. Most ALP pipelines maintain the STATj signal at a valid value at all times.

Autonomous Pipeline Operation—If enabled in the configuration registers, an ALP pipeline may request an autonomous data transfer between the ALP pipeline bus array and the Toggle Bus or the RSP memory resources. These transfers do not require execution of an RSP instruction but are normally synchronized to program execution by function request and data request instruction execution. An autonomous operation uses the Autonomous Request (ARQj) and Autonomous Ready (ARYj) signals in a pipeline control port.

Figure 22:
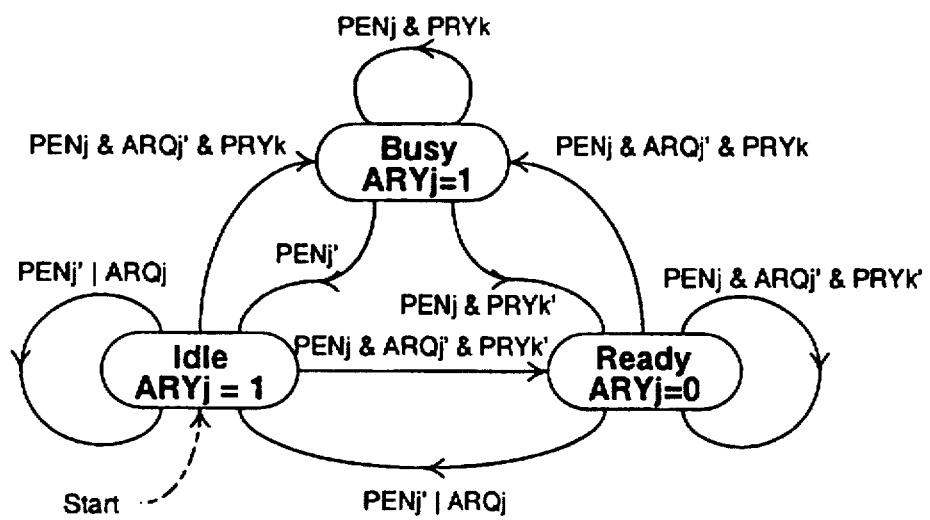
FIG. 22 is a state diagram showing the operational flow of the autonomous request sequence operation.

FIG. 22 is a state diagram showing the operational flow of the autonomous request sequence operation. The pipeline must be enabled for autonomous action in the configuration register for an autonomous request (ARQj) to be recognized. No error interrupt is generated if a request signal is asserted and the pipeline is not enabled.

In order to more fully explain the autonomous pipeline operation, the following discussion assumes an autonomous request to the RSP memory resource. The address for this request is supplied by the RA pipeline in the ALP. The address is assumed to be valid when the request is asserted.

The PARB circuit asserts a read request to the memory and asserts the ready signal (ARYj) LOW when the data is available (PRYk signal is asserted LOW by the memory unit). When the data has been taken by the DRm pipeline, the ALP circuit removes the request (ARQj) and the PARB responds by removing the ready (ARYj) signal. One data transfer will be performed for each clock cycle that the request signal is asserted and the ready signal is asserted. This allows fast pipelines to make a memory reference every clock cycle. When a sequence of asynchronous requests interferes with memory requests for the PDP or Toggle Bus, the ALP pipeline is given only half of the available memory cycles. This occurs only for simultaneous reads and simultaneous write.

An autonomous write operation to the RSP memory is performed by a similar sequence. In this case, the write address must be valid on the WAa pipeline output and the data to be written from the WDa bus must be valid before the request is made. RPIC asserts ARYj when the data has been taken for the memory write.

Autonomous transfers to and from the Toggle Bus Transceiver are performed in a similar manner. A read request will stall until the bus master processor has completed a toggle bus cycle. A write request will stall until the cycle is complete but also has the property that data transferred to the requesting processor (for example, when a rotate cycle is used) may be read from the RX pipeline input when the ARYj signal is asserted. Thus, a normal toggle bus write/read cycle may be performed with a single autonomous request.

Configuration Sequence Concepts

The ALP in an RSP component may receive configuration data from one of three sources: (1) external data (on the RX bus from the Toggle Bus Transceiver) originating in a bus master RSP component, (2) external data from a memory or system bus or (3) from the multiport memory. At power up, an input pin indicates that an RSP is to be configured using external data or that the RSP is to address an external memory for the configuration data. Configuration of the ALP from the on chip memory provides a fast mechanism for reconfigurable pipeline changes but requires the memory to be first loaded from an external source.

The general configuration file for the RSP components include variable size records for six different sets of reconfigurable memories and registers:

Core cell array (CCA)—Allows reconfiguration of any contiguous rectangular block of the ALP array. Each cell requires one word (two bytes) of configuration data. For the RSP family, the ALP array is addressed as a linear map similar to the style used for bit map graphics. That is, the array is assumed to be of size Nc columns (clock line direction) and Nr rows (data path direction). The address for the cell at location x (column) and y (row) is then given by: A=x+y·Nr. A given address is resolved to x and y coordinates by the formulas: x=A mod Nr and y=A div Nr. For consistency with the CLAy architecture, the x coordinate increases from left to right and the y coordinate increases from bottom to top so that address 0 is the lower left corner of the block. This scheme allows configuration blocks to be independent of the array dimensions. A core cell array configuration block is then defined by the target address (lower left corner of the block in the target array) which is a single word, the block width (a byte) and the block height (a byte).

Local bus array (LBA)—ALP retains the coarse block structure of the CLAy components for local and express bus configuration. The configuration for the local bus horizontal and vertical repeater circuits (HR and VR) are addressed the same as for core cells.

Reconfigurable I/O Pins (RIOPs)—the periphery of the ALP array includes family member dependent access to reconfigurable I/O pins as well as access to RSP internal control signals. This serves to extend the periphery of the array to neighboring arrays using "inter quad" signals In the RSP case, each I/O has access to RSP internal signals as well as the usual reconfigurable pad meaning. Addressing of periphery cells is device dependent by necessity. There are several differences in the behavior of the RIOPs in the ALP.

Pipeline Bus Array (PBA)—This is the most significant addition to the CLAy architecture and would be required to be added to most configurable logic designs. The RSP components include a number of pipelined busses to access the data MPM, TBT, and PDP data and RPIC controls. The PBA is a dual usage signal set that flows in the horizontal direction only. During a configuration sequence, the PBA is used to supply configuration data to the core cells, HRs, VRs, and RIOPs. When the internal array is not being configured, each array row has eight lines which are connectable directly to local bus segments using the HRs. For each row, four of the PBA lines have dedicated connections to RSP pipeline busses and four of the PBA lines have usage as global interconnect lines within the ALP. The dedicated meaning PBA lines have bit assignments staggered for pitch 2 data path blocks. A global configuration CFG signal is distributed throughout HRs to disconnect local bus drivers to PBA lines during a configuration sequence.

RSP Configuration Registers (RSPCRs)—The RSP includes 32 bytes of SRAM dedicated to static configuration of the RSP environment. This information includes bits for processor speed, toggle bus speed, initial program address and so forth.

Multiple Port Memory (MPM)—The contents of the internal program memory of the RSP is configurable as part of a configuration sequence. This allows an initial program ("bootstrap loader") to be loaded at power up or after a reboot.

The different types of configuration records are distinguished by a Huffman coding scheme as illustrated in table 9.

TABLE 9

Configuration Address Map

| Address Bits | Configuration Resource |
| --- | --- |
| 00cc cccc cccc cccc | Core Cell Address |
| 01bb bbbb bbbb bbbb | Local Bus Array |
| 1000 iiii iiii iiii | I/O Pad Array (periphery array) |
| 1001 gggg gggg gggg | Global Bus Array (if needed) |
| 1010 --- ---r rrr | Control Register Configuration |
| 1011 | (reserved) |
| 11aa aaaa aaaa aaaa | Program Memory |

This scheme supports direct mapping for a CCA of up to 16,384 cells (128 by 128). Larger RSP parts would have 32 or 64 bit words which support larger arrays.

Each RSP part supports the instructions for reconfiguration shown in table 10.

TABLE 10

RSP Configuration Instructions

| Instruction | Format | Function |
|---|---|---|
| REBOOT | op I address | Execute reboot sequence and begin configuration file stream sequence starting at memory address |
| BCON | op | Begin configuration: PBA disconnect, configuration clock modes |
| DYCON | op I address | Partial reconfigure block from memory address |
| LDCON | op I address | Load configuration word from configuration address space to accumulator |
| STCON | op I address | Set configuration word from accumulator register |
| ECON | op | End configuration: enable ALP PBA, clocks and IO |

The BCON instruction must be executed before the DYCON, LDCON and STCON instructions are executed. BCON sets the ALP clock mode to the values set by the last configuration and asserts the CFG signal to the HR connections to the PBA. DYCON performs a single block configuration. The target address, width and height information are defined as the first two word of the configuration block in memory. The LDCON and STCON instructions allow single cell configuration data read and write to support cell level configuration "calculations". The "address" for the LDCON and STCON are in the configuration address space, while the "address" for REBOOT and DYCON is in the program memory address space.

Configuration file structure

A configuration file consists of a header, a set of configuration blocks and a tail. The general structure is similar to CLAy bitstreams with the following differences:

RSP devices configure only in parallel mode so there is no need for bit synchronization. An RSP device may be initially configured from external data (external clock mode) or by internal address generation (internal clock mode);

The first byte of a configuration file consists of a 4-bit "preamble" pattern (nominally 1011) and a four bit configuration file control field. The LSB of the control field defines the configuration source memory width (0=>eight bit wide memory and 1=>16 bit wide memory). The remaining three bits define the memory speed (number of internal clock cycles per external memory reference). This allows an RSP to self configure from a variety of external ROM or FLASH memory devices. In external configuration mode, the control bits define the source data width;

The second byte of a configuration file (high byte of first word for 16 bit width) extends the configuration file controls. This byte includes clock control information;

The second word of a configuration file indicates the number of configuration block records which follow. There is no need for a "configuration jump address" since this function is easily performed by the current active program;

Each configuration block consists of a two word header followed by the configuration data (always a multiple of two bytes). The first header word is the target configuration address. The low byte of the second word is the block width and the high byte of the second word is the block height;

A configuration file ends with a POSTAMBLE byte which is the same as used with the CLAy devices. There is no concept for "cascade". If several RSP parts are used in a system (or one RSP with several CLAy devices), then a master RSP can configure other devices under RSP program control.

Table 11 summarizes the RSP configuration block structure, while table 12 summarizes the RSP configuration file structure.

TABLE 11

Configuration Block Record Structure

| Word | Format | Meaning |
|---|---|---|
| 0 | W | Target configuration Address |
| 1 | H,L | Height byte, Width Byte |
| 2 | W | H * L data words |
| ... | | |

TABLE 12

Configuration File Record Structure

| Word | Format | Meaning |
|---|---|---|
| 0 | H, [r,c] | Preamble Word: Low byte includes PREAMBLE pattern and word size bit. Upper byte is configuration controls |
| 1 | W | Number of configuration blocks |
| ... | Blocks | Configuration block records |
| last | W | POSTAMBLE word |

External configuration always uses the configuration file record structure. Each internal configuration DYCON instruction references only a single block. Configuration controls for a DYCON instruction are defined by the RSPCR register bits which may be changed by executing STCON instructions.

Multiple RSP Configurations

As mentioned, several RSP devices may be connected together using the Toggle Bus interconnect architecture to allow the implementation of a number of styles of parallel processing system. The most general structure is that illustrated in FIG. 1B. As noted in the previous discussion of that figure, one processor, referred to as processor "$P_N$", is used as a bus master processor for an ensemble of N processing elements referred to as processors "$P_0$" through "$P_{N-1}$". In the current RSP implementation, the Toggle Bus is limited to $N \leq 256$. Each Toggle Bus transceiver has two M-bit bi-directional transceivers called the "P" bus and the "Q" bus. Each Toggle Bus cycle consists of transferring data output through the "P" or "Q" lines and receiving the data on the alternate "Q" or "P" lines. The common Toggle Bus Control Bus "C" is used to define the type of the bus transaction for all processors.

The Toggle Bus provides a "wide word" capability not available on previous parallel processing systems. For M bit words per RSP node and N nodes, the M-N bits on the Toggle Bus may be viewed by the compiler as a single wide word. Example operations that may be performed on this wide word in one bus cycle include "rotate by k" where $k \leq M \cdot N$, and the bit reversal of the complete wide word. This capability has numerous applications including very high precision arithmetic, the implementation of finite field arithmetic capabilities, and effective solution of a number of problems that occur in logic optimization and analysis.

The "Toggle Bus Wiring" referred to in the figure is based on a "perfect shuffle" pattern. For the case of M-bit words, and N=M processors, the wiring rule is defined as follows.

Let $P_j^k$, represent the j-th bit line of the P bus on processor k and let $Q_i^l$ similarly represent the i-th bit line of the Q bus on the processor numbered l. Then the wiring is simply: $p_j^k Q_i^l$. That is, connect the j-th line of the P bus on processor k to the k-th line of the Q bus on processor j. This rule is extended using subgroups of signal lines for systems in which M≠N.

As mentioned when discussing the Toggle Bus, the Toggle Bus supports three basic types of data flow patterns and combinations of these patterns. The "broadcast" data flow pattern allows any one processor to transmit data to all of the other processors in a single bus cycle. This flow pattern is similar to the capability found on traditional tristate based bus structures. The broadcast data flow is used to distribute configuration data in an RSP cluster. The PN processor also uses broadcast to initiate specific processing in the data processors by the direct execution of instructions. In the MIMD computing style, these instructions essentially initiate the execution of functionally dependent subroutines. In the SIMD computing style, the instructions are typically "function request" type instructions for the configurable logic array.

The Toggle Bus also supports general bit-level and word-level "data rotation" data flow patterns. These are used for both SIMD and MIMD style parallel processing approaches for inter-processor data flow. The rotation data flow patterns may be viewed as an extension of the "ring" style interconnect that has been successfully used in previous systems.

The third major type of data flow on the Toggle Bus is called "data reflection". This is the most general and most powerful data flow pattern and allows the implementation of very complex data flow operations such as multiple dimension memory access as described in the next section. Reflection data flow is based on the "Hamming distance" principle as described in most logic design and coding theory books. For example, data between two processors j and k may be exchanged in one bus cycle by setting the Toggle Bus reflection distance to $d=j \oplus k$ where "$\oplus$" is the bitwise exclusive-OR of the bits of the j and k integer values. The distance between processors computed in this manner is called the Hamming distance. The data flow patterns based on the Hamming distance are an integral aspect of complex algorithms such as the Fast Fourier Transform which are fundamental to the intended applications of the RSP architecture.

As noted, table 8 (Toggle Bus Data Flow Operations) summarizes the data flow operations that may be initiated by the PN processor. The "Bus Code" and "Distance" columns are fields in the "C" vector issued by the PN processor. Each RSP processor determines the operation to be performed for a specific bus cycle using the bus code value. In addition to the broadcast, rotation and reflection data flow operations, bus cycles are performed for configuration data, instruction execution and "associative subset" processing. The associative processing operations allow the PN processing to select a subset of the Pi processors that will respond to subsequent bus cycles. This is used for example to select a SIMD functional subset of processors for a specific algorithm which is part of a general functionally partitioned MIMD system structure.

When the number of processors N is greater than the number of bits M in the words, the PN processor uses the "group select" bus cycle types to select subsets of the processors for activation. For these larger systems, one additional clock cycle is needed per bus cycle to complete full "wide word" data flow patterns.

Application Examples

The ALP resources in the RSP may be used in three distinct ways:

I/O Pipeline. Interface to external sensors and actuators using the configurable I/O pins (such as the A and B data sets). This reduces the number of external components needed to implement a system. In this role, the ALP is used as a traditional FPGA structure to interact with the control signals of the external devices in a flexible manner. The PDP program then accesses the external data using pipeline bus read and write instructions. The ALP may provide pre- and post-processing functions such as bit assembly and reassembly.

Programmed Pipeline. The ALP is used to accelerate the computation process by performing simple overhead functions for the computation which otherwise require multiple instructions.

Autonomous pipeline. All or most of a computation is performed in the ALP which directly accesses the memory and Toggle Bus I/O resources without program control.

These approaches may be combined in various ways to provide high performance with minimum external components. The following sections describe how these techniques may be applied to familiar computations.

Floating Point Processing

Figure 23:
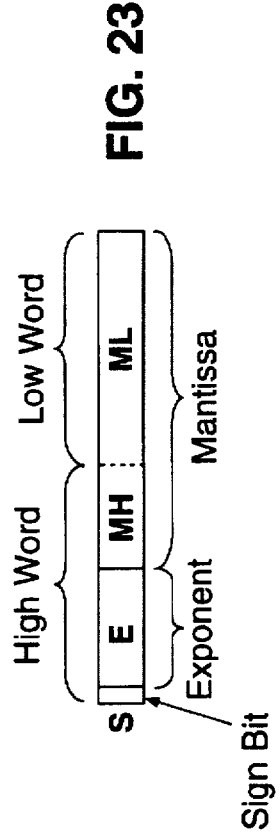
FIG. 23 shows the 32 bit IEEE floating point data format.

If the PDP processor in the RSP does not have floating point arithmetic capability, the ALP may be used to accelerate a set of floating point subroutines by a factor of 5 by performing the exponent computations, exception condition detection, and mantissa word formation. The PDP instructions are then used to perform the actual multiply, add, and subtract operations. For this discussion, the 32 bit IEEE floating point data format shown in FIG. 23 will be used. Each floating point word consists of two 16 bit words. The lower word (ML) represents the lower 16 bits of the mantissa. The lower 7 bits of the upper word (MH) are the upper bits of the mantissa, the most significant bit(s) of the upper word are the sign bit and the remaining bits in the upper word (E) represent the exponent. IEEE format assumes a "hidden bit" in the mantissa. For all values except 0, a single bit having value of "1" must be appended to the MH field to get a correct 24 bit mantissa value.

Figure 24:
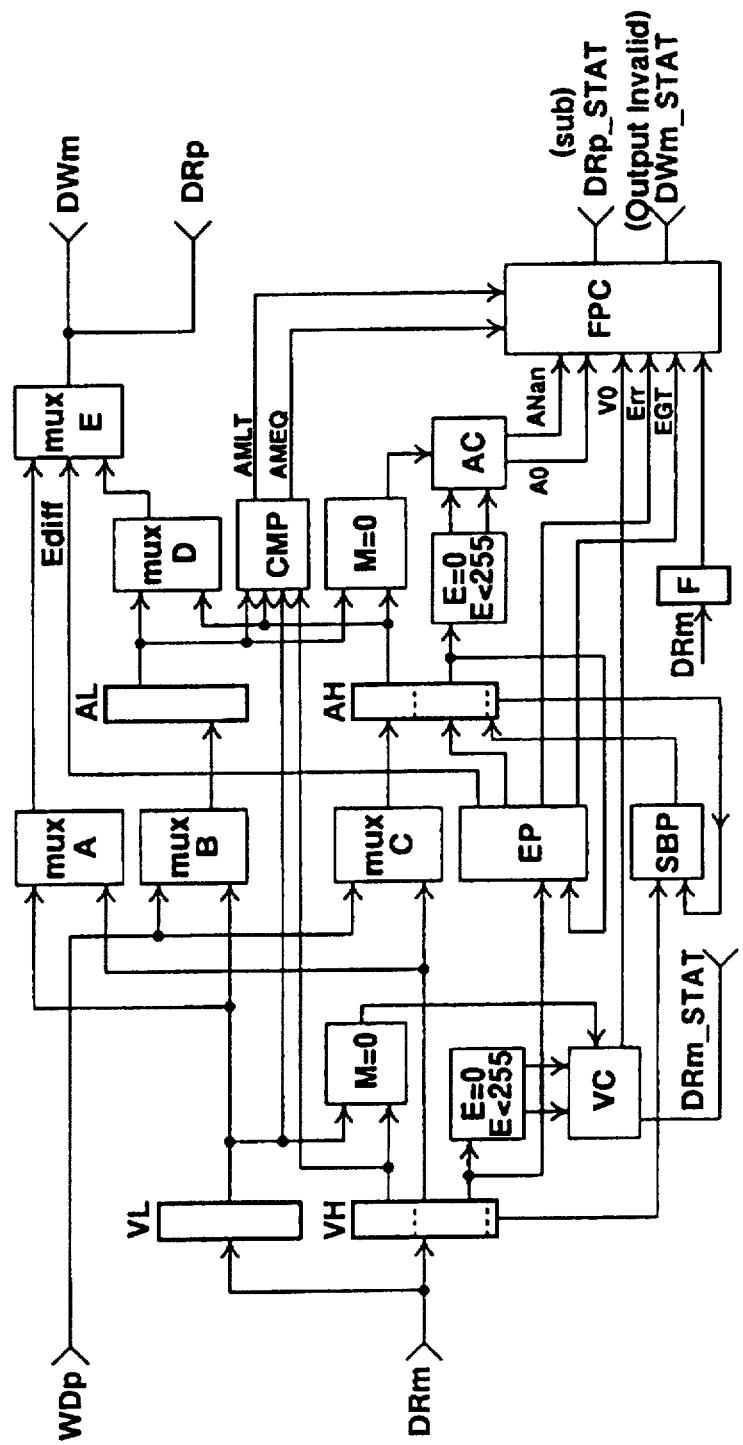
FIG. 24 is a block diagram for an ALP circuit for performing accelerated floating point operations.

FIG. 24 is a block diagram for an ALP circuit for performing accelerated floating point operations. The general plan for the ALP accelerator circuit is to read two words representing a floating point value from memory using the DRm pipeline bus. The ALP circuit then determines any exceptional conditions associated with the value. For this discussion, a reduced set of exceptions which are typical for digital signal processing applications will be used. These conditions are summarized in table 13.

TABLE 13

| IEEE Floating Point Exceptions for DSP | | | |
|---|---|---|---|
| E Value | M Value | Name | Condition |
| 0 | 0 | Zero | Value is 0 |
| 0 | 0 | Nan | Invalid value |
| >0, <255 | any | OK | Ordinary value |
| 255 | any | Nan | Invalid value |

When data is read from memory to the ALP circuit, the value register (VL and VH) are loaded with the input value. The "M=0" and "E=0" circuits then compute the characteristics of the input value. The value circuit (VC) then summarizes these conditions and the DRm pipeline status bit (the DRm_STAT signal) is asserted if the "Nan" (not a number) condition is detected. This allows the software sequence to detect invalid input data conditions. After the completion of a floating point operation, the floating point accumulator register (AL and AH in the figure) holds the result value. These same conditions are then detected for the result value and the DWm_STAT status bit signal is asserted if an invalid result is detected. The result invalid condition is also asserted if an overflow or underflow condition is detected.

The ALP circuit of FIG. 24 includes a complete exponent processor (EP) and a complete sign bit processor (SBP). No PDP instructions are needed for these functions. The operation of the ALP circuit and the PDP program sequences to perform the basic floating point functions will now be described.

Load Floating Point Accumulator—To load the floating accumulator, the program first loads the input value registers with two words and sets the function register (F) in the ALP circuit for a "load" operation. The floating point control (FPC) circuit then transfers the VL and VH register values to the AL and AH registers and asserts the DWm_STAT signal if the value is invalid The basic assembly language program steps are as follows:

| LDALPD A; | load low word to ALP circuit |
|---|---|
| LDALPD A+1; | load high word to ALP circuit |
| LDALPF "LDA"; | set ALP function |
| IFC "ALP_DW" . . .; | test for valid operand value |

Store Floating Point Accumulator—The program sets the function register (F) in the ALP circuit for a "store" operation. The floating point control (FPC) circuit then transfers the AL and AH register values to the DWm output pipeline bus for storage in memory. The basic assembly language program steps are as follows:

| LDALPF "LDA"; | set ALP function for store |
|---|---|
| STALPD A; | store low word from ALP circuit to "A" |
| STALPD A+1; | store high word from ALP circuit to "A+1" |

Floating Point Compare—The program loads the input register with the value to be compared to the current floating point accumulator value and then sets the function register to "compare". The DRm_STAT signal indicates an invalid input, DWm_STAT indicates that "A=V", and DRp_STAT indicates that "A>V".

| LDALPD A; | load low word to ALP circuit |
|---|---|
| LDALPD A+1; | load high word to ALP circuit |
| LDALPF "CMP"; | set ALP function |
| IFC "ALP_DR" . . .; | test for current greater than input |

Floating Point Multiply—The program loads the input register with the value to be multiplied by the current floating point accumulator value and then sets the function register to "multiply". The DRm_STAT signal indicates an invalid input. The ALP circuit automatically computes the temporary value of the result exponent and asserts the DRp_STAT signal if the input value is "0". Three multiplies are then performed using values read from the DRp pipeline in a fixed sequence defined by the control circuit which controls the multiplexers to provide the operands in the proper order. The result is then loaded into the accumulator from the WDp pipeline from the PDP.

| FPMUL: | LDALPD A; | load low word to ALP circuit |
|---|---|---|
| | LDALPD A+1; | load high word to ALP circuit |
| | LDALPF "MUL"; | set ALP function |
| | IFC "ALP_DR" . . .; | if input operand is 0, copy to output |
| | CLR; | clear the PDP accumulator |
| | LDT "ALPD"; | load PDP multiplicand register with AL |
| | MAC "ALPD"; | multiply AL with VH |
| | LDT "ALPD"; | load PDP multiplicand register with AH |
| | MAC "ALPD"; | multiply AH times VL with accumulate |
| | SHF 12; | shift accumulator right |
| | MAC "ALPD"; | multiply accumulate Ah times VH |
| | STL "ALPV"; | transfer lower bits to ALP |
| | STH "ALPV"; | transfer upper bits to ALP |
| | IFC "DWm" . . .; | check for illegal result |

In this code example, the "ALPD" and "ALPV" addresses represent configurable address mode references for transfer of the ALP WDa pipeline to the PDP and memory respectively. This example illustrates the true power of using ALP pipeline circuits. By using simple circuits in the ALP to perform the simple bit manipulation and exponent processing functions, the program sequence is reduced to one fifth of the number of instructions that would otherwise be needed to perform the IEEE floating point multiply.

Floating Point Add—The program loads the input register with the value to be added to the current floating point accumulator value and then sets the function register to "add". The DRm_STAT signal indicates an invalid input. The ALP exponent processor computes the mantissa shift value which is used to scale the smaller operand and asserts the DRp_STAT signal if the operation actually requires a subtract instead. The ALP circuit detects which mantissa is larger and loads this value to the PDP first. The program then performs the add or subtract. A test is performed to see if post normalization is required (details omitted for brevity). The result is then copied back to the floating point accumulator along with the new exponent value computed by the exponent processor.

| ADD: | LDALPD A; | load low word to ALP circuit |
|---|---|---|
| | LDALPD A+1; | load high word to ALP circuit |
| | LDALPF "ADD"; | set ALP function for addition |
| | LDA "ALPD"; | load lower portion of augend mantissa |
| | LDT "ALPD"; | load upper portion of augend mantissa |
| | LDS "ALPD"; | load shift count |
| | IFC "ALP_DR" ADD1; | if subtract is needed, goto ADD1 point |
| | ADS "ALPD"; | add lower portion of addend shifted right |
| | ADHS "ALPD"; | add upper portion of addend shifted right |
| | JMP ADD2; | jump to output save step |
| ADD1: | SUBS "ALPD"; | subtract shifted lower |
| | SUHS "ALPD"; | subtract shifted upper |
| ADD2: | IF "upper" . . . | test for post normalization required |
| | STL "ALPV"; | store lower mantissa to ALP |
| | STH "ALPV"; | store upper mantissa to ALP |

A similar sequence is used to perform floating point subtraction. The only difference is the reversal of the sense of the subtract condition.

Fast Fourier Transform (FFT) Computation

The Discrete Fourier Transform (DFT) is widely used in the analysis and manipulation of data. The mathematical definition of the problem is as follows. Given a vector of data X having N points, then the discrete Fourier transform is the N point vector Y given by the product of X and the transform matrix M:

$$Y = M \cdot X$$

In general, the elements of X are complex numbers representing the values of a time domain function and the elements of Y are complex numbers which represent the coefficients of the frequency domain spectrum of the function. The elements of the transform matrix M are generally complex numbers given by the formula:

$$M_{jk} = \cos(2\pi jk/N) - i \cdot \sin(2\pi jk/N), j=0, 1, \ldots N-1 \text{ and } k=0, 1, \ldots N-1$$

where j and k are the row and column indices and $i=\sqrt{(-1)}$. Using direct computation, the DFT requires $N^2$ multiplies and $N^2$ additions. The Fast Fourier Transform (FFT) algorithms take advantage of the symmetry properties of the $M_{jk}$ coefficients to significantly reduce the number of computations.

Figure 25:
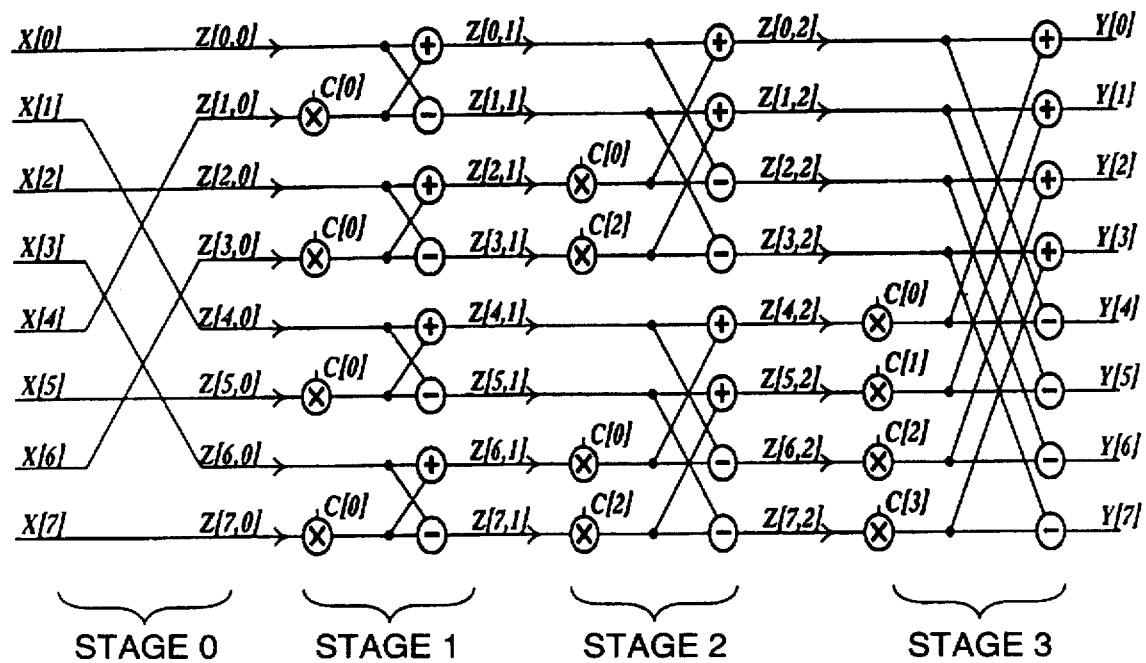
FIG. 25 shows the data flow and computations of the basic FFT algorithm for N=8.

FIG. 25 shows the data flow and computations of the basic FFT algorithm for N=8. When N is a power of 2 so that $N=2^m$, the process requires m+1 stages. In the first stage (stage 0 in FIG. 24) the input data vector X is permuted by the "bit reversal" permutation to form the intermediate data vector Z[j,0]. In this stage, each element X[n] of vector X is mapped to element Z[j,0] such that the bits of index j are the reverse of index n. In the computation stages, each "reflection pair" of intermediate values Z[j,k] and Z[j^d,k] are transformed to realize the next pair of intermediate values Z[j,k+1] and Z[j^d,k+1]. For stage k, the distance between the elements of a pair is given by the Hamming distance function:

$$j \text{ is paired with } j^{\wedge}2^k$$

where "^" is the bitwise exclusive OR of the binary representation of the integers j and $2^k$. The reduced set of multiplication coefficients in the figure is based on the symmetry properties of the M matrix. Specifically:

$$C[r] = M_{1,r}$$

where the index r for the coefficient of the j-th row of stage k is given by the lower (m−1) bits of j with the lower (m-k) bits set to zero.

A specific implementation of the FFT will now be illustrated assuming the use of 16 RSP components connected together using the Toggle Bus and a 17-th RSP used to control the processing array. Each RSP in this structure is uniquely identified by the processor index value L where L=0, 1, . . . 15 are the "data processors" and L=16 represents the computation controller. For illustration, a value of N=1024 will be used. We also assume that processor P0 contains the X elements X[0], X[1], . . . X[63], processor P1 contains the X elements X[64], X[65] . . . X[127] and so forth.

In the first stage, the X vector must be bit reverse permuted. This can be performed by using simple pipelines in the ALP. In each step, 16 data pairs are exchanged in each Toggle Bus cycle. The algorithm for the process is based on forming three groups for the bits of the index of data element X[i] which must be exchanged with data element X[j] such that j is the value of i with bits reversed. For N=1024, 64 cycles are needed to complete the reversal permutation (I6 represents the 6-th bit of index I and so forth):

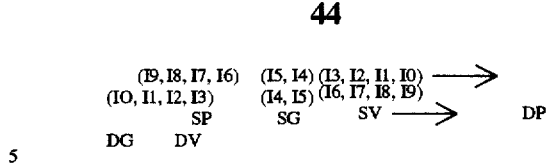

Given the assumed data storage order, the upper 4 bits (the field named SP) represents the processor identification number and the lower 6 bits of the index (SG,SV) represents the index for the storage of the data element in this processor. Two data elements X[i] and X[j] may be exchanged using Toggle Bus reflections if the Hamming distance between the source and destination processor numbers is one of the allowed reflection values d, where d=0, 1, . . . 15. This can be enforced by requiring:

$$DP = SV^{\wedge}d$$

By cycling through all possible values of SG and SV all 1024 values will be properly permuted. For example, the exchange of X[153] with X[356] is performed by:

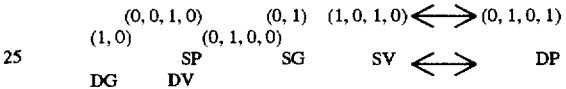

with Toggle Bus distance $d=DP^{\wedge}SV=14$. For this example, the ALP pipeline circuits performs the detailed bit manipulation to create the source address (RA pipeline), destination address (WA pipeline), source data read (RD pipeline), source write (WD pipeline), Toggle Bus transmit (XW pipeline) and Toggle Bus receive (XR pipeline) which uses most of the pipeline bus array resources. In this stage of the FFT, the PDP in processor P16 is used only for sequencing through the 64 steps needed to complete the process.

Figure 26:
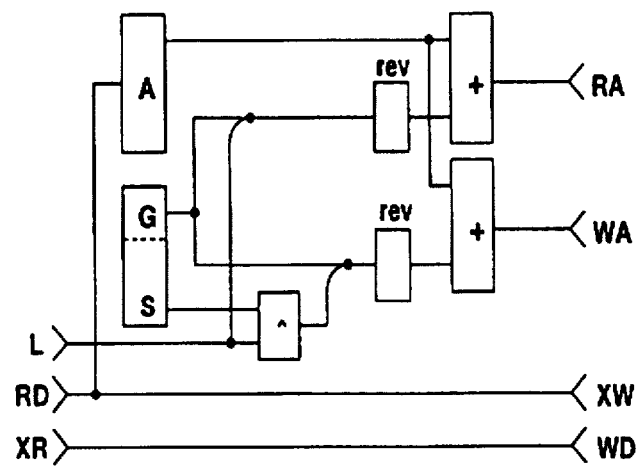
FIG. 26 is a block diagram for an ALP circuit needed in each data processing element to implement the permutation operation used in the FFT computation.

FIG. 26 is a block diagram for an ALP circuit used in each data processing element to implement the permutation operation used in the FFT. Operation between the processors is synchronized by the Toggle Bus cycles. In this figure, the block labeled "A" is a register which is loaded with the base address in memory of the first element in the X data vector. Block "GS" is a six bit counter which is used to step through the data. The lower two bits of this counter are the "group" number and correspond to the SG field in the above examples. The source address (RA) at each step is created by first performing the exclusive OR of the stage value S with the processor number L. This value is concatenated with the group value G, reversed (which requires only wire connections) and added to the base address. The destination address (WA pipeline) is formed by adding the reversed value of L concatenated with G with the base address. After initialization, the control circuit for this block operates as an autonomous pipeline and repeats through the following steps:

(1) Generate read address on RA, wait for RD data ready. Also create the write address value to be used later.
(2) Read data from RD and transmit data on pipeline XW through the Toggle Bus. Wait for receive data from the Toggle Bus.
(3) Write the received data from XR to memory at the address defined by the WA value. Increment the GS counter.

This loop is repeated until the GS counter overflows at which time the process stops. The flow of the P16 program is generally as follows:

```
"Set the base address in the data processors"; /* initialization
*/
for (D = 0; D < 16; ++D) /* each toggle bus distance */
{   "Set toggle bus distance D";
    for (G = 0; G < 4; ++G) /* step through the group elements */
        "cycle the toggle bus";}
```

Note that most of the work for the bit reversal phase is performed in the ALP circuit.

Figure 27:
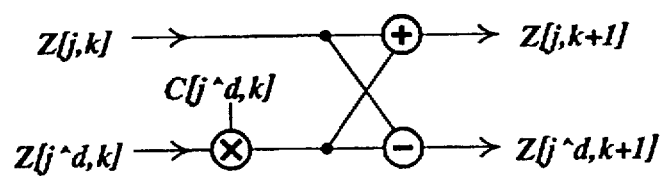
FIG. 27 shows how the FFT algorithm is simplified by dividing the data processors into pairs that perform the basic computation.

The remaining stages of the FFT algorithm use the PDP processing capabilities in each processor to perform the add, subtract and multiply operations. The algorithm is simplified by dividing the data processors into pairs that perform the basic computation, as shown in FIG. 27. The Hamming distance between pairs of data elements is 0 for the first 6 stages and is given by:

$$d = 2^{(k-6)}$$

for the last four stages.

Figure 28:
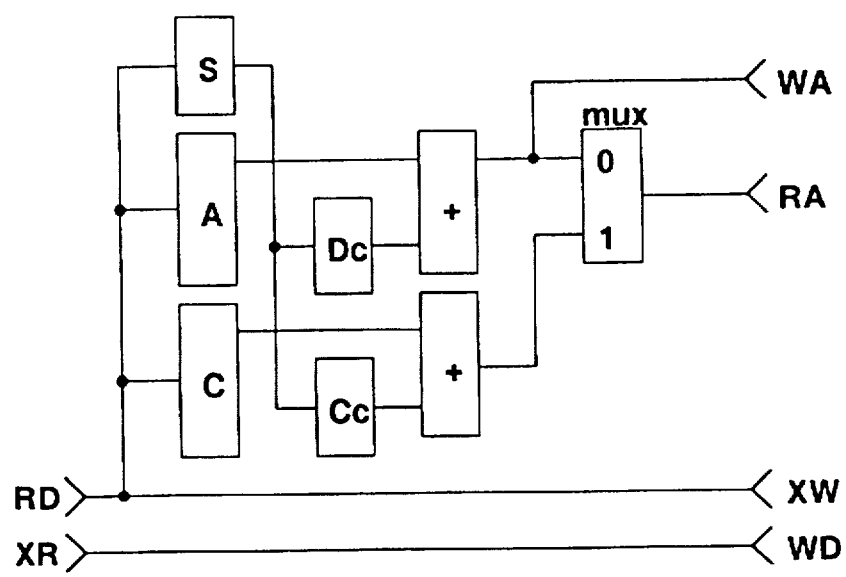
FIG. 28 is a block diagram for an ALP pipeline circuit that computes the address for the coefficients, the address for reading and writing the data, and transfers the data through the Toggle Bus for the FFT computation.

FIG. 28 is a block diagram for an ALP pipeline circuit that computes the address for the coefficients, the address for reading and writing the data, and transfers the data through the Toggle Bus for the FFT computation. In this circuit, block "A" is a register which holds the base address in memory for the data, block "C" is a register which holds the base address in memory for the coefficients, and "S" is a register which holds the stage index. The "Dc" block is a counter which increments by values defined in "S" to generate addresses for successive data elements for each stage. The "Cc" block is a counter which similarly generates successive coefficient address values. The multiplexer block "mux" selects the data or coefficient address for reading from memory.

An example algorithm outline for the odd numbered data processing elements for the computation stages of the FFT is as follows:

```
/* Odd numbered data processing element computations */
for (I = 0; I < 64; ++I)
{   tmp = "c" * "d"; /* coefficient and data address from ALP
*/
    "transmit tmp to the even processor pair";
    "receive pair data"
    "d" = pair - tmp;
}
```

The following algorithm outline is then used for the even numbered data processing elements:

```
/* Even numbered data processing element computations */
for (I = 0; I < 64; ++I)
{   tmp = "d", /* even data address from ALP */
    "transmit tmp to the odd processor pair";
    "receive pair data"
    "d" = pair + tmp;
}
```

The following algorithm is then used by the control processor (P16) to control the data flow through the Toggle Bus:

```
/* PN FFT control algorithm */
for (stage = 0; stage < 10; ++stage) /* each toggle bus
distance */
{   if (stage < 6)
```

```
        "Set toggle bus distance to 0";
    else
        "Set toggle bus distance to (stage - 6)";
    "Broadcast stage value to data processors";
    for (I = 0; I < 64; ++I) "Cycle the Toggle Bus";
}
```

Image Processing

The compression of video image streams is a common task for video conferencing, video phone and multimedia computer applications. The basic approach is to compare the image data from one frame to a current estimated frame, extract the essential difference, and then transmit an encoded version of the differences. This process is called a "video encoder". A video decoder is then used to reconstruct the original image stream by reversing the basic steps. Most of the current approaches use a hierarchical representation of the image stored in memory in the form shown in FIG. 29.

In this representation, the image data is first partitioned into blocks of picture elements (pels) where each block consists of an N by N sub-image, where N is the number of processors. In the example shown in FIG. 29, each block is an 8 by 8 image. Four blocks are grouped together to form a "macro block" of 16 by 16 pels. In a multiple dimension memory access parallel processing system, any row or column of an image block can be accessed in a single Toggle Bus cycle using the reflection data flow patterns.

The simplified flow of a video encoding algorithm is as follows:

(1) Compare each new macro block with the corresponding macro block of the current estimated image. If the difference is below a prescribed threshold, no further processing is performed on the macro block.

(2) Motion Detection—Most differences in a macro block result from the motion of a portion of the image. The algorithm determines the amount of motion of a macro block by a complex comparison sequence which involves comparing a shifted version of the estimated macro block to a neighborhood of the new image. This results in an approximate optimal new position for the estimated block.

(3) Transform—The difference between the estimated block and the new block is transformed using the Discrete Cosine Transform (DCT) algorithm.

(4) The transformed difference block is quantized to reduce the total number of bits needed.

(5) The quantized data is then further reduced using data compression techniques such as Variable Length Coding (VLC).

The following overview describes the use of a 17 processor RSP system to implement the motion detection and transform steps which are typically the most complex aspects of video compression. The approach uses the multiple dimension access capabilities of the Toggle Bus in combination with the use of the ALP for address generation and pixel comparison.

Figures 29, 30:
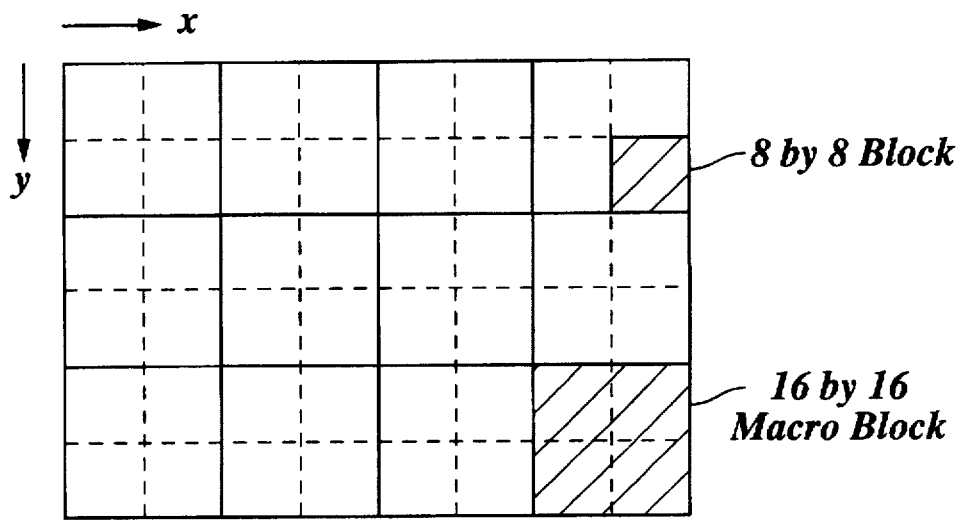
FIG. 29 shows a hierarchical representation of an image stored in memory which is used in a typical image processing application.
FIG. 30 shows the mapping of pels in a macro block to 16 RSP data processors (numbered using hexadecimal notation) for an image processing application based on the architecture of the present invention.

FIG. 30 shows the mapping of pels in a macro block to the 16 RSP data processors which are numbered using hexadecimal notation ("0", "1", . . . "A", . . . "F") for an image processing application based on the architecture of the present invention. The pels of the macro block are assigned to the memories of the different RSP processors according to mathematical mapping rules based on the Hamming distance concept. These rules map the pel at location x and y in the macro block to the coordinates P and A, where P is the processor number and A is the address offset of the pel in the block storage in processor P. The mathematical rule is:

$$P = x \char`\^ R_p(y)$$

$$A = y$$

where $R_p(.)$ is the bit reversal operator and "^" indicates bitwise exclusive OR. These rules then have the inverse mapping of (A,P) to (x,y) coordinates given by the equations:

$$x = P \char`\^ R_p(A)$$

$$y = A$$

Figure 31:
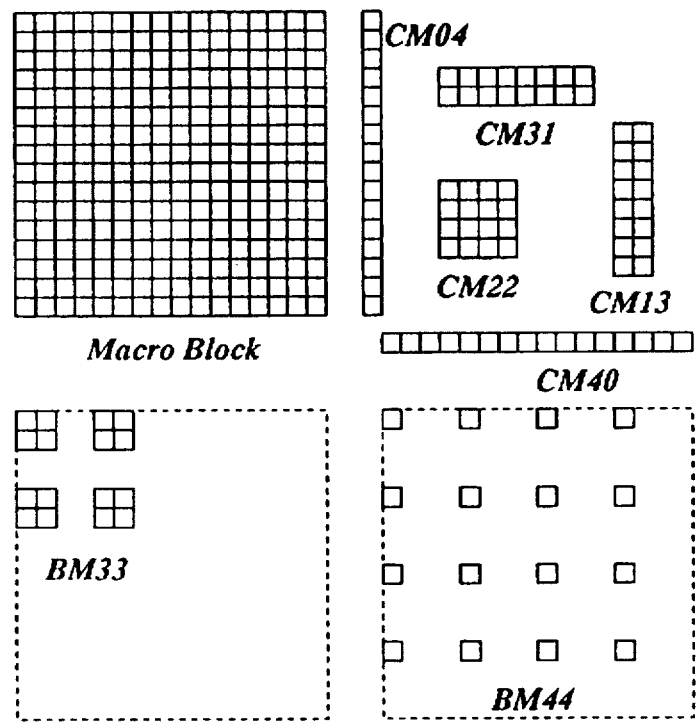
FIG. 31 illustrates the ordering of data amongst the processors which allows access of the data in several useful addressing modes for an image processing application.

This scrambled ordering of data amongst the processor allows the access of the data using several "addressing modes", as illustrated in FIG. 31. The basic addressing mode is "CM40" which allows any 16 pel row to be read from a block in one Toggle Bus cycle. For this mode, the y and A values are the selected row and have the same value for all processors. The Toggle Bus reads or writes this row using a reflection distance of $R_p(y)$ which scrambles the data to the correct processors for a write or unscrambles the data from the processors for a read.

Alternately, any column in a block may be modified in one Toggle Bus cycle using address mode "CM04". In this mode, the x value is constant, the Toggle Bus distance is set to the value x and the address in each processor is given by:

$$A = R_p(P \char`\^ x)$$

The scrambled mapping similarly allows the access of any 8×2, 4×4, or 2×8 block of pels in one cycle. In addition, the scheme allows the use of "bifurcated" addressing modes. For example, mode "BM44" allows 16 pels to be accessed in a two dimensional pattern with a distance of 4 between each pel.

There are several ways to use the multiple dimension access modes of this scheme to implement the motion detection stage of video encoding. Mode BM44 may be used to perform a quick check of image change by comparing a subset of the new image block to the current estimated block in three Toggle Bus cycles. In this case, an ALP pipeline circuit is used to generate the memory addresses "A", perform threshold comparison of the two pels and report the summary result ("yes" or "no") to the PN processor. If all processors report "no significant difference", then the PN processor skips further work on this image block.

Figure 32:
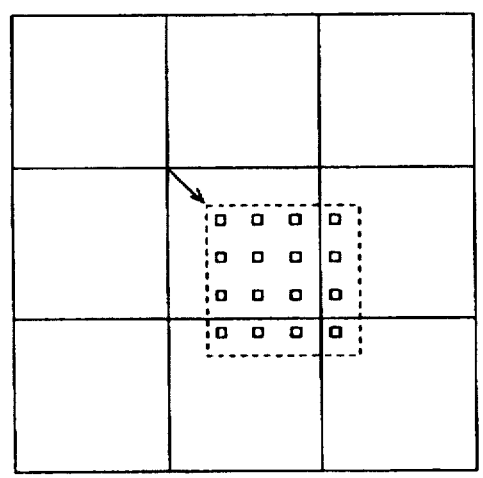
FIG. 32 shows the general search plan for a motion offset detection application based on the architecture of the present invention.

When a significant block difference is detected, the algorithm attempts to determine the optimal new location for the block by a search technique. The general search plan for a motion offset application is illustrated in FIG. 32. Several strategies for finding the optimal offset are available. In the extreme case, the estimate block is compared to all possible locations in a fixed neighborhood. This would require a prohibitive amount of time for most applications. A common strategy is to use a "divide and conquer" technique. The following is the basic outline:

(1) The comparison results of the 0 offset quick check are accumulated by adding the difference values from all 16 processing to get a total difference estimate. This reduction step requires 4 Toggle Bus cycles. In the first cycle, the absolute value of the difference in each processor is added to the comparable value in the processor of distance 1. The step is repeated for distance 2, 4 and 8 which results in the summary difference stored in all of the processors. This represents the current summary difference value.

(2) The difference is then found between the estimate block offset to include data from each of the eight neighbors of the estimate block. This is performed at a coarse offset of 4 pels. For each of the eight possible motion directions, a new summary difference is computed. If the new summary difference is less than the previous difference value, the new summary difference replaces the old value and the new offset replaces the previous offset estimate.

(3) Step 2 is repeated with an offset distance of 2 from the current optimal offset.

(4) Step 2 is repeated with an offset distance of 1 from the current optimal offset.

This results in a motion vector (Dx,Dy) which indicates an approximation to the optimal motion offset. This offset is then used to compute a difference block which includes the difference of pels in the new image relative to the offset value of the estimate block. The difference block is then transformed using a two dimensional DCT algorithm. This is typically done on the 8 by 8 blocks to reduce the amount of computation involved. The general equation for the 2-D algorithm is as follows:

$$G_{x,y} = \frac{2}{N} \sum_{i=0}^{N-1} \sum_{j=0}^{N-1} W_{x,i} \cdot W_{y,j} \cdot D_{i,j}$$

where $D_{i,j}$ are the pel difference values at location x=i and y=j. $G_{x,y}$ is the matrix of transformed values and the transform coefficients $W_{i,j}$ are given by the formula:

$$W_{i,j} = \begin{cases} \cos(\pi/4), & j = 0 \\ \cos\left(\frac{\pi(2i+1)j}{2N}\right), & j \neq 0 \end{cases}$$

The process is simplified by first performing a 1-D DCT on the rows of the block and then performing a 1-D DCT on the columns of the block as in the following equations:

$$H_{x,Y} = \sum_{i=0}^{N-1} W_{Y,i} \cdot D_{i,Y}, \qquad Y = 0,1, \ldots N-1$$

$$G_{X,y} = \frac{2}{N} \sum_{i=0}^{N-1} W_{X,i} \cdot H_{X,i}, \qquad X = 0,1, \ldots N-1$$

For video compression, the DCT is typically computed for 8 by 8 blocks. The $W_{i,j}$ coefficients do not behave as nicely as the corresponding FFT coefficients. These coefficients do exhibit a symmetry property which allows the reduction to only N-1 different coefficients $C_i$ by the definition:

$$C_j = W_{0,j}, j=1, 2, \ldots N-1$$

The 1-D 8 by 8 transform may then be expressed by the matrix product:

$$\begin{bmatrix} H_0 \\ H_1 \\ H_2 \\ H_3 \\ H_4 \\ H_5 \\ H_6 \\ H_7 \end{bmatrix} = \begin{bmatrix} C_4 & C_4 & C_4 & C_4 & C_4 & C_4 & C_4 & C_4 \\ C_1 & C_3 & C_5 & C_7 & -C_7 & -C_5 & -C_3 & -C_1 \\ C_2 & C_6 & -C_6 & -C_2 & -C_2 & -C_6 & C_6 & C_2 \\ C_3 & -C_7 & -C_1 & -C_5 & C_5 & C_1 & C_7 & -C_3 \\ C_4 & -C_4 & -C_4 & C_4 & -C_4 & -C_4 & -C_4 & C_4 \\ C_5 & -C_1 & C_7 & C_3 & -C_3 & -C_7 & C_1 & -C_5 \\ C_6 & -C_2 & C_2 & -C_6 & -C_6 & C_2 & -C_2 & C_6 \\ C_7 & -C_5 & C_3 & -C_1 & C_1 & -C_3 & C_5 & -C_7 \end{bmatrix} \cdot \begin{bmatrix} D_0 \\ D_1 \\ D_2 \\ D_3 \\ D_4 \\ D_5 \\ D_6 \\ D_7 \end{bmatrix}$$

which requires 64 multiply accumulate operations. The number of multiplies may be reduced by using the symmetry properties of the coefficient matrix and using an auxiliary data vector formed by the sum and difference of the data:

$$\begin{bmatrix} H_0 \\ H_1 \\ H_2 \\ H_3 \\ H_4 \\ H_5 \\ H_6 \\ H_7 \end{bmatrix} = \begin{bmatrix} C_4 & 0 & C_4 & 0 & C_4 & 0 & C_4 & 0 \\ 0 & C_1 & 0 & C_3 & 0 & C_5 & 0 & C_7 \\ C_2 & 0 & C_6 & 0 & -C_6 & 0 & -C_2 & 0 \\ 0 & C_3 & 0 & -C_7 & 0 & -C_1 & 0 & -C_5 \\ C_4 & 0 & -C_4 & 0 & -C_4 & 0 & C_4 & 0 \\ 0 & C_5 & 0 & -C_1 & 0 & C_7 & 0 & C_3 \\ C_6 & 0 & -C_2 & 0 & C_2 & 0 & -C_6 & 0 \\ 0 & -C_5 & 0 & -C_1 & 0 & -C_3 & 0 & -C_7 \end{bmatrix} \begin{bmatrix} D_0 + D_7 \\ D_0 - D_7 \\ D_1 + D_6 \\ D_1 - D_6 \\ D_2 + D_5 \\ D_2 - D_5 \\ D_3 + D_4 \\ D_3 - D_4 \end{bmatrix}$$

This form reduces the computation to 32 multiply accumulates distributed over the 16 data processors. For implementation on the 16 processor RSP system, two 1D transforms are calculated at one time. During the row transform phase, the 8 by 2 address mode CM31 is used to access two rows at once. Eight processors are then used to process one row while the remaining eight processors process the second row. In the column transform phase, address mode CM13 is used to access two columns in one cycle. The sum/difference vector is easily computed by using the distance 7 reflection on the Toggle Bus. ALP pipelines are then used to compute the A/P and coefficient addresses. The following is the code outline for the full 8 by 8 two dimensional DCT for the even processors:

```
// 8 by 8 two-dimensional DCT; even processors
for (row = 0; row < 8; row = row + 2) // two rows computed in
parallel
{ "send D"
  "receive reversed Dr, 8 by 2 row mode";
  D = D + Dr; // sum/difference vector
  T = 0; // transformed value
  for (I = 0; I < 8; I = I + 2)
  { "send D, 8 by 2 row mode, distance I";
    "receive Di value";
    T = T + Di * "C"; // Coefficient C address from ALP circuit
  }
}
```

After completing the row transform, a similar algorithm computes the column transforms:

```
for (col = 0; col < 8; col = col+2) // two columns computed in
parallel
{ "send D"
  "receive reversed Dr, 2 by 8 column mode";
  D = D + Dr; // sum/difference vector
  T = 0; // transformed value
  for (I = 0; I < 8; I = I + 2)
  { "send D, 2 by 8 column mode, distance I";
    "receive Di value";
    T = T + Di * "C"; // Coefficient C address from ALP circuit
  }
  T = T >> 2; // divide by 4
}
```

The ALP circuits for these computations take advantage of the combined data flow operations of the Toggle Bus. For example, the i-th data element in the sum/difference vector is read using a Toggle Bus cycle which combines the pel map unscramble operation with the vector element offset. After completing the DCT, additional ALP circuits are used to perform the quantization and run length encoding steps.

As noted, image processing applications typically use complex data transformations such as the discrete Fourier transform (DFT), discrete cosine transform (DCT), or discrete Walsh-Hadamard transform (DWT) to convert the image to a spatial frequency representation. This is used, for example, to determine the type of object that is moving in an image by using feature matching metrics. All of these transformations are performed at N-times speed (or greater) when implemented using a group of RSP devices.

An implementation of the DWT computation is used here as another example of how the configurable logic and Toggle Bus interconnect structure may be used together to accelerate an application. For the one dimensional case, input data words f[i] for i=0, 1, ... N−1 are converted to an N-word transform vector F[i] by the equation:

$$F_k = \frac{1}{\sqrt{N}} \sum_{j=0}^{N-1} C_{j,k} \cdot f_j$$

where the coefficients $C_{j,k}$ are the values +1 or −1 according to a Hamming distance relation:

$$C_{j,k} = \begin{cases} +1, \Omega(j \otimes k) = 0 \\ -1, \Omega(j \otimes k) = 1 \end{cases}$$

Figure 33:
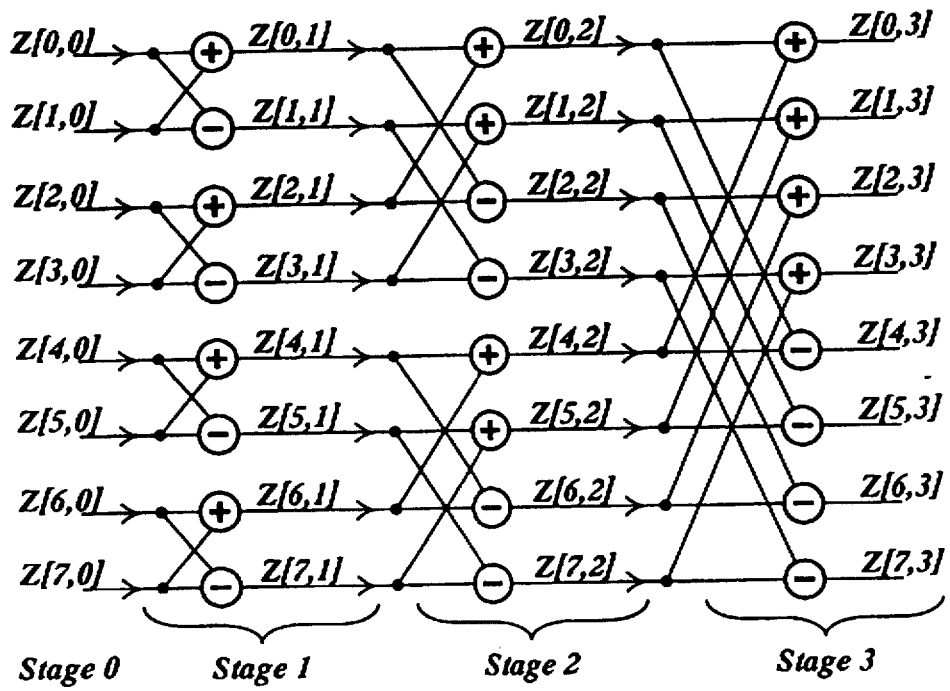
FIG. 33 shows the data flow and computations of the Walsh-Hadamard algorithm for N=8.
Figure 34:
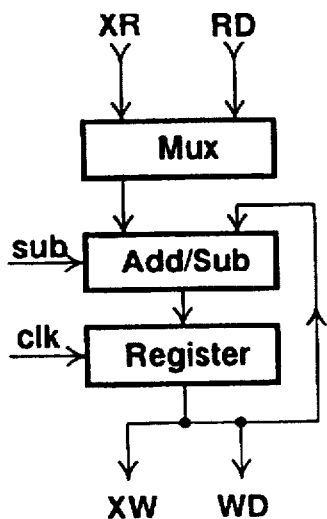
FIG. 34 is a block diagram of a configurable logic circuit which implements the computation of FIG. 33.

In this formula, $\Omega(j \otimes k)$ is the "weight" of the Hamming distance such that Q (j⊗k) has value 0 if the distances j⊗k is even and $\Omega(j \otimes k)$ has value 1 if the distance is odd. Direct implementation of these equations requires $N^2/2$ additions and $N^2/2$ subtractions. For this discussion, a "fast" algorithm is illustrated which requires only $N \cdot \log_2(N)$ additions and subtractions and uses the Toggle Bus reflection data flow patterns. The algorithm first copies the input data values $f_j$ to the initial value of the vector $Z_j^0 \cdot \text{Log}_2(N)$ parallel processing cycles are then used to modify the elements of Z to become the desired transform value. The required computation for each element j at step k is given by the formula:

$$Z_j^{k+1} = \begin{cases} Z_j^k + Z_{j'}^k, j_k = 0 \\ Z_j^k - Z_{j'}^k, j_k = 1 \end{cases} \text{ for } k = 0, 1, \ldots \log_2(N) - 1.$$

where $j_k$ is the value of the k-th bit of the integer j and j' is the Hamming distance "pair" index for element j given by j'=j⊗$2^k$. FIG. 33 shows the data flow and computations of the Walsh-Hadamard algorithm for N=8. The "X" data flows in the diagram represent the "reflection" data flows needed to implement the computations at each step. The Hamming distances needed are 1 for the first column, 2 in the second column and so forth. For implementation on a cluster of eight RSP processors, each RSP maintains one value of the vector. On each Toggle bus cycle, each processor outputs its current $Z_j$ value and receives it's Hamming distance pair value. For this example, element $Z_j$ resides in the processor numbered j so that the processor performs an addition if $j_k$ is 0 or performs a subtraction if the $j_k$ value is 1. FIG. 34 is a block diagram of a configurable logic circuit which implements the computation of FIG. 33. The circuit uses four of the Pipeline Bus Array line sets, RD to get the initial value from the on-chip memory, XW and XR for the Toggle Bus data flow and WD to write the result back into the local memory. By using the autonomous pipeline capability, the entire computation may be performed without executing any scalar processor instructions. The PN processor is used to step through the algorithm and synchronize the operations using the Toggle Bus data flow cycles.

Figure 35:
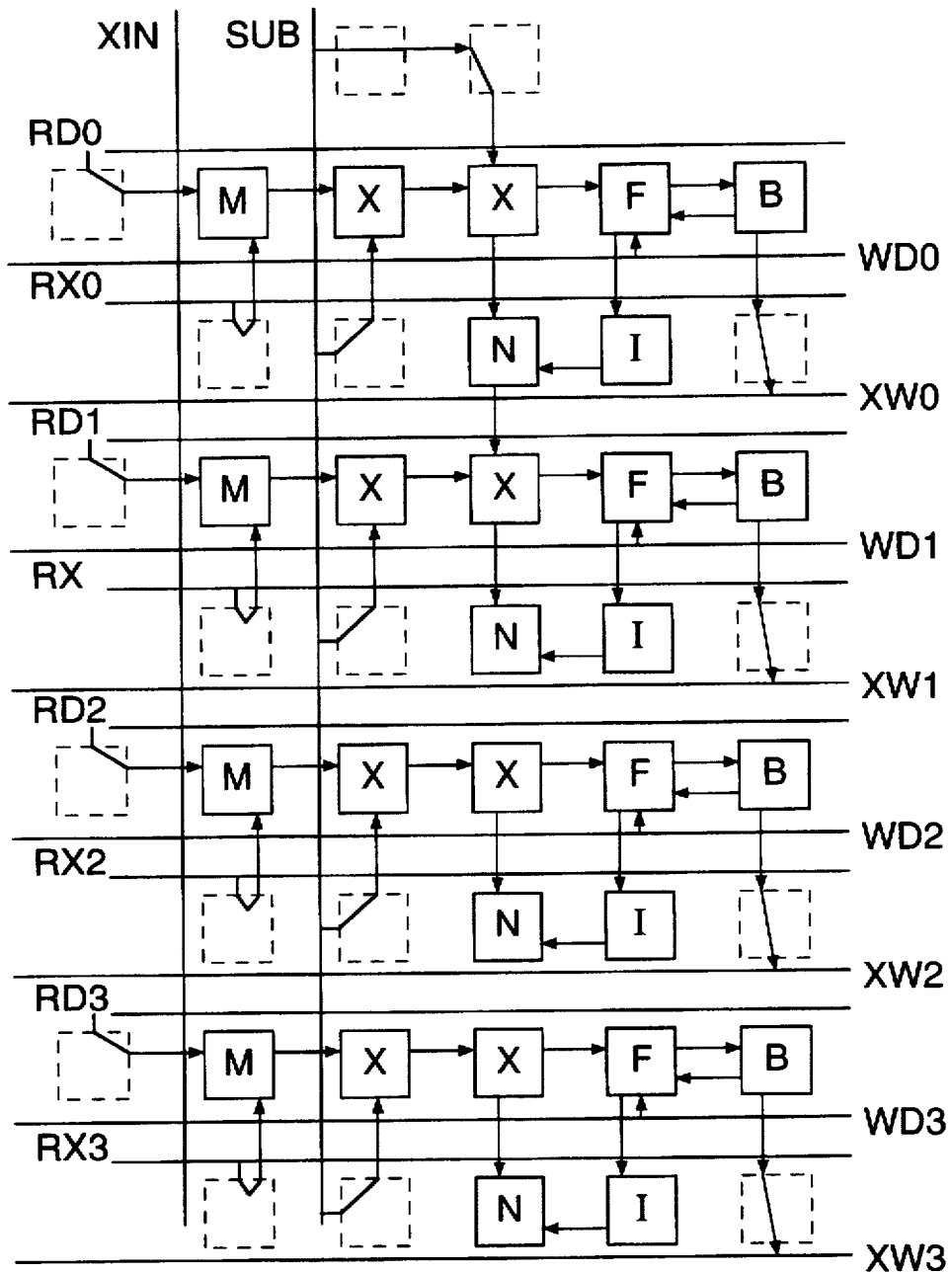
FIG. 35 shows a portion of a relocatable pipeline segment for use in executing the computation of FIG. 33.

This basic algorithm may be extended for any value of data elements N and may be extended to implement the two-dimensional Walsh-Hadamard transform for image processing. For the 2D transform, the data is distributed according to the multiple dimension memory access rules previously discussed. The transform operations are then performed on the columns of the image matrix and then performed on the rows of the matrix. The final values are adjusted by a shift right of $\log_2(N)$ to implement the divide by N factor on the original equation. FIG. 35 shows a portion of a relocatable pipeline segment for use in executing the computation of FIG. 33. This detailed circuit synthesis and layout was created using a prototype RSP data path generator software tool.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

I claim:

1. A reconfigurable computing component, comprising the elements of:
   an adaptive logic processor, the adaptive logic processor further comprising
      a plurality of individually configurable logic cells, the logic cells arranged in an array that includes a plurality of vertical columns of configurable logic cells and a plurality of horizontal rows of configurable logic cells; and
      a set of control lines for transmission of control signals and a set of data lines for transmission of data between a pipeline segment and a logic cell reconfiguration controller, the pipeline segment including a set of configured logic cells and positioned along the vertical extent of the array, wherein the set of control lines and the set of data lines extend across a plurality of columns of the array, thereby allowing the pipeline segment to be located at a plurality of horizontal locations of the array; and
      a logic cell reconfiguration controller for controlling configuration of the logic cells to form the pipeline segment and execution of the set of logical functions by the configured logic cells by transmitting instructions and data by means of the control signal lines and data lines.

2. The reconfigurable computing component of claim 1, further comprising:
   an arithmetic processing unit for executing scalar arithmetic functions, and wherein the adaptive logic processor further comprises
      a second set of data lines for transmission of data between the set of configured logic cells contained in the pipeline segment and the arithmetic processing unit, wherein the second set of data lines extend across each column of the array.

3. The reconfigurable computing component of claim 1, wherein the adaptive logic processor further comprises:
   a row local bus running between adjacent rows of configurable logic cells, the configurable logic cells in said adjacent rows being selectively connectable thereto;
   logic cell-to-local bus interface circuitry selectively connectable between a selected configurable logic cell and a selected row local bus to allow said selected configurable logic cell to read data from or write data to the selected row local bus; and
   direct interconnect means connectable between the selected configurable logic cell and an adjacent configurable logic cell such that an output signal provided by the selected configurable logic cell can be directly provided as an input signal to the adjacent configurable logic cell independent of the row local bus.

4. The reconfigurable computing component of claim 3, wherein the adaptive logic processor further comprises:
   a column local bus running between adjacent columns of configurable logic cells, the configurable logic cells in said adjacent columns being selectively connectable thereto, and further, wherein the logic cell-to-local bus interface circuitry is selectively connectable between a selected configurable logic cell and a selected column local bus to allow said selected configurable logic cell to read data from or write data to the selected column local bus.

5. The reconfigurable computing component of claim 1, wherein the control signals transmitted between the set of configured logic cells and the logic cell reconfiguration controller include
   a function request signal indicating that the logic cell reconfiguration controller has identified an instruction in an executing set of instructions which is intended for execution by the set of configured logic cells;
   a data request signal indicating that the logic cell reconfiguration controller has identified data to be transferred to the adaptive logic processor from another element of the reconfigurable computing component or from the adaptive logic processor to another element of the reconfigurable computing component; and
   an autonomous data transfer signal for controlling execution of an autonomous data transfer between the adaptive logic processor and another element of the reconfigurable computing component, wherein the autonomous data transfer is independent of an instruction in the executing set of instructions.

6. The reconfigurable computing component of claim 1, further comprising:
   a memory device external to the adaptive logic processor for storage of logic cell configuration data, wherein the memory device is connected to the other elements of the reconfigurable computing component by the second set of data lines.

7. The reconfigurable computing component of claim 6, further comprising:
   an external address generator for generating memory addresses used to access the memory device, wherein the address generator is connected to the other elements of the reconfigurable computing component by the second set of data lines.

8. A reconfigurable computing system, comprising:
   a plurality of interconnected reconfigurable computing components, wherein each reconfigurable computing component further comprises the elements of
   an adaptive logic processor, the adaptive logic processor further comprising
      a plurality of individually configurable logic cells, the logic cells arranged in an array that includes a plurality of vertical columns of configurable logic cells and a plurality of horizontal rows of configurable logic cells;

a set of control lines for transmission of control signals and a set of data lines for transmission of data between a pipeline segment and a logic cell reconfiguration controller, the pipeline segment including a set of configured logic cells and positioned along the vertical extent of the array, wherein the set of control lines and the set of data lines extend across a plurality of columns of the array, thereby allowing the pipeline segment to be located at a plurality of horizontal locations of the array; and a logic cell reconfiguration controller for controlling configuration of the logic cells to form the pipeline segment and execution of the set of logical functions by the configured logic cells by transmitting instructions and data by means of the control signal lines and data lines; and an interconnection bus for providing signal transfer between the plurality of reconfigurable computing components, wherein a net signal bandwidth of the interconnection increases in proportion to the number of interconnected reconfigurable computing components.

9. The reconfigurable computing system of claim 8, wherein each of the reconfigurable computing components further comprises:

an arithmetic processing unit for executing scalar arithmetic functions, and wherein the adaptive logic processor in each component further comprises a second set of data lines for transmission of data between the set of configured logic cells contained in the pipeline segment of each adaptive logic processor and the arithmetic processing unit, wherein the second set of data lines extend across each column of the array.

10. The reconfigurable computing system of claim 8, wherein the adaptive logic processor of each reconfigurable computing component further comprises:

a row local bus running between adjacent rows of configurable logic cells, the configurable logic cells in said adjacent rows being selectively connectable thereto;

logic cell-to-local bus interface circuitry selectively connectable between a selected configurable logic cell and a selected row local bus to allow said selected configurable logic cell to read data from or write data to the selected row local bus; and direct interconnect means connectable between the selected configurable logic cell and an adjacent configurable logic cell such that an output signal provided by the selected configurable logic cell can be directly provided as an input signal to the adjacent configurable logic cell independent of the row local bus.

11. The reconfigurable computing system of claim 10, wherein the adaptive logic processor of each reconfigurable computing component further comprises:

a column local bus running between adjacent columns of configurable logic cells, the configurable logic cells in said adjacent columns being selectively connectable thereto, and further, wherein the logic cell-to-local bus interface circuitry is selectively connectable between a selected configurable logic cell and a selected column local bus to allow said selected configurable logic cell to read data from or write data to the selected column local bus.

12. The reconfigurable computing system of claim 8, wherein the control signals transmitted between the set of configured logic cells and the logic cell reconfiguration controller of each reconfigurable computing component include a function request signal indicating that the logic cell reconfiguration controller has identified an instruction in an executing set of instructions which is intended for execution by the set of configured logic cells;

a data request signal indicating that the logic cell reconfiguration controller has identified data to be transferred to the adaptive logic processor from another element of the reconfigurable computing component or from the adaptive logic processor to another element of the reconfigurable computing component; and an autonomous data transfer signal for controlling execution of an autonomous data transfer between the adaptive logic processor and another element of the reconfigurable computing component, wherein the autonomous data transfer is independent of an instruction in the executing set of instructions.

13. The reconfigurable computing system of claim 8, wherein each of the reconfigurable computing components further comprises:

a memory device external to the adaptive logic processor for storage of logic cell configuration data, wherein the memory device is connected to the other elements of the reconfigurable computing component by the second set of data lines.

14. The reconfigurable computing system of claim 13, wherein each of the reconfigurable computing components further comprises:

an external address generator for generating memory addresses used to access the memory device, wherein the address generator is connected to the other elements of the reconfigurable computing component by the second set of data lines.

15. The reconfigurable computing system of claim 9, wherein each of the reconfigurable computing components further comprises:

an interconnection bus transceiver for interconnecting the reconfigurable computing component to the second set of data lines and the interconnection bus.

* * * * *